United States Patent
Yoshimine

(10) Patent No.: US 10,692,534 B2
(45) Date of Patent: Jun. 23, 2020

(54) DATA-PROVIDING APPARATUS, DATA-PROVIDING METHOD AND PROGRAM-SORTING MEDIUM

(71) Applicant: SONY CORPORATION, Tokyo (JP)

(72) Inventor: Takao Yoshimine, Kanagawa (JP)

(73) Assignee: SONY CORPORATION, Tokyo (JP)

(*) Notice: Subject to any disclaimer, the term of this patent is extended or adjusted under 35 U.S.C. 154(b) by 301 days.

(21) Appl. No.: 14/945,025

(22) Filed: Nov. 18, 2015

(65) Prior Publication Data
US 2016/0071543 A1 Mar. 10, 2016

Related U.S. Application Data

(60) Continuation of application No. 13/450,687, filed on Apr. 19, 2012, now Pat. No. 9,466,331, which is a
(Continued)

(30) Foreign Application Priority Data

Apr. 27, 2000 (JP) ................................. 2000-126850

(51) Int. Cl.
*G11B 27/031* (2006.01)
*G06F 3/0486* (2013.01)
(Continued)

(52) U.S. Cl.
CPC .......... *G11B 27/031* (2013.01); *G06F 3/0482* (2013.01); *G06F 3/0486* (2013.01);
(Continued)

(58) Field of Classification Search
CPC .. G06F 3/0481; G06F 3/0486; G06F 3/04842; G06F 3/0482; G06F 3/04812;
(Continued)

(56) References Cited

U.S. PATENT DOCUMENTS 5,267,351 A 11/1993 Reber et al.
5,442,744 A * 8/1995 Piech ................ G06F 17/30017
707/E17.009
(Continued)

FOREIGN PATENT DOCUMENTS

EP 0 715 460 A1 6/1996
EP 0 830 005 A2 3/1998
(Continued)

OTHER PUBLICATIONS

Office Action dated Apr. 8, 2016 in European Patent Application No. 12 174 030.2.
(Continued)

*Primary Examiner* — Ryan F Pitaro
(74) *Attorney, Agent, or Firm* — Xsensus LLP

(57) ABSTRACT

In the present invention, image data is edited in response to a demand transmitted from a data-processing apparatus through a network. A moving-picture server (3) acquires a scenario consisting of a plurality of scenes, each lasting for a given time, is acquired in response to a demand made by a personal computer (1-1). The server acquires from a temporary edition space (6) a given number of original data items that will be used in the scenario, also in response to a demand made by the data-processing apparatus. The moving-picture server (3) selects prescribed ones of the original data items acquired and allocate them to the scenes of the scenario acquired. The server corrects the original data items selected, in accordance with the prescribed image data items that have been allocated to the scenes of the scenario. The image data is thereby edited.

54 Claims, 46 Drawing Sheets

Related U.S. Application Data continuation of application No. 11/561,978, filed on Nov. 21, 2006, now Pat. No. 8,209,611, which is a division of application No. 10/018,954, filed as application No. PCT/JP01/03741 on Apr. 27, 2001, now Pat. No. 7,552,388.

(51) Int. Cl.

| | | |
|---|---|---|
| G11B 27/034 | (2006.01) | |
| G11B 27/34 | (2006.01) | |
| G06F 3/0481 | (2013.01) | |
| G06F 3/0482 | (2013.01) | |
| G06F 3/0484 | (2013.01) | |

(52) U.S. Cl.
CPC ...... *G06F 3/04812* (2013.01); *G06F 3/04842* (2013.01); *G11B 27/034* (2013.01); *G11B 27/34* (2013.01)

(58) Field of Classification Search
CPC ............. H04N 5/2621; H04N 9/74–76; G11B 27/031; G11B 27/34; G11B 27/034
See application file for complete search history.

(56) References Cited

U.S. PATENT DOCUMENTS

| | | | |
|---|---|---|---|
| 5,548,307 A | 8/1996 | Onagawa | |
| 5,559,641 A | 9/1996 | Kajimoto et al. | |
| 5,608,859 A | 3/1997 | Taguchi | |
| 5,686,967 A | 11/1997 | Maegawa | |
| 5,760,917 A | 6/1998 | Sheridan | |
| 5,778,398 A | 7/1998 | Nagashima et al. | |
| 5,801,685 A | 9/1998 | Miller et al. | |
| 5,819,092 A | 10/1998 | Ferguson et al. | |
| 5,819,274 A | 10/1998 | Jackson, Jr. | |
| 5,826,102 A | 10/1998 | Escobar et al. | |
| 5,852,435 A | 12/1998 | Vigneaux et al. | |
| 5,950,203 A | 9/1999 | Stakuis et al. | |
| 5,969,716 A | 10/1999 | Davis et al. | |
| 5,995,098 A | 11/1999 | Okada et al. | |
| 5,999,173 A * | 12/1999 | Ubillos | G11B 27/034 348/E5.056 |
| 6,154,600 A * | 11/2000 | Newman | G06F 3/0213 348/552 |
| 6,204,840 B1 * | 3/2001 | Petelycky | G11B 27/034 375/E7.006 |
| 6,240,421 B1 | 5/2001 | Stolarz | |
| 6,245,982 B1 | 6/2001 | Suzuki et al. | |
| 6,369,835 B1 | 4/2002 | Lin | |
| 6,400,378 B1 * | 6/2002 | Snook | G11B 27/034 707/999.102 |
| 6,456,304 B1 * | 9/2002 | Angiulo | G06F 3/0481 715/779 |
| 6,509,910 B1 | 1/2003 | Agarwal et al. | |
| 6,535,228 B1 | 3/2003 | Bandaru et al. | |
| 6,583,792 B1 | 6/2003 | Agnew | |
| 6,598,375 B2 * | 7/2003 | Connelly | B65B 7/28 53/291 |
| 6,697,061 B1 | 2/2004 | Wee et al. | |
| 6,720,979 B1 | 4/2004 | Shrader | |
| 6,727,925 B1 | 4/2004 | Bourdelais | |
| 6,738,075 B1 | 5/2004 | Torres et al. | |
| 6,792,615 B1 | 9/2004 | Rowe et al. | |
| 6,828,994 B2 * | 12/2004 | Oka | H04N 5/2252 348/E5.042 |
| 6,868,394 B1 | 3/2005 | Mele | |
| 6,898,620 B1 | 5/2005 | Ludwig et al. | |
| 6,948,131 B1 | 9/2005 | Neven et al. | |
| 6,965,926 B1 * | 11/2005 | Shapiro | G06Q 10/107 709/219 |
| 7,243,079 B1 | 7/2007 | Manolis et al. | |
| 7,617,299 B2 | 11/2009 | Yoshimine | |
| 7,756,752 B2 | 7/2010 | Duvall et al. | |
| 2001/0004417 A1 | 6/2001 | Narutoshi et al. | |
| 2001/0040592 A1 * | 11/2001 | Foreman | G06F 3/0483 715/723 |
| 2002/0049847 A1 * | 4/2002 | McArdle | G06Q 10/10 709/227 |
| 2002/0091697 A1 | 7/2002 | Huang et al. | |
| 2002/0116716 A1 | 8/2002 | Sideman | |
| 2002/0133597 A1 | 9/2002 | Jhingan et al. | |
| 2002/0167541 A1 | 11/2002 | Ando et al. | |
| 2004/0194127 A1 | 9/2004 | Patton et al. | |
| 2005/0116966 A1 | 6/2005 | Graham et al. | |
| 2005/0183013 A1 * | 8/2005 | Ubillos | G11B 27/029 715/716 |
| 2008/0109866 A1 | 5/2008 | Thomas et al. | |

FOREIGN PATENT DOCUMENTS

| | | |
|---|---|---|
| EP | 0 915 469 | 5/1999 |
| EP | 0 917 148 | 5/1999 |
| JP | 05-165932 | 7/1993 |
| JP | 06-121273 | 4/1994 |
| JP | 07-200775 | 8/1995 |
| JP | 8-32923 | 2/1996 |
| JP | 10-098677 | 4/1998 |
| JP | 2000-082278 | 3/2000 |
| WO | WO 99/01818 A1 | 1/1999 |
| WO | WO 99/46934 | 9/1999 |
| WO | WO 99/52114 | 10/1999 |
| WO | WO 00/63912 | 10/2000 |
| WO | WO 01/35410 A1 | 5/2001 |
| WO | WO 01/76238 A2 | 10/2001 |

OTHER PUBLICATIONS

Office Action dated Apr. 11, 2016 in European Patent Application No. 01 926 066.0.

"earthnoise—help—easy steps to making a video" [Retrieved from the Internet on Apr. 1, 2016: URL: https://web.archive.org/web/20000304145905/http://www.earthnoise.com/make/started/pl], XP055262250, Mar. 4, 2000, 1 Page.

Tat-Seng Chua, et al., "A Video Retrieval and Sequencing System" ACM Transactions on Information Systems vol. 13, No. 4, XP000537933, Oct. 1995, pp. 373-407.

Robin S. Rowe, "Remote Non-Linear Video Editing," SMPTE Journal, XP-000894175, vol. 109, No. 1, Jan. 2000, pp. 23-25.

Kamara, S., "JavuNetwork: Remote Video Production and Storage", IEEE Multimedia, vol. 6, Jul.-Sep. 1999, pp. 78-80.

Office Action dated Dec. 8, 2011 in European Patent Application No. 01 926 066.0.

"Sony, VAIO C1XF greatly enhanced CPU or HDD, etc.", PC Watch, http://translate.google.com/translate?hl=en&sl=ja&u=http://pc.watch.impress.co.jp/docs/article/20000126/sony2.htm, Jan. 26, 2000, XP 55013757, 1 page.

Extended European Search Report dated Mar. 20, 2013 in Patent Application No. 12174030.2.

European Office Action dated May 21, 2013 in Patent Application No. 01 926 066.0.

Andrews et al., Special Edition Using Windows 98 Second Edition, Dec. 1999, 62-63, 66-67, 785-801.

Office Action dated Feb. 27, 2018 in European Patent Application No. 12174030.2, 7 pages.

* cited by examiner

| USER ID | PASSWORD | DIRECTORY DATA | SERVICE CHARGE |
|---|---|---|---|
| aaaaa | * * * * * | user¥aaaaa | 2000 |
| bbbbb | * * * * * | user¥bbbbb | 1800 |
| ccccc | * * * * * | user¥ccccc | 3500 |
| ⋮ | ⋮ | ⋮ | ⋮ |

FIG.3

| DATA ID | USER ID | DIRECTORY | FILE NAME | TITLE | CATEGORY | INTRODUCTORY COMMENT | SHARED-DATA FLAG | CHARGE FLAG | CHARGE |
|---|---|---|---|---|---|---|---|---|---|
| xxxxx | aaaaa | user¥aaaaa¥movie1 | golf.mov | GOLF | SPORTS | ******* | 0 | | |
| yyyyy | aaaaa | user¥aaaaa¥movie1 | fish.mov | FISHING | SPORTS | ******* | 1 | 0 | |
| zzzzz | aaaaa | user¥aaaaa¥movie2 | travel.mov | TRAVEL | TRAVEL | ******* | 1 | 1 | 200 |
| ... | ... | ... | ... | ... | ... | ... | ... | ... | ... |

FIG.4

| DATA ID | USER ID | CHARGE FLAG |
|---|---|---|
| yyyyy | aaaaa | 0 |
| zzzzz | bbbbb | 1 |
| hhhhh | ccccc | 1 |
| ⋮ | ⋮ | ⋮ |

FIG.5

| | |
|---|---|
| MOVING PICTURE | .MOV<br>.AVI |
| STILL PICTURE | .BMP<br>.GIF<br>.JPG<br>.PNG<br>.PCT |
| MUSIC | .WAV<br>.AIF |

FIG.17

DATA-PROVIDING APPARATUS, DATA-PROVIDING METHOD AND PROGRAM-SORTING MEDIUM

CROSS-REFERENCE TO RELATED APPLICATIONS

The present application is a continuation application of U.S. application Ser. No. 13/450,687, filed Apr. 19, 2012, which is a continuation application of U.S. application Ser. No. 11/561,978, filed Nov. 21, 2006, now U.S. Pat. No. 8,209,611, which is a divisional application of U.S. application Ser. No. 10/018,954, filed Mar. 29, 2002, now U.S. Pat. No. 7,552,388, which is a national stage application of PCT Application No. PCT/JP01/03741, filed Apr. 27, 2001, which claims priority to Japanese Application No. P2000-126850, filed Apr. 27, 2000. The entire contents of the above-identified applications are incorporated herein by reference.

TECHNICAL FIELD

The present invention relates to a data-providing apparatus and a data-providing method, both for editing images, and a program-storing medium that stores programs to be executed in the data-processing apparatus and the data-processing method.

BACKGROUND ART

Recently, personal computers have acquired various functions. They can edit not only text data, but also image data.

In order to edit images, the user of a personal computer needs to learn the functions the personal computer can perform. Even if the user has learned the functions, it takes him or her much time to obtain desired results of edition. Further, a great amount of data must be processed to edit image data. That is, much time is required to edit image data.

DISCLOSURE OF THE INVENTION

The present invention has been made in view of the foregoing. An object of the invention is to provide a data-providing apparatus and a data-providing method, which enable the user to edit images easily and quickly. Another object of the invention is to provide a program-storing medium that stores programs to be used in the data-providing apparatus and the data-providing method.

To attain the above-mentioned object, a data-providing apparatus according to the invention is designed to edit image data in response to a demand transmitted from a data-processing apparatus through a network. The data-providing apparatus comprises: first acquisition means for acquiring a scenario consisting of a plurality of scenes, each lasting for a given time, in response to a demand made by the data-processing apparatus; second acquisition means for acquiring a given number of image data items that will be used in the scenario, in response to a demand made by the data-processing apparatus; means for selecting prescribed ones of the image data items acquired by the second acquisition means and for allocating the prescribed image data items to the scenes of the scenario acquired by the first acquisition means; and correction means for correcting the image data items selected in accordance with the prescribed image data items that have been allocated to the scenes of the scenario.

In the data-providing apparatus according to claim 1, prescribed special effects may be allocated to the prescribed ones of the scenes of the scenario, and effect-applying means may be provided for applying the special effects to the image data items allocated to the scenes.

The data-providing apparatus may further comprise transmission control means for controlling the transmission of the image data generated by applying the special effects to the image data items by the effect-applying means.

The data-providing apparatus may further comprise recording control means for controlling the recording of the image data generated by applying the special effects to the image data items by the effect-applying means.

In the data-providing apparatus according to claim 1, the first acquisition means acquires a scenario selected from a plurality of scenarios.

In the data-providing apparatus according to claim 5, different pieces of music may be allocated to the plurality of scenarios.

In the data-providing apparatus, the second acquisition means may acquire the image data items supplied from the data-processing apparatus.

In the data-providing apparatus according to claim 1, the second acquisition means may acquire the image data items supplied from another data-processing apparatus.

A data-providing method according to this invention is designed for use in a data-providing apparatus for editing image data in response to a demand transmitted from a data-processing apparatus through a network. The data-providing method comprises: a first acquisition step of acquiring a scenario consisting of a plurality of scenes, each lasting for a given time, in response to a demand made by the data-processing apparatus; a second acquisition step of acquiring a given number of image data items that will be used in the scenario, in response to a demand made by the data-processing apparatus; a step of selecting prescribed ones of the image data items acquired in the second acquisition step and for allocating the prescribed image data items to the scenes of the scenario acquired in the first acquisition step; and a correction step of correcting the image data items selected in accordance with the prescribed image data items that have been allocated to the scenes of the scenario.

A program-storing medium according to the present invention stores a computer-readable program being for use in a data-providing apparatus for editing image data in response to a demand transmitted from a data-processing apparatus through a network. The program comprises: a first acquisition step of acquiring a scenario consisting of a plurality of scenes, each lasting for a given time, in response to a demand made by the data-processing apparatus; a second acquisition step of acquiring a given number of image data items that will be used in the scenario, in response to a demand made by the data-processing apparatus; a step of selecting prescribed ones of the image data items acquired in the second acquisition step and for allocating the prescribed image data items to the scenes of the scenario acquired in the first acquisition step; and a correction step of correcting the image data items selected in accordance with the prescribed image data items that have been allocated to the scenes of the scenario.

A data-providing apparatus, a data-providing method, and a program-storing medium for storing of program used these apparatus and method according to the present invention, a scenario consisting of a plurality of scenes, each lasting for a given time, is acquired in response to a demand made by a data-processing apparatus. A given number of image data items that will be used in the scenario are acquired, too, in response to a demand made by the data-processing apparatus. Prescribed ones of the image data items acquired are selected and allocated to the scenes of the scenario acquired. The image data items selected are corrected in accordance with the prescribed image data items that have been allocated to the scenes of the scenario the scenes of the scenario. This enables the user of the apparatus to edit images easily and quickly.

The other objects of the invention and the advantages of the invention will be obviously understood from the following description of embodiments.

BRIEF DESCRIPTION OF THE DRAWINGS

FIG. 3 is a diagram showing the data items stored in a user data management database;

FIG. 4 is a diagram illustrating the data items stored in a user video-data management database;

FIG. 5 is a diagram showing the data items stored in a shared video-data management database;

FIG. 17 is a diagram showing the objects to be edited;

BEST MODE FOR CARRYING OUT THE INVENTION

Figure 1:
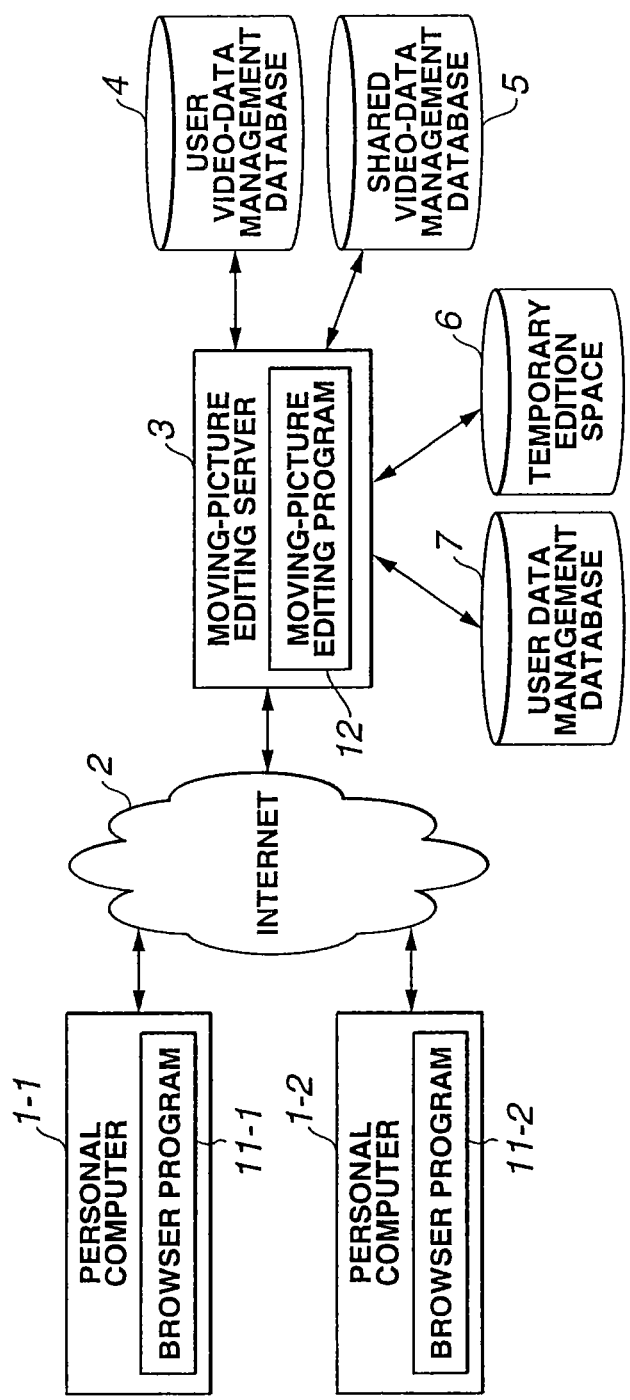
FIG. 1 is a block diagram showing a moving-picture editing system according to the present invention.

An data-providing apparatus and a data-providing method, both according to this invention, are configured for use in such a moving-picture editing system as illustrated in FIG. 1. In the moving-picture editing system, a personal computer 1-1 executes a browser program 11-1, demanding a log-in into a moving-picture editing server 3 through the Internet 2. Thereafter, the personal computer 1-1 displays a screen image that is used to edit the data stored in a user video-data management database 4, in accordance with the data supplied from the moving-picture editing server 3. The data (hereinafter referred to as "original data") to be edited includes a moving picture, a still picture, sound or the like.

The personal computer 1-1 transmits the data it stores, such as a moving picture, a still picture or sound, to the moving-picture editing server 3 through the Internet. The moving-picture editing server 3 records the original data it has received, i.e., the moving picture, still picture or sound, into the user video-data management database 4. In the database 4, the original data is recorded in an area allocated to the user of the database 4, in association with the user ID of the user of the personal computer 1-1.

Of the original data items recorded in the user video-data management database 4, any one selected may be used also in, for example, another personal computer 1-2. (Hereinafter, the data item selected will be referred to as "shared data item".) To this end, the personal computer 1-1 causes the server 3 to impart an attribute to the shared data item.

Each original data item recorded in the user video-data management database 4 has other attributes. One attribute describes whether any other user can utilize the data item (that is, whether the data item is shared or not). Another attribute describes whether any other user needs to pay for the data item. Another attributes are the title name and genre of the data item.

To use a shared original data item, the personal computer 1-1 displays a screen image based on the data supplied from the moving-picture editing server 3. The screen image is used to edit the shared original data item that is recorded in the user video-data management database 4.

The personal computer 1-1 causes the moving-picture editing server 3 to edit the original data recorded in the user video-data management database 4 in association with the user ID or the shared original data. Then, the personal computer 1-1 causes the user video-data management database 4 to record the moving-picture data generated by editing the original data or the shared original data.

The personal computer 1-2 executes a browser program 11-2 and demands a log-in into the moving-picture editing server 3 through the Internet 2. After the log-in into the server 3 is accomplished, the personal-computer 1-2 displays a screen image based on the data supplied from the moving-picture editing server 3. The screen image is used to edit the original data the user video-data management database 4 records.

The personal computer 1-2 transmits the data recorded in it, i.e., the moving picture, still picture or sound, to the moving-picture editing server 3 through the Internet 2. The moving-picture editing server 3 stores the original data it has received, i.e., the moving picture, still picture or sound, into the user video-data management database 4. In the database 4, the original data is recorded in an area allocated to the user of the database 4, in association with the user ID of the user of the personal computer 1-2.

Of the original data items recorded in the user video-data management database 4, any one selected may be used also in, for example, the personal computer 1-1. To this end, the personal computer 1-2 causes the server 3 to impart an attribute to the shared data item.

Each original data item recorded in the user video-data management database 4 has other attributes. One attribute describes whether any other user can utilize the data item (that is, whether the data item is shared or not). Another attribute describes whether any other user need to pay for the data item. Another attributes are the title name and genre of the data item.

To use a shared original data item, the personal computer 1-2 displays a screen image based on the data supplied from the moving-picture editing server 3. The screen image is used to edit the shared original data item that is recorded in the user video-data management database 4.

The personal computer 1-2 causes the moving-picture editing server 3 to edit the original data recorded in the user video-data management database 4 in association with the user ID or the shared original data. Then, the personal computer 1-2 causes the user video-data management database 4 to record the moving-picture data generated by editing the original data or the shared original data.

The moving-picture editing server 3 executes a moving-picture editing program 12. When the personal computer 1-1 demands a log-in via the Internet 2, the moving-picture editing server 3 determines whether a log-in should be allowed, from the data about the user of the personal computer 1-1. Note that the data about the computer user is recorded in a user data management database 7.

The moving-picture editing server 3 receives a log-in demand transmitted via the Internet 2 from the personal computer 1-2. Then, the moving-picture editing server 3 determines whether the log-in thus demanded should be allowed, from the data about the user of the personal computer 1-2, which is recorded in the user data management database 7.

The moving-picture editing server 3 receives the data representing a moving picture, a still picture or sound, from the personal computer 1-1 or 1-2 via the Internet 2. The moving-picture editing server 3 causes the user video-data management database 4 to record the data received (i.e., the moving picture, still picture or sound). The data is recorded as original data that is associated with the user ID.

When the moving-picture editing server 3 receives an edition demand from the personal computer 1-1 through the Internet 2, it provides a memory space for edition, in a temporary edition space 6. The memory space thus provided will be used to edit data for the personal computer 1-1. Similarly, when the moving-picture editing server 3 receives an edition demand from the personal computer 1-2 through the Internet 2, it provides a memory space for edition, in a temporary edition space 6, which will be used to edit data for the personal computer 1-2.

In response to a demand made by the personal computer 1-1, the moving-picture editing server 3 reads the original data from the user video-data management database 4. The server 3 then loads the data into the memory space provided (for the personal computer 1-1) in the temporary edition space 6. (In other words, the moving-picture editing server 3 records the data in such a condition that the data may be edited.) The original data loaded in the memory space includes not only the data possessed by the user of the personal computer 1-1, but also the data (i.e., shared data) that the user of the personal computer 1-2 allows the user of the personal computer 1-1 to use.

The moving-picture editing server 3 edits the original data loaded in the memory space provided in the temporary edition space 6, generating moving-picture data. The server 3 has data-processing ability high enough to edit the original data representing a moving picture or the like. It edits the data at high speed, said data including special-effect data items the personal computer 1-1 cannot edit.

The moving-picture editing server 3 records the moving-picture data, thus edited, into the memory space provided for the personal computer 1-1, in the temporary edition space 6.

In response to the demand made by the personal computer 1-1, the moving-picture editing server 3 transmits the moving-picture data it has edited, to the personal computer 1-1, which displays the moving picture. Further, in response to the demand made by the personal computer 1-1, the server 3 records the moving-picture data, i.e., original data, in the user video-data management database 4. More specifically, the server 3 records the data in the area allocated to the user of the database 4, in association with the user ID of the user of the personal computer 1-1.

In response to the demand made by the personal computer 1-2, the moving-picture editing server 3 reads the original data from the user video-data management database 4. The server 3 then loads the original data into the memory space provided (for the personal computer 1-2) in the temporary edition space 6. (That is, the data is recorded in such a condition that it may be edited by the moving-picture editing server 3.)

The original data loaded in the memory space includes not only the data possessed by the user of the personal computer 1-2, but also the data (i.e., shared data) that the user of the personal computer 1-1 allows the user of the personal computer 1-2 to use.

The moving-picture editing server 3 edits the original data loaded in the memory space provided in the temporary edition space 6, generating moving-picture data. The server 3 records the moving-picture data obtained by the edition, into the memory space provided for the personal computer 1-2 in the temporary edition space 6.

In response to a demand made by the personal computer 1-2, the moving-picture editing server 3 transmits the moving-picture data, thus edited, to the personal computer 1-2, which displays the moving picture. Further, the server 3 records the moving-picture data, or original data, it has received, into the user video-data management database 4, in response to a demand made by the personal computer 1-2. In the database 4, the data is recorded in an area allocated to the user of the database 4, in association with the user ID of the user of the personal computer 1-2.

When the attribute of the original data is transmitted from the personal computer 1-1 or 1-2 to the moving-picture editing server 3, the server 3 updates the attribute of the original data recorded in the user video-data management database 4. When an attribute is set in the original data, indicating that the original data is shared data, the moving-picture editing server 3 records data about the original data, into a shared video-data management database 5.

The user video-data management database 4 comprises a memory space and a database engine. The memory space is, for example, the hard disc incorporated in the moving-picture editing server 3. The database engine is executed by the moving-picture editing server 3. The database 4 is divided into areas of a prescribed size, each allocated to one user. Each area is provided to record original data, the user ID of the user who possesses the original data, the data ID identifying the original data, and the like.

The shared video-data management database 5 comprises a memory space such as the hard disc provided in the moving-picture editing server 3, and a database engine executed by the moving-picture editing server 3. The database 5 records the data ID of the shared original data, the IDs of the users who share the shared original data, and the like. In other words, the shared video-data management database 5 records the data identifying the original data and the data concerning the same; it does not record the original data per se.

The temporary edition space 6 comprises a memory space such as the hard disc provided in the moving-picture editing server 3, and a memory space such as a main memory provided in the moving-picture editing server 3. The space 6 records the original data to be edited and the moving-picture data obtained by editing the original data. In the memory space of the temporary edition space 6, an area of a specific size is provided for the personal computer 1-1 or 1-2 that has demanded that the moving-picture editing server 3 should edit the original data. More precisely, such an area is prepared so that the original data may be loaded into the moving-picture editing server 3 (or, may be temporarily stored therein) and may then be edited. The original data loaded in the memory space (temporarily stored to edit) and the memory space will be eliminated in the temporary edition space 6 when the moving-picture editing server 3 finishes editing the original data.

The moving-picture editing server 3 controls the temporary edition space 6. Neither the personal computer 1-1 nor the personal computer 1-2 can make a direct access to the temporary edition space 6.

The user data management database 7 comprises a memory space such as the hard disc provided in the moving-picture editing server 3, and a database engine executed by the moving-picture editing server 3. The database 7 records the user IDs identifying the users of the personal computer 1-1 and 1-2, the passwords of these users, and the like.

In the description that follows, the personal computers 1-1 and 1-2 will be generally referred to as "personal computer 1" unless they need to be distinguished from each other. Similarly, browser programs 11-1 and 11-2 will be generally called "browser program 11" unless they need to be distinguished form each other.

Figure 2:
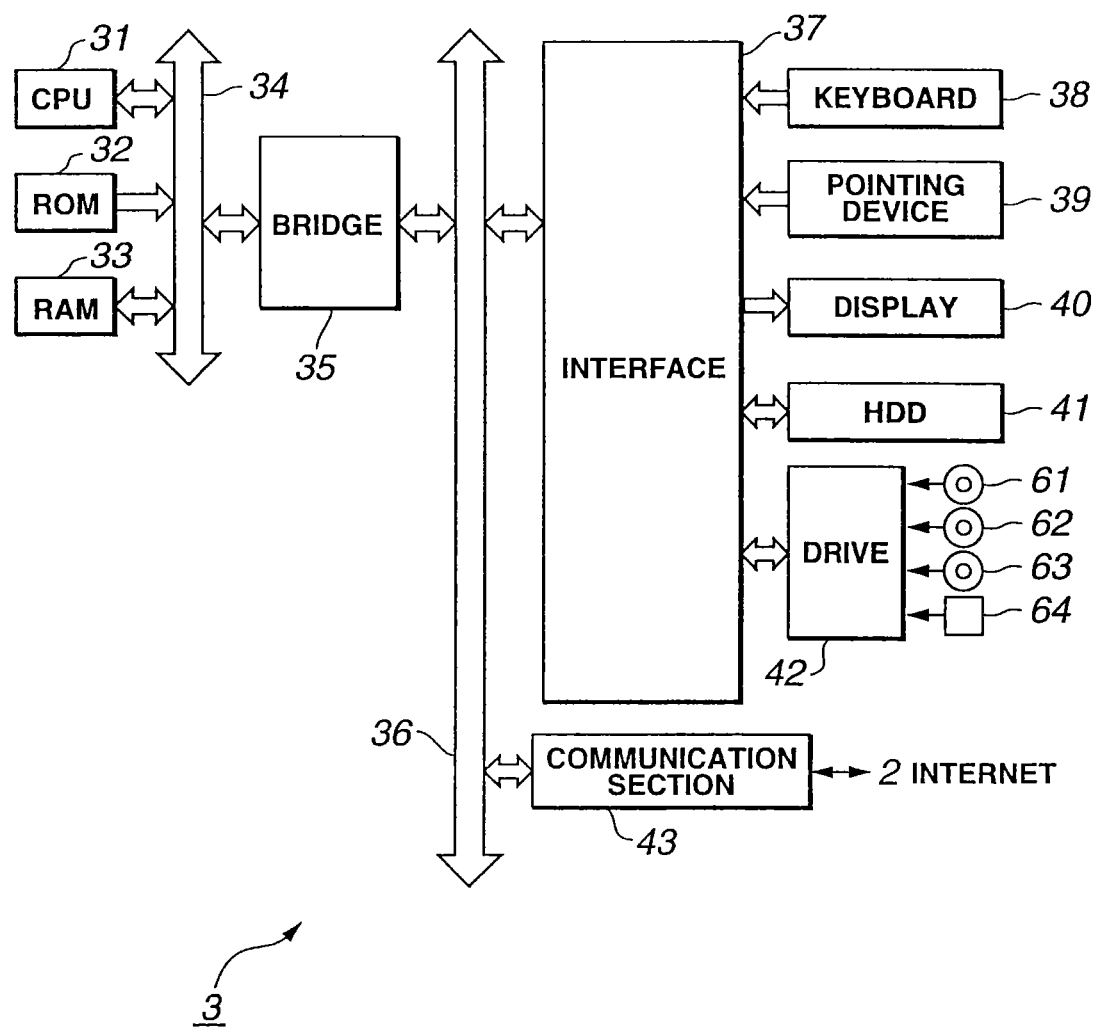
FIG. 2 is a diagram explaining a server used to edit moving pictures.

FIG. 2 is a diagram illustrating the moving-picture editing server 3. In the server 3, the CPU (Central Processing Unit) 31 executes various application programs and the OS (Operating System). The application programs include a database engine and the above-mentioned moving-picture editing program 12.

The ROM (Read-Only Memory) 32 stores the fixed parts of the programs and arithmetic parameters that the CPU 31 utilizes. The RAM (Random-Access Memory) 33 is provided to store the programs that the CPU 31 uses to perform its function and the parameters that change while the CPU 31 is operating. These components are connected to one another by a host bus 34, which is a CPU bus or the like.

The host bus 34 is connected by a bridge 35 to an external bus 36. The bus 36 is, for example, a PCI (Peripheral Component Interconnect/Interface) bus.

The user operates the keyboard 38 to input various commands to the CPU 31. The user operates the pointing device 39 to move the pointer on the screen of the display 40 and select a menu item. The display 40 is a liquid crystal display, a CRT (Cathode-Ray Tube) or the like. The display 40 is provided to display various data items in the form of text data or images. The HDD (Hard Disc Drive) 41 drives hard discs to record on the hard discs the programs the CPU 31 executes and the data the CPU 31 processes, and to reproduces the programs and the data from the hard discs.

The drive 42 reads data and programs from a magnetic disc 61, an optical disc 62, a magneto-optical disc 63 and a semiconductor memory 64. The data and programs, thus read, are supplied to the RAM 33 through the interface 37, the external bus 36, bridge 35 and host bus 34.

The components, ranging from the keyboard 38 to the drive 42, are connected to the interface 37. The interface 37 is connected to the CPU 31 by the external bus 36, bridge 35 and host bus 34.

The communication section 43 is connected to the Internet 2. The section 43 stores the data supplied from the CPU 31 or the HDD 41, in the form of packets of a particular format. (The data causes the browser program 11-1 or 11-2 to display, for example, a screen image showing an edition menu.) The communication section 43 may transmit the packets through the Internet 2. The section 43 receives packets through the Internet 2 and outputs the data (e.g., a moving picture, a still picture, sound or the like) contained in the packets, to the CPU 31, RAM 33 or the HDD 41.

The communication section 43 is connected to the CPU 31 by the external bus 36, bridge 35 and host bus 34.

The personal computers 1-1 and 1-2 have a structure similar to that of the moving-picture editing server 3. Therefore, their structure will not be described.

FIG. 3 is a diagram that shows the data items stored in the user data management database 7, i.e., the user IDs identifying the users of the personal computers 1-1 and 1-2, the passwords of these users, and the like. The user data management database 7 records the users' passwords, the directory data items representing the user areas in the database 4, the service charges to be paid by the users and the like, in association with the user IDs. (The service fees are, for example, the amounts that the users need to pay for the service they have received for a specific period of time.)

As can be understood from FIG. 3, the user data management database 7 records various data items. More precisely, the database 7 records the password "*****" of a user whose user ID is aaaaa, directory data "user-aaaaa" representing the user area of the user, and the service charge of 2,000 yen the user should pay. (The password is actually a train of characters such as alphabet letters, numerals or special characters.) The user area is provided in the user video-data management database 4.

As seen from FIG. 3, too, the user data management database 7 records the password "*****" of a user whose user ID is bbbbb, directory data "user-bbbbb" representing this user area of the user, which is provided in the user video-data management database 4, and the service charge of 1,800 yen this user needs to pay.

Similarly, the user data management database 7 records the password "*****" of a user whose user ID is ccccc, directory data "user-ccccc" representing this user area of the user, which is provided in the user video-data management database 4, and the service charge of 3,500 yen the user should pay.

The user IDs, passwords and directory data are recorded in the user data management database 7 by the manager responsible for the moving-picture editing server 3, before the user of the personal computer 1 starts using the moving-picture editing system.

FIG. 4 is a diagram that shows the data, i.e., the data ID and the user ID that identify the original data recorded in the user video-data management database 4.

The user video-data management database 4 records a file containing original data representing a moving picture, a still picture and sound. The database 4 records various data items, too, in association with the data ID that identifying the original data. Among the various data items are: the user ID identifying the user who owns the original data; the directory of the file containing the original data; the name of the file; the title of the original data; the category of the original data; the introductory comment on the original data; the shared-data flag permitting or prohibiting the use of the original data; a charge flag indicating whether the user must pay for the original data; and the amount the user should pay for the original data that is not free of charge.

FIG. 4 illustrates the data items that may be recorded in the user video-data management database 4. In the case shown in FIG. 4, the database 4 records the user ID "aaaaa" of the user who owns the original data having data ID "xxxxx," and the directory data "user-aaaaa-movie1" representing the directory at which the file containing the original data having data ID Axxxxx≅. Further, the database 4 records the name "golf.mov" of the file containing the original data having data ID Axxxxx≅, the tile "golf" of the original data having data ID Axxxxx≅, the category "sports" of the original data having data ID Axxxxx≅, the introductory comment "******" on the original data having data ID Axxxxx≅, and the shared-data flag "0" that prohibits any other user from utilizing the original data. (In practice, the introductory comment is a train of characters such as Hiragana, Katakana, Chinese characters, alphabet letters, numerals or special characters.)

The user video-data management database 4 records the user ID "aaaaa" of the user who owns the original data having data ID "yyyyy," and the directory data "user-aaaaa-movie1" representing the directory at which the file containing the original data having data ID Ayyyyy≅. Further, the database 4 records the name "fish.mov" of the file containing the original data having data ID Ayyyyy≅, the tile "fishing" of the original data having data ID Ayyyyy≅, the category "sports" of the original data having data ID Ayyyyy≅, the introductory comment "******" on the original data having data ID Ayyyyy≅, the shared-data flag "1" that allows any other user from utilizing the original data, and the charge flag "0" indicating the any other user can use the original data for free.

Further, the user video-data management database 4 records the user ID "aaaaa" of the user who owns the original data having data ID "zzzzz," and the directory data "user-aaaaa-movie2" representing the directory at which the file containing the original data having data ID Azzzzz≅. The database 4 records the name "travel.mov" of the file containing the original data having data ID Azzzzz≅, the tile "travel" of the original data having data ID Azzzzz≅, the category "travel" of the original data, the introductory comment "******" on the original data having data ID Azzzzz≅, the shared-data flag "1" that allows any other user from utilizing the original data, and the charge flag "1" indicating the any other user can use the original data for 200 yen.

If any other user edit the original data available for 200 yen, an amount of 200 yen is added to the service charge that this other user should pay. At the same time, the same amount is reduced from the service charge that the user who owns the original data should pay. Note that the service charge any user must pay may be reduced to zero and is not be less than zero.

Nonetheless, the service charge a user must pay may be less than zero. A user may own original data that is an advertisement moving picture and agrees to pay a particular amount of money to any other user who uses this moving picture. In this case, when any other user uses the moving picture, the service charge he or she should pay decreases by that amount, while the service charge the user owning this moving picture should pay increases. In other words, the user who owns the advertisement moving picture pays money to any other user who uses the advertisement moving picture.

If any user uses original data all users share, a prescribed number of points may be added or subtracted from the account of the user and the account of any other user. In this case, the manager responsible for the moving-picture editing server 3 accepts, at the web server, the demand made by the user of the personal computer 1, so that the user may exchange his or her points for any service or any merchandise he or she wants.

Moreover, the user video-data management database 4 record the credit number of any user, in association with the user ID of the user, for collect fees from the user.

FIG. 5 is a diagram showing the data items stored in the shared video-data management database 5, such as user IDs and data IDs, which identify the users of the personal computers 1-1 and 1-2. To be more specific, the shared video-data management database 5 records data IDs, each identifying original data having a shared-data flag set at "1" (i.e., shared original data), user IDs, each identifying the owner of the original data, and a charge flag indicating whether any other user must pay for the original data.

As seen from FIG. 5, the shared video-data management database 5 records the user ID "aaaaa" of the user who owns the original data having data ID "yyyyy" and the charge flag "0" indicating that any other user can use the original data for free.

The shared video-data management database 5 records the user ID "aaaaa" of the user who owns the original data having data ID "zzzzzz" and the charge flag "1" indicating that any other user can use the original data for a particular amount of money.

The shared video-data management database 5 records the user ID "ccccc" of the user who owns the original data having data ID "hhhhh" and the charge flag "1" indicating any other user can use the original data for a particular amount of money.

The screen image that the personal computer 1 displays when it causes the moving-picture editing server 3 to edit original data such as a moving picture, a still picture or sound.

Figure 6:
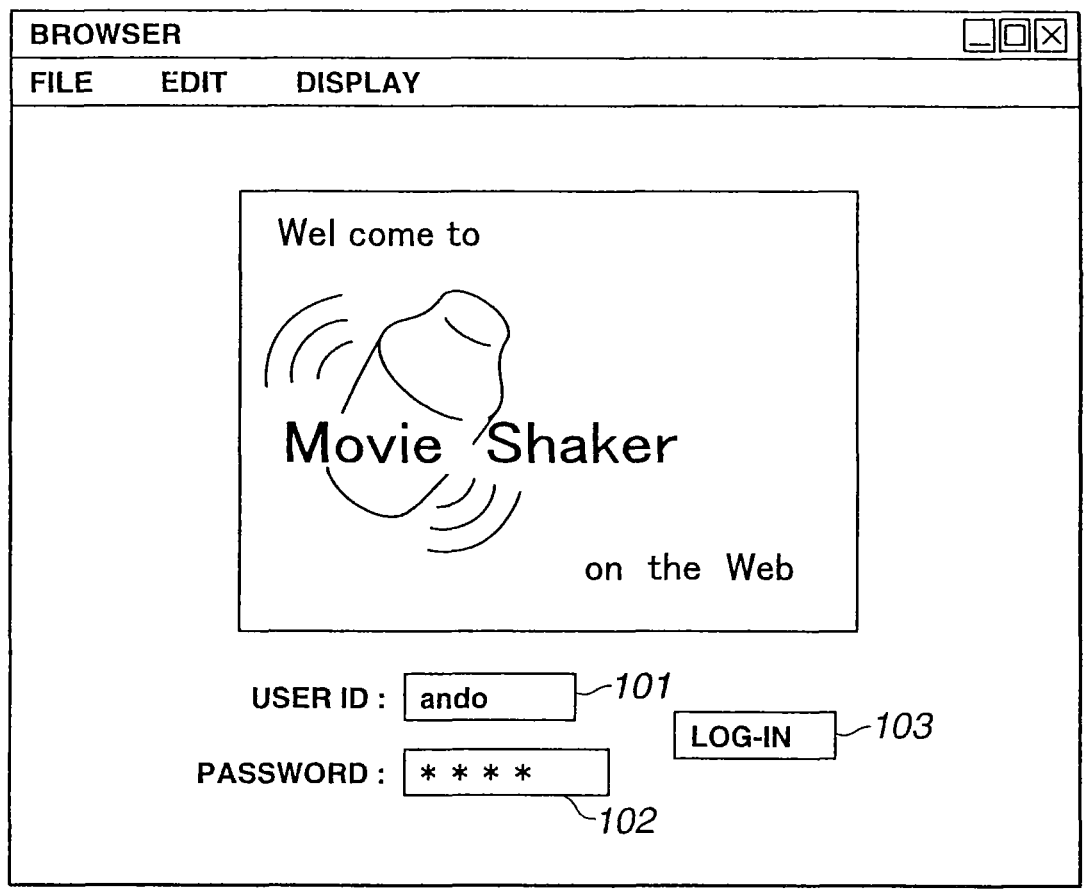
FIG. 6 is a diagram depicting a screen image displayed a personal computer may display.

FIG. 6 is a diagram depicting the screen image that the browser program 11 causes the personal computer 1 to display when the computer 1 it is connected to the moving-picture editing server 3 via the Internet 2.

The initial screen image, i.e., the first image displayed, includes two fields 101 and 102 and a button 103. A user ID shall be input in the field 101, and a password in the field 102. The button 103 shall be clicked to transmit a log-in demand to the moving-picture editing server 3. As FIG. 6 illustrates, the user ID "ano" is input in the field 101, identifying the user of the personal computer 1. The password "****" is input in the field 102, identifying the user of the personal computer 1. (The password is actually a train of characters such as alphabet letters, numerals or special characters.)

When the button 103 is clicked after the user ID and the password have been input in the fields 101 and 102, the browser program 11 transmits a log-in demand to the moving-picture editing server 3 through the Internet 2, together with the user ID and password that have been input.

Upon receipt of the log-in demand, the moving-picture editing server 3 determines whether the user ID and the password, both input, are registered in the user data management database 7. If neither the user ID nor the password is not registered in the database 7, the moving-picture editing server 3 transmits data to the personal computer 1 via the Internet 2, said data causing the computer 1 to display a message informing that no log-in is possible. Then, the server 3 will not edit any data representing a moving picture.

If the user ID and the password the moving-picture editing server 3 has received are registered in the database 7, the server 3 reads the original data associated with the user ID, from the user video-data management database 4. Next, the moving-picture editing server 3 generates a thumbnail. (If the original data represents a moving picture, the server 3 generates the thumbnail from, for example, the initial screen image. The thumbnail is generated in accordance with the format of the data. If the data is of JPEG (Joint Photographic Experts Group) format, the thumbnail data is extracted from the header of the file.) The server 3 transmits the screen-image data for displaying the thumbnail, to the personal computer 1.

Figure 7:
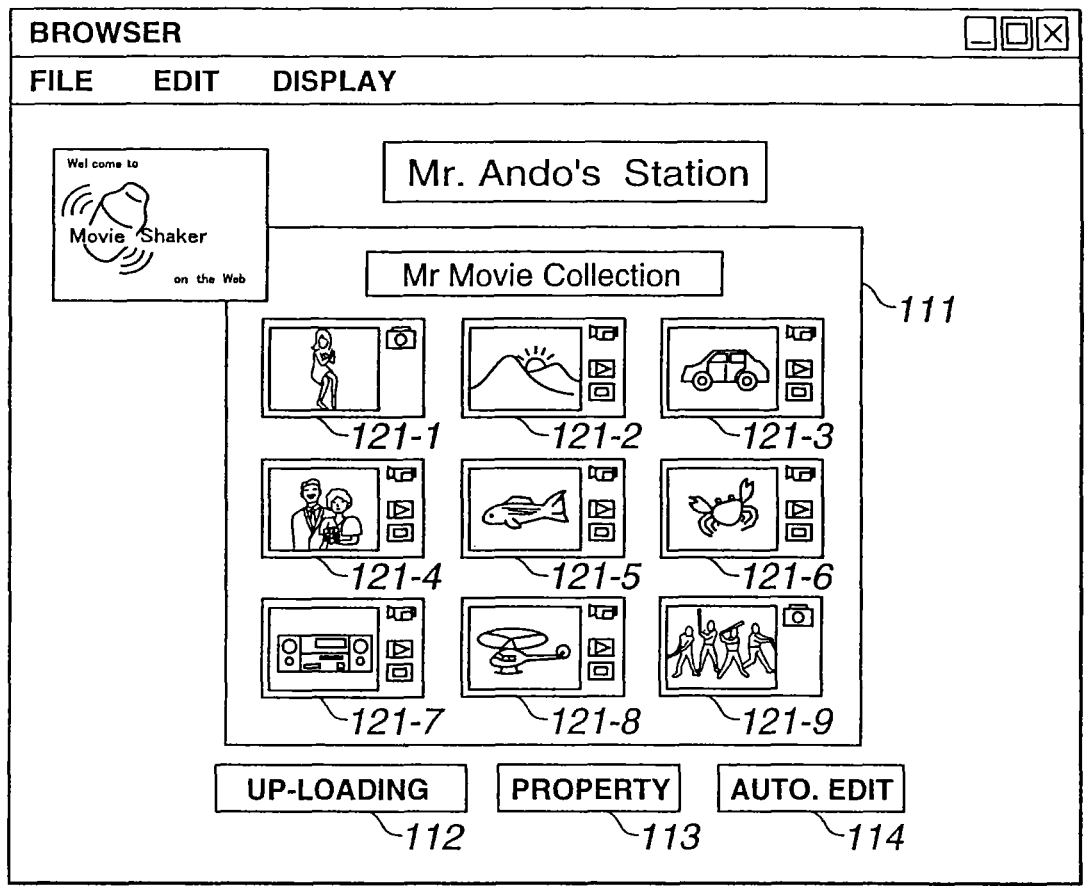
FIG. 7 is a diagram showing an image the personal computer may display.

FIG. 7 is a diagram showing the user-video, thumbnail screen image that the browser program 11 causes the personal computer 1 to display when the computer 1 receives data representing a screen image showing thumbnails that correspond to the original data items owned by the user of the personal computer 1.

The user-video, thumbnail screen image includes one field 111 and three buttons 112 to 114. Thumbnails will be displayed in the field 111. The button 112 is clicked to transmit data, such as a moving picture, a still picture or sound, to the moving-picture editing server 3. The button 113 is clicked to edit the attribute of the original data recorded in the user video-data management database 4. The button 114 is clicked to cause the moving-picture editing server 3 to edit a moving picture.

Arranged in the field 111 are thumbnail-displaying fields 121-1 to 121-9. In each thumbnail-displaying field, the thumbnail corresponding to an original data item and the icon representing the attribute of the data item shall be displayed.

The browser program 11 is executed to display various thumbnails and icons associated with the thumbnails, respectively. As shown in FIG. 7, the thumbnail of an original data item and an icon representing a camera are displayed in the thumbnail-displaying field 121-1. The icon indicates that the thumbnail corresponds to an original data item that represents a still picture.

The thumbnail of another data item and three icons are displayed in the thumbnail-displaying field 121-2 by executing the browser program 11. The first icon is an image of a video camera, indicating that the thumbnail corresponds to an original data item that represents a moving picture. The second icon is a playback mark, informing that the moving picture can be played back or reproduced. The third icon is a playback stop mark, indicating that the playback of the moving picture may be stopped.

Similarly, the thumbnail of a data item and an icon or icons associated with the thumbnail are displayed in each of the other thumbnail-displaying field 121-3 to 121-9 by executing the browser program 11.

Figure 8:
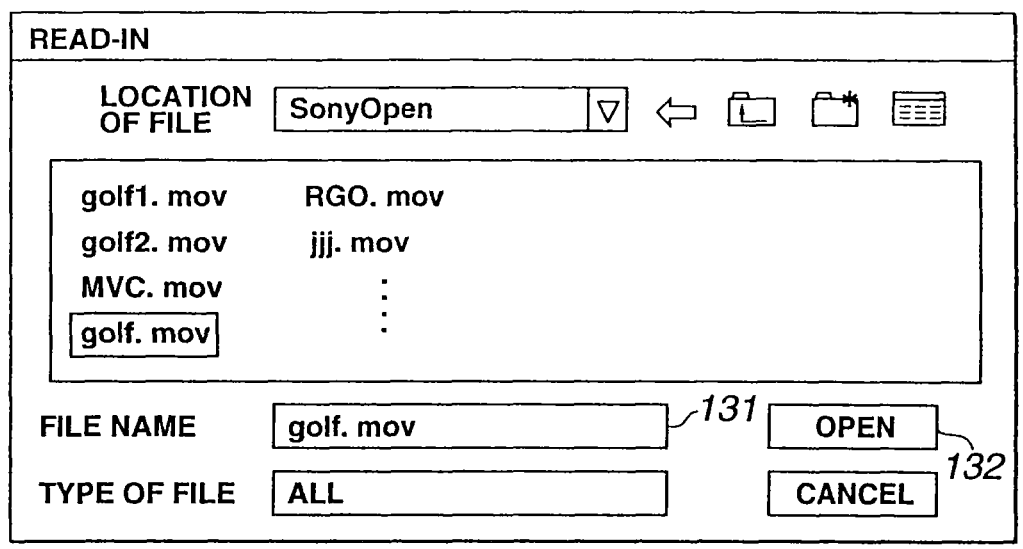
FIG. 8 is a diagram representing a screen image the personal computer may display.

When the button 112 is clicked to transmit data representing a moving picture, a still picture or sound, to the moving-picture editing server 3, the browser program 11 is executed to display the dialog box illustrated in FIG. 8. As shown in FIG. 8, the dialog box has a field 131 and a button 132. The name of the file containing the data to transmit shall be input in the field 131. The bottom 132 is clicked to start transmitting the data.

As shown in FIG. 8, the file name "golf.mov" is input in the field 131. When the button 132 is clicked, the browser program 11 is executed, whereby the data stored in the file having the name "golf.mov" is transmitted to the moving-picture editing server 3 through the Internet 2, in accordance with, for example, HTTP (Hyper Test Transfer Protocol).

The moving-picture editing server 3 records the data received from the personal computer 1 via the Internet 2, in the user video-data management database 4. The data recorded in the database 4 will be used as original data that is owned by the user of the personal computer 1.

Any one of the thumbnail-displaying fields 121-1 to 121-9 (FIG. 7) may be selected and the button 113 (FIG. 7) may then be clicked to edit the attribute of the original data recorded in the user video-data management database 4. If this is the case, the browser program 11 is executed, displaying a dialog box that will be used to edit the attribute of the original data corresponding to the thumbnail-displaying field selected.

Figure 9:
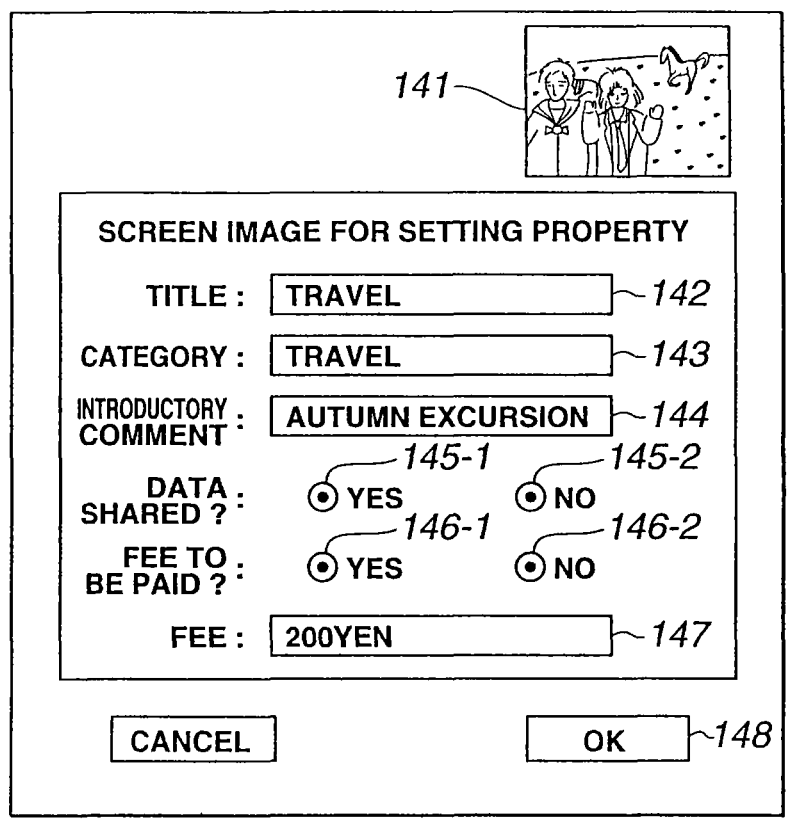
FIG. 9 is a diagram depicting a screen image the personal computer may display.

FIG. 9 is a diagram depicting the dialog box that will be used to edit the attribute of the original data corresponding to the thumbnail. As FIG. 9 shows, this dialog box has four fields 141 to 144 and two buttons 145-1 and 145-2. The thumbnail of original data shall be displayed in the first field 141. The title of the original data shall be input in the second field 142. The category of the original data shall be input in the third field 143. The introductory comment on the original data shall be input in the fourth field 144. The button 145-1 is clicked to designate the original data as one that user can share with any other user. The button 145-2 is clicked to designate the original data as one that the users cannot share. (Only one of the buttons 145-1 and 145-2 can be clicked at a time.)

The dialog box shown in FIG. 9 has other buttons 146-1, 146-2 and 148 and another field 147. The button 146-1 is clicked to designate the shared original data as one for which any user should pay. The button 146-2 is clicked to designate the shared original data that can be used free. (Only one of the buttons 146-1 and 146-2 can be clicked at a time.) If the fee for the shared original data shall be input in the field 147. The button 148 is clicked to start transmitting the attribute of the original data.

As shown in FIG. 9, "travel" is input in the field 142, as the title of the original data. "Travel" is input in the field 143, too, as the category of the original data. "Autumn excursion" is input in the field 144, as the introductory comment on the original data. In the dialog box of FIG. 9, the button 145-1 is clicked, designating the original data as shared data, the button 146-1 is clicked, designating the shared original data as one for which any user should pay. The fee of 200 yen is input in the field 147.

The button 148 may be clicked in the condition illustrated in FIG. 9. In this case, the browser program 11 outputs the attribute that corresponds to the data items input in the fields 142 to 147. This attribute is transmitted from the personal computer 1 through the Internet 2 to the moving-picture editing server 3.

The moving-picture editing server 3 stores the same into the user video-data management database 4. In the database 4, the attribute is recorded in association with the data ID of the original data, as has been described with reference to FIG. 4.

Upon receipt of the attribute indicating the original data can share, the moving-picture editing server 3 outputs the data ID identifying the original data, the user ID identifying the user who owns the original data, and the charge flag indicating whether any other user should pay for the original data. The data items the server 3 has output are stored into the shared video-data management database 5.

Figure 10:
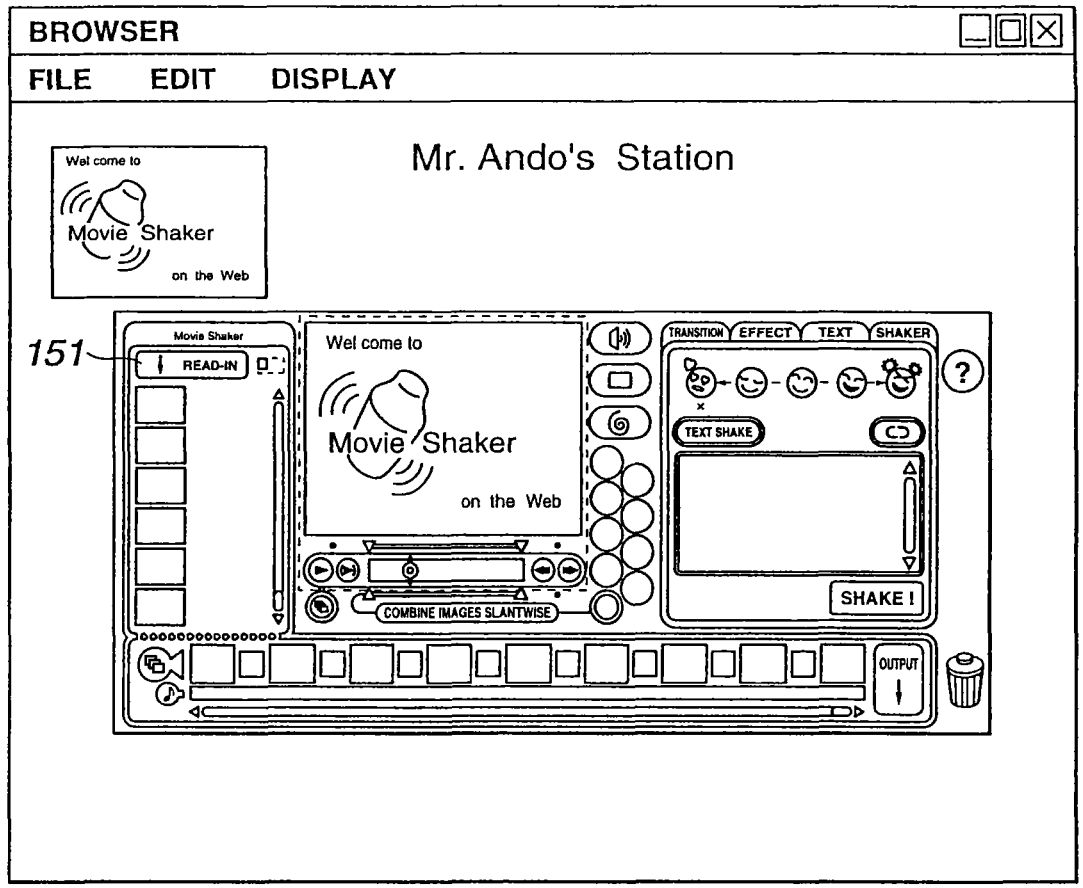
FIG. 10 is a diagram showing a screen image the personal computer may display.

When the button 114 (FIG. 7) is clicked to cause the moving-picture editing server 3 to edit the moving picture, the browser program 11 is executed to display such an edition screen image as is illustrated in FIG. 10. The edition screen image includes a read-in button 151. The read-in button 151 is clicked to start loading the original data into the moving-picture editing server 3 from the user video-data management database 4.

When the read-in button 151 is clicked, the browser program 11 transmits data to the server 3 via the Internet 2, demanding that the original data be loaded into the personal computer 1. Upon receiving this data from the computer 1, the moving-picture editing server 3 reads the original data from the user video-data management database 4. The server 3 generates a thumbnail that corresponds to the data thus read, e.g., a moving picture, a still picture or sound. The server 3 then transmit the data for displaying the thumbnail, to the personal computer 1 through the Internet 2.

Figure 11:
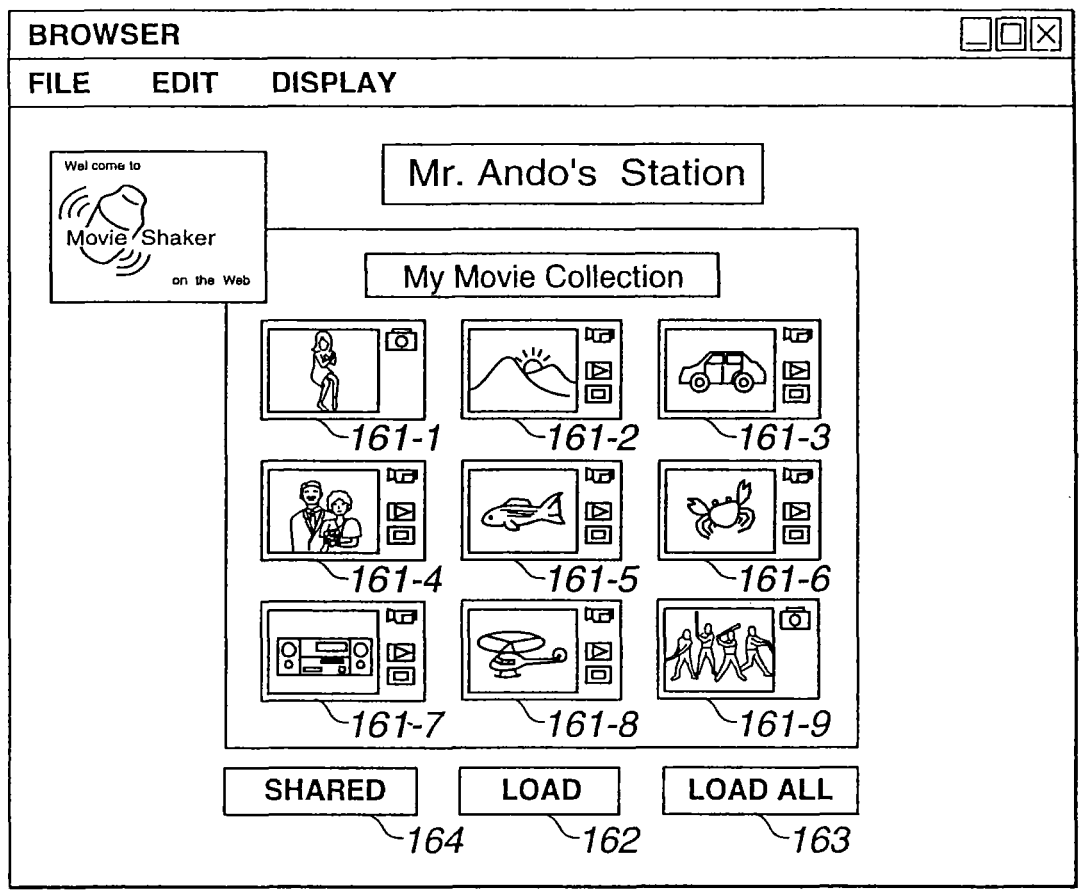
FIG. 11 is a diagram showing a screen image the personal computer may display.

The personal computer 1 receives the data for displaying the thumbnail and displays the screen image shown in FIG. 11, which is used to select a data item that should be edited.

As shown in FIG. 11, this screen image includes thumbnail-displaying fields 161-1 to 161-9 and three buttons 162 to 164. Each of the fields 161-1 to 161-9 is provided to display a thumbnail corresponding to an original data item and at least one icon representing the attribute of the data item. The button 162 is clicked to load any original data item selected, into a working area available in the temporary edition space 6. The button 163 is clicked to load all original data items the user of the computer 1 owns, into a working area of the temporary edition space 6. The button 164 is clicked to start displaying the thumbnail of any shared data item.

The thumbnail-displaying fields 161-3, 161-5 and 161-7 may be selected and the button 162 may then be clicked. If so, the browser program 11 transmits a demand to the moving-picture editing server 3 through the Internet 2, thus demanding that the server 3 should load the original data items corresponding to the thumbnail-displaying fields 161-3, 161-5 and 161-7, into the personal computer 1.

When the moving-picture editing server 3 receives this demand, it secures a memory area in the temporary edition space 6 for use in editing the original data items. Then, the server 3 reads the original data items corresponding to the thumbnail-displaying fields 161-3, 161-5 and 161-7, from the user video-data management database 4. The data items thus read are loaded into the memory area now provided in the temporary edition space 6. (That is, the moving-picture editing server 3 records the data items such that they can be edited.)

When the original data items corresponding to the thumbnail-displaying fields 161-3, 161-5 and 161-7 are loaded from the user video-data management database 4 into the memory area provided in the temporary edition space 6, the moving-picture editing server 3 transmits the data to the personal computer 1 via the Internet 2. This data shows that the original data items corresponding to the thumbnail-displaying fields 161-3, 161-5 and 161-7 have been loaded into the memory area.

Upon receipt of the data showing that the original data items corresponding to the thumbnail-displaying fields 161-3, 161-5 and 161-7 have been loaded into the memory area, the personal computer 1 displays the thumbnails of the original data items in the fields selected on the edition screen.

When the button 163 is clicked, the browser program 11 transmits a demand to the moving-picture editing server 3 via the Internet 2, thus demanding that the server 3 should load all original data the user of the computer 1 possesses.

When the moving-picture editing server 3 receives this demand from the personal computer 1, it secures a memory area in the temporary edition space 6 for use in editing the original data. Then, the server 3 reads all original data the user of the computer owns, from the user video-data management database 4. The original data thus read is loaded into the memory area now provided in the temporary edition space 6.

When all original data the user owns is loaded from the user video-data management database 4 into the memory area provided in the temporary edition space 6, the moving-picture editing server 3 transmits the data to the personal computer 1 via the Internet 2. This data informs the computer 1 that the original data has been loaded into the memory area.

Upon receipt of the data showing that the original data has been loaded into the memory area, the personal computer 1 displays the thumbnails of the data items loaded into the memory area, in the fields selected on the edition screen.

When the button 164 is clicked, the browser program 11 transmits a demand to the moving-picture editing server 3 via the Internet 2, thus demanding that the server 3 should provide the thumbnails of any shared original data.

When the moving-picture editing server 3 receives this demand from the personal computer 1, it reads the data ID of the shared original data from the shared video-data management database 5.

The moving-picture editing server 3 then secures a memory area in the temporary edition space 6 for use in editing the original data. Further, the server 3 reads the original data identified by the data ID read from the database 5, from the user video-data management database 4. The moving-picture editing server 3 generates the thumbnail of the original data read from the database 4. The server 3 then transmits data to the personal computer 1, to make the computer 1 display the thumbnail.

Figure 13:
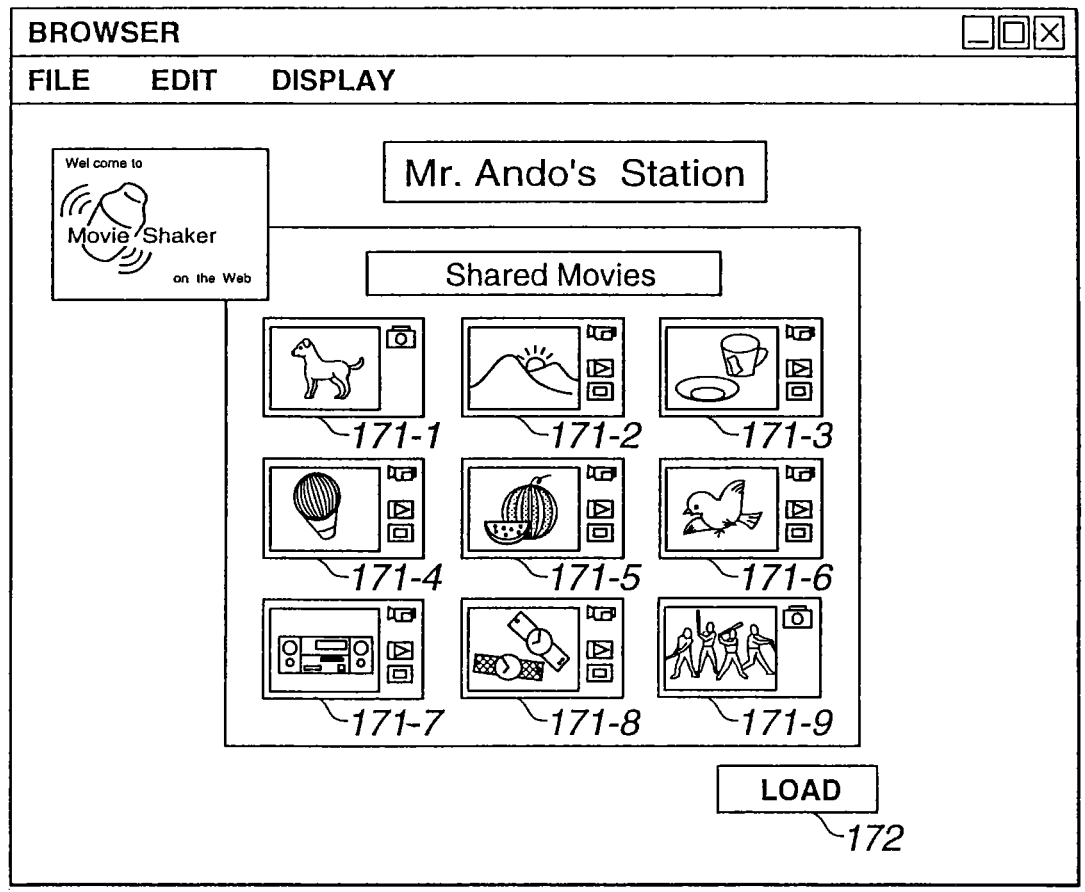
FIG. 13 is a diagram showing a screen image the personal computer may display.

FIG. 13 shows a screen image that the personal computer 1 displays in accordance with the browser program 11 when the computer 1 receives the data from the server 3, in order to display the thumbnail of the shared original data the computer 1 can use. The screen image for displaying the thumbnail of the shared original data includes thumbnail-displaying fields 171-1 to 171-9 and a button 172.

The thumbnail-displaying fields 171-1 to 171-9 are provided, each for displaying the thumbnail of a shared original data item and at least one icon representing the attribute of the shared original data item. The button 172 is clicked to load any original data item selected, into the moving-picture editing server 3.

The thumbnail-displaying fields 171-1, 171-4 and 171-6 may be selected and the button 172 may then be clicked. In this case, the browser program 11 transmits a demand to the moving-picture editing server 3 through the Internet 2, thus demanding that the server 3 should load the original data items corresponding to the thumbnail-displaying fields 171-1, 171-4 and 171-6, into the personal computer 1.

When the moving-picture editing server 3 receives this demand, it secures a memory area in the temporary edition space 6 for use in editing the original data items corresponding to the thumbnail-displaying fields 171-1, 171-4 and 171-6.

Then, the server 3 reads these original data items from the user video-data management database 4. The original data items thus read are loaded into the memory area now provided in the temporary edition space 6.

When the original data items corresponding to the thumbnail-displaying fields 171-1, 171-4 and 171-6 are loaded from the user video-data management database 4 into the memory area provided in the temporary edition space 6, the moving-picture editing server 3 transmits the data to the personal computer 1 via the Internet 2. This data shows that the original data items corresponding to the thumbnail-displaying fields 171-1, 171-4 and 171-6 have been loaded into the memory area.

Upon receipt of the data showing that the original data items corresponding to the thumbnail-displaying fields 171-1, 171-4 and 171-6 have been loaded into the memory area, the personal computer 1 displays the thumbnails of the original data items in the prescribed fields on the edition screen.

Figure 14:
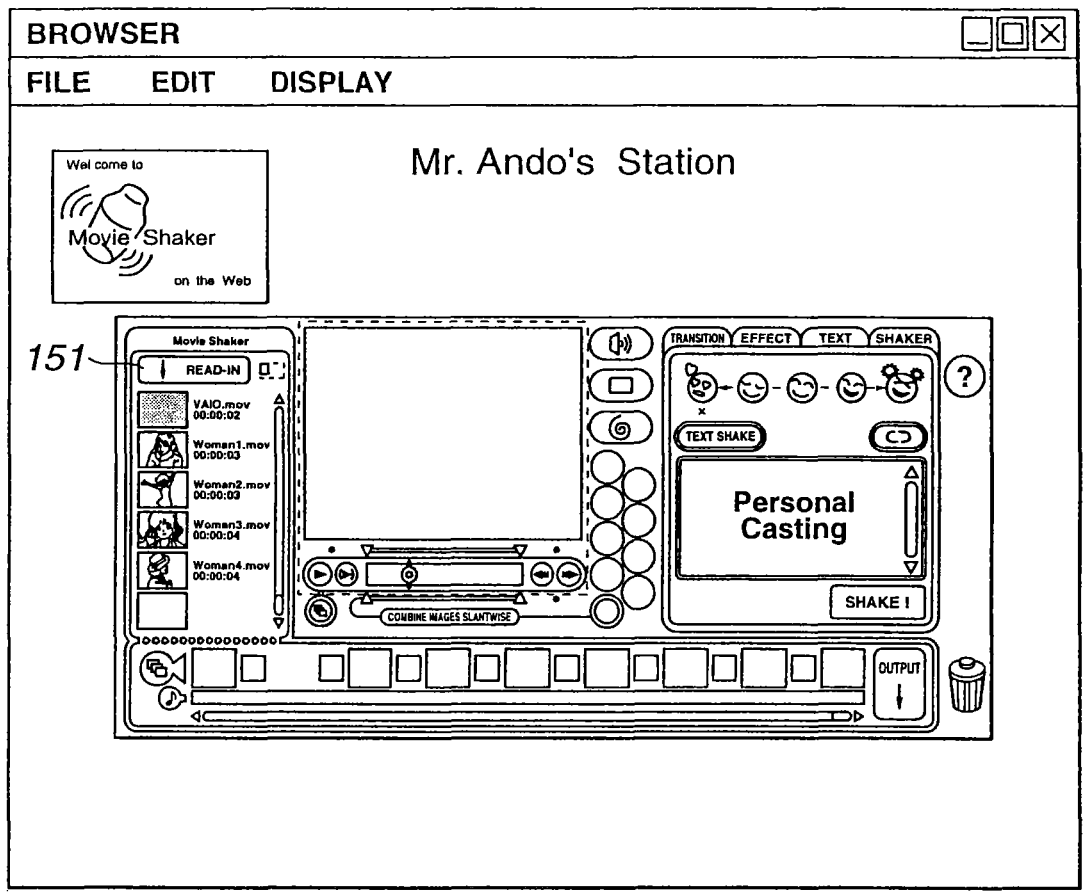
FIG. 14 is a diagram depicting a screen image the personal computer may display.

As shown in FIG. 14, the edition screen includes a window in which the text data is input to be edited. (In the case shown in FIG. 14, the text data is "Personal Casting." The window will be described later in detail, with reference to FIG. 28.)

The edition screen will be described in detail.

Figure 15:
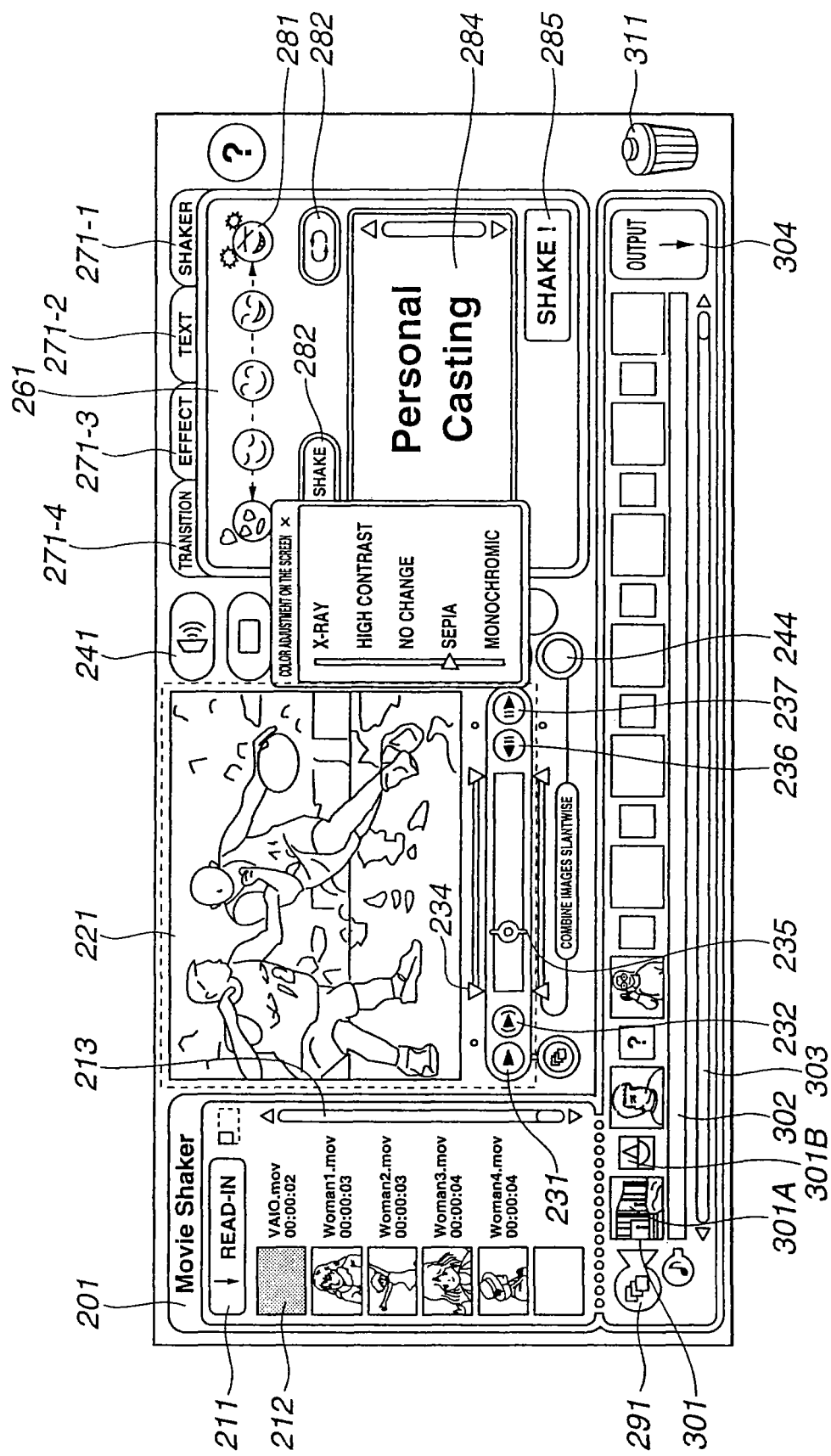
FIG. 15 is a diagram illustrating a screen image the personal computer may display.
Figure 16:
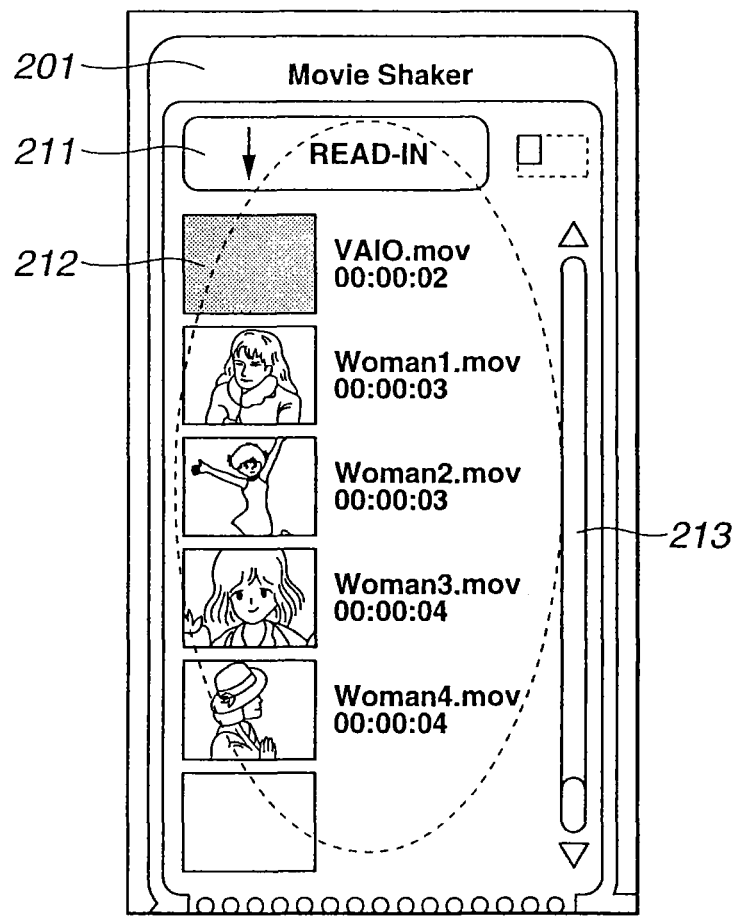
FIG. 16 is a diagram depicting a screen image the personal computer may display.

FIG. 15 illustrates a part of an edition screen. As shown in FIG. 15, an original tray 201 is displayed in the upper-left corner of the edition screen. In the original tray 201 there is displayed the read-in button 151 described with reference to FIG. 10. FIG. 16 is a magnified view of the original tray 201.

The original data loaded into the memory area provided in the temporary edition space 6, which is a moving picture, a still picture or sound to be edited, is displayed as original clips 211 in the original tray 201. As seen from the magnified view of FIG. 16, the title, type (moving or still picture) and playback time of the original data are displayed on the right of the original clips 211. A scroll bar 212 is displayed, too. The user of the computer 1 operates the scroll bar to scroll the original clips 211 if there are too many clips to be displayed in the original tray 201.

A file of the data to be edited (i.e., the original data loaded into the temporary edition space 6, hereinafter referred to as "original clips") may be a moving picture file that has an extension identifier such as .MOV or .AVI, a still picture file that has an extension identifier such as .BMP, .GIF, .JPG, .PNG or .PCT, or a music file that has an extension identifier such as .WAV or .AIF.

A playback screen 221 is displayed on the right of the original tray 201. Assume that the user operates the pointing device (not shown), designating one of the original clips 211 displayed in the original tray 201, and clicks the playback button 231. Then, the image designated is displayed on the playback screen 221. As the playback proceeds, the playback position button 235 moves from the left to the right, indicating which part of the data is played back.

Figure 18:
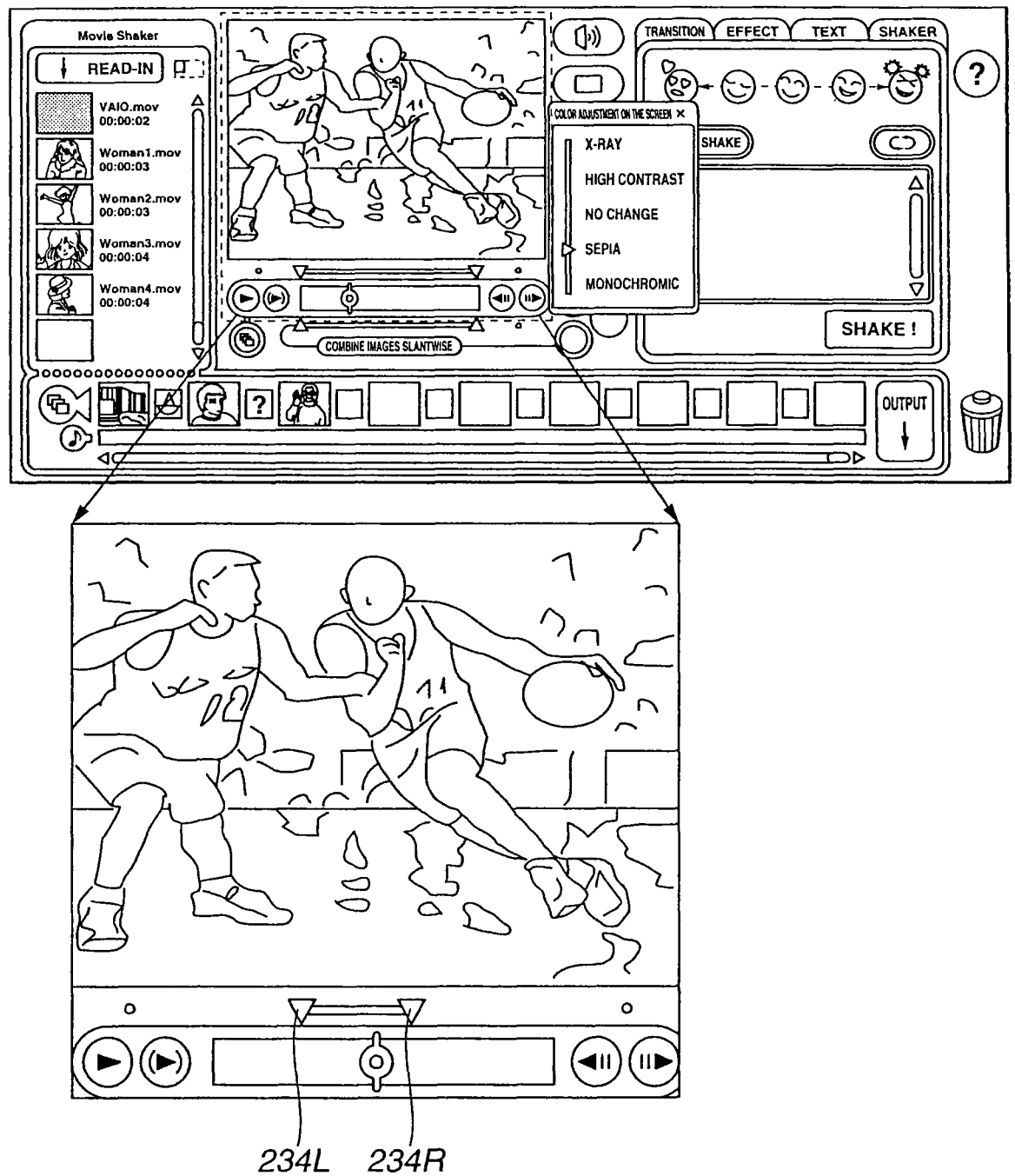
FIG. 18 is a diagram illustrating a screen image displayed the personal computer may display.

As FIG. 18 shows, too, the pointer 234L and the pointer 234R are moved to desired positions, thus setting a playback-start position and a playback-end position. The moving picture can thereby be trimmed, designating a desired part of the moving picture. Only that part of the moving picture which has been designated will be actually edited.

When the playback button 232 is clicked to playback the designated part of the moving picture, the designated part of the moving picture is displayed in the on the playback screen 221. When the rewinding button 236 is clicked, the frames of the moving picture are sequentially displayed on the playback screen 221, in the order reverse to the order they have been recorded. When the fast-winding button 237 is clicked, the frames of the moving picture are played back fast, in the order they have been recorded.

The user may click the mode button 233 in the story playback mode. If so, the mode is switched to the edition mode. When the mode button 233 is clicked in the edition mode, the mode is switched back to the story playback mode.

The user may click the playback button 231 in the edition mode. If this is the case, the original clip 211 selected from the original tray 201 is displayed on the playback screen 221. If the playback button 231 is clicked in the story playback mode, the story (scenario) automatically or manually edited and specified in the output tray 291 will be played back, from the beginning to the end. (The story corresponds to the data that is recorded in the temporary edition space 6.)

Figure 19:
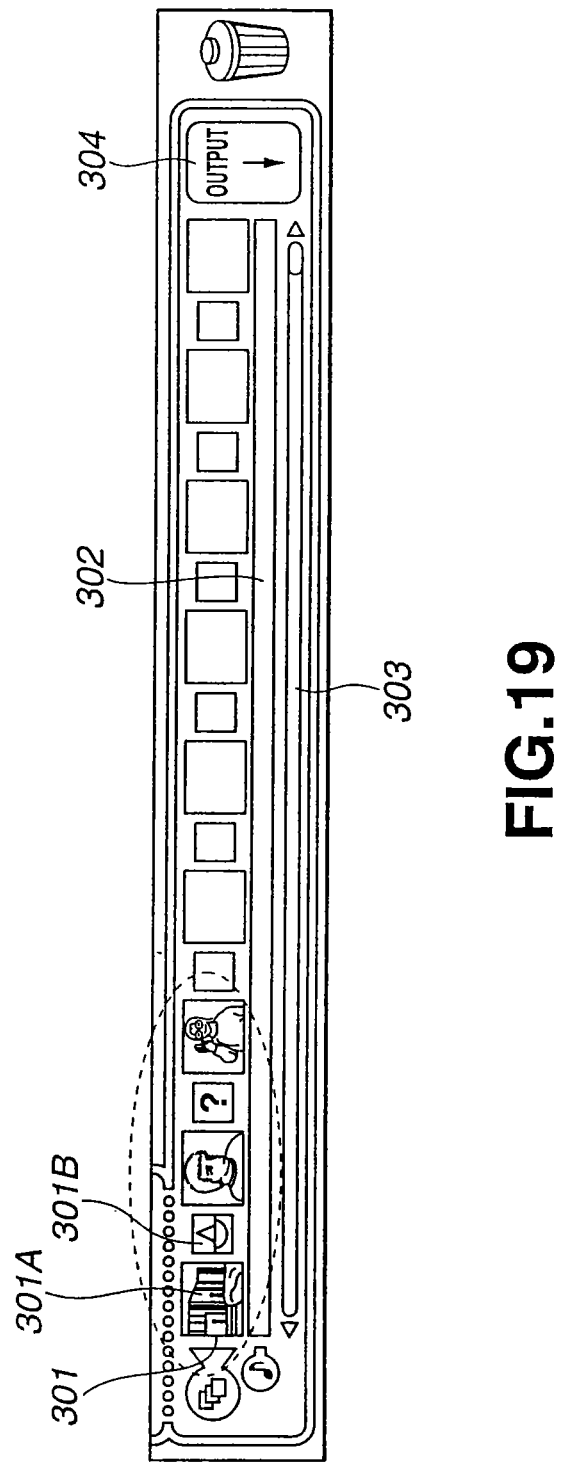
FIG. 19 is a diagram showing a screen image the personal computer may display.

To edit an original clip manually (not automatically), the user selects the original clip from among the original clips 211 displayed in the original tray 201. Then, the user drags the original clip and drops it at a desired position in the image-displaying section 301A of the image track 301 shown in FIG. 19, thereby preparing a scenario (story). The image (i.e., the original clip) dropped in the image-displaying section 301A may be further dragged and dropped at another position in the section 301A.

The output button 304 is clicked to save the moving picture corresponding to the story manually edited, in the user video-data management database 4.

If a file of music data exists on the original tray 201, the user may drags the icon of this file (i.e., the original clip 211) and drops it in the BGM track 302 on the output tray 291. The music data file can then be used as background music (BGM). That part of the BGM track 302, to which the music data is assigned, has a length proportional to the amount of the music data. The amount of the music data may be smaller than the maximum amount of music data that can be recorded in the BGM track 302. In this case, the user can drag other music data and drops it in the BGM track 302, to assign the other music data to another part of the BGM track 302.

Figure 20:
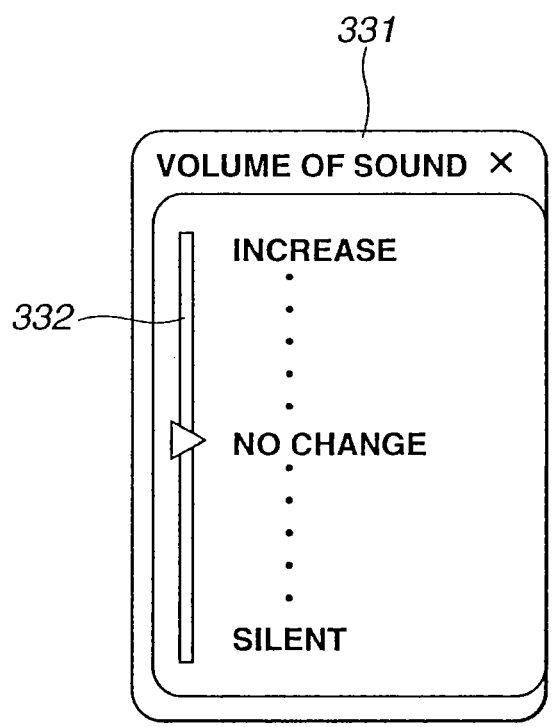
FIG. 20 is a diagram showing a screen image the personal computer may display.

On the right of the playback screen 221 there are displayed a volume button 241, a color-adjusting button 242, and a playback speed button 243. When the volume button 241 is clicked, such a window 331 as is shown in FIG. 20 is displayed below the volume button 241. The user may move the tap along the adjustment bar 332 to adjust the volume of sound to be output.

Figure 21:
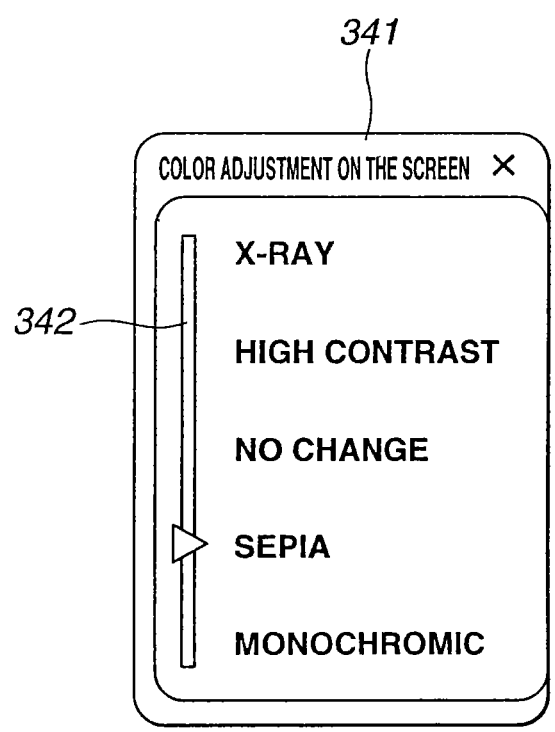
FIG. 21 is a diagram depicting a screen image the personal computer may display.

When the color-adjusting button 242 is clicked, such a window 341 as is shown in FIG. 21 is displayed below the color-adjusting button 242. The user may move the tap along the adjustment bar 342 to select any one of colors, i.e., X ray, high contrast, present color, sepia and monochrome.

Figure 22:
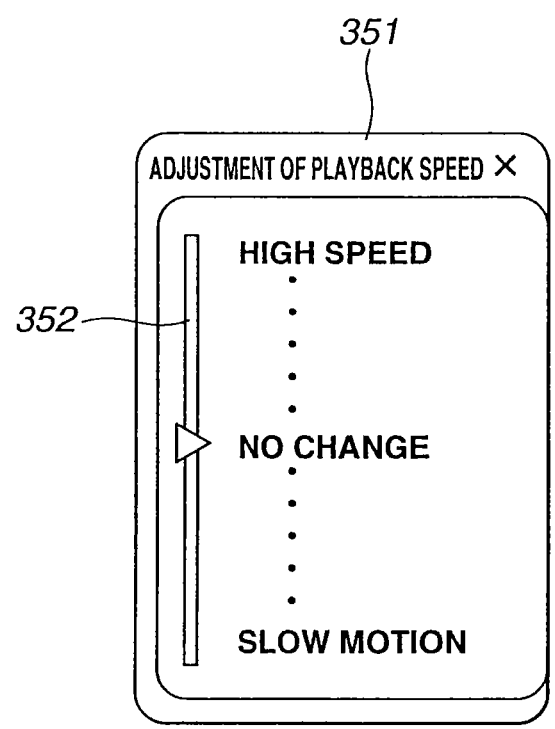
FIG. 22 is a diagram illustrating a screen image the personal computer may display.

When the playback speed button 243 is clicked, such a window 351 as is shown in FIG. 22 is displayed below the playback speed button 243. The user may move the tap along the adjustment bar 352 to increase or decrease the playback speed to a desired one.

An effect button 244 is displayed below the playback speed button 243. The user may drag and drop one of selection button icons 364 or a selection button icon 362 at the effect button 244, to assign the effect to the original image displayed in the playback screen 221. The icons 364 and 362, which are shown in FIGS. 23 and 24, will be described later.

A special effect tray 261 is displayed on the right of the buttons, including the volume button 241 and the effect button 244. Tags 271-1 to 271-4 are displayed on the special effect tray 261.

Figure 23:
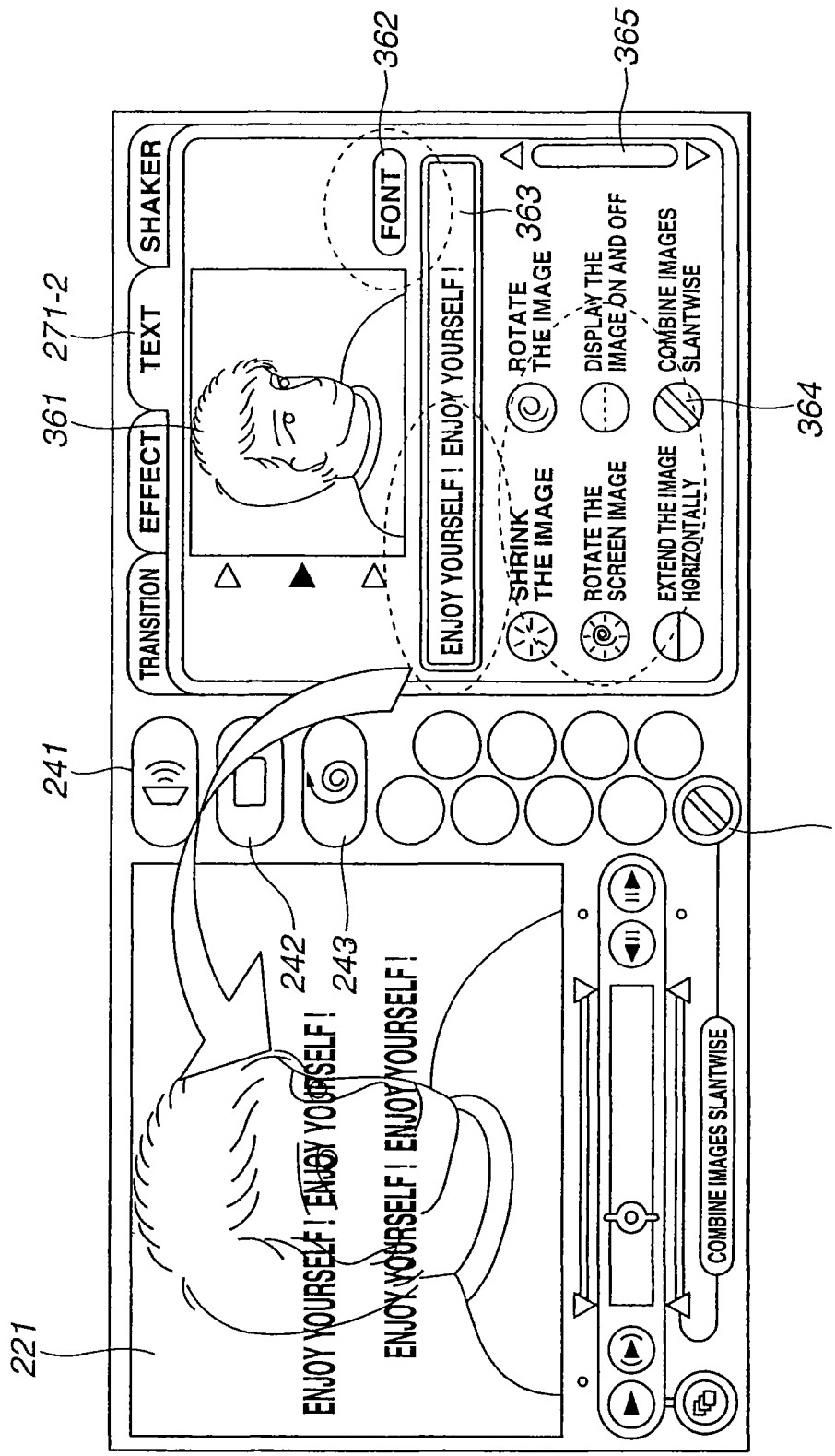
FIG. 23 is a diagram illustrating an image the personal computer may display.
Figure 24:
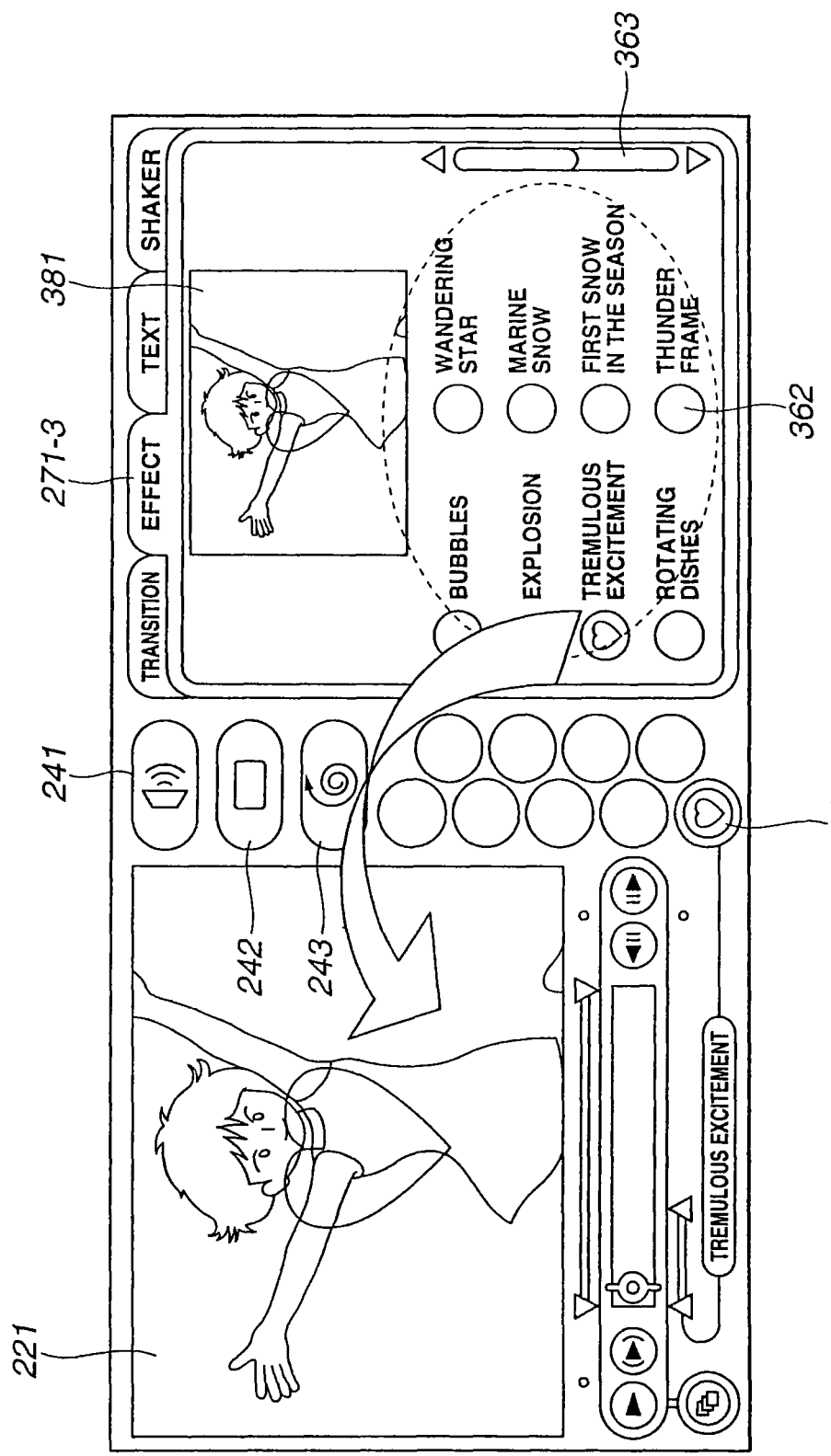
FIG. 24 is a diagram showing an image the personal computer may display.

When the tag 271-1 is selected, a text window is displayed as is illustrated in FIG. 23. An image 361 to be edited is displayed in this window. A font button 362 is displayed, which is clicked to select a font for the text to which an effect shall be imparted. The text the user has input by operating the keyboard 4 is displayed in a text input window 363. One of the selection button icons 364 is clicked to select an effect applied to the text (i.e., a train of characters). A scroll bar 365 is displayed, which is used to scroll the list of selection button icons 364.

Of the selection button icons 364, a desired one is dragged and dropped at the effect button 244. The text effect (or text animation) designated by the button icon 364 thus dragged and dropped is thereby applied to the text displayed in the text input window 363. The user may click the playback button 231 after he or she has dragged and dropped the button icon 346 at the effect button 244. Then, the image with the text effect selected is immediately displayed in the playback screen 221. Thus, the user can recognize the text effect in real time.

In the case of the screen image illustrated in FIG. 23, text animation composed of images combined slantwise is displayed in the playback screen 221.

FIG. 24 shows an image that is displayed in the playback screen 221 when the tag 271-3 is selected. As shown in FIG. 24, an effect window is displayed. In the effect window, the image 381 to edit is displayed, and button icons 362 are displayed below the image 381. A scroll bar 363 is displayed, too. The scroll bar 363 is used to scroll the list of button icons 362.

Of the button icons 362, a desired one is dragged and dropped at the effect button 244 to select a specific animation effect. The user may click the playback button 231 after he or she has dragged and dropped the button icon 362 at the effect button 244. Then, the image with the animation effect selected is displayed in real time on the playback screen 221. In the case of the screen image shown in FIG. 24, the animation entitled "tremulous excitement" is displayed.

Figure 25:
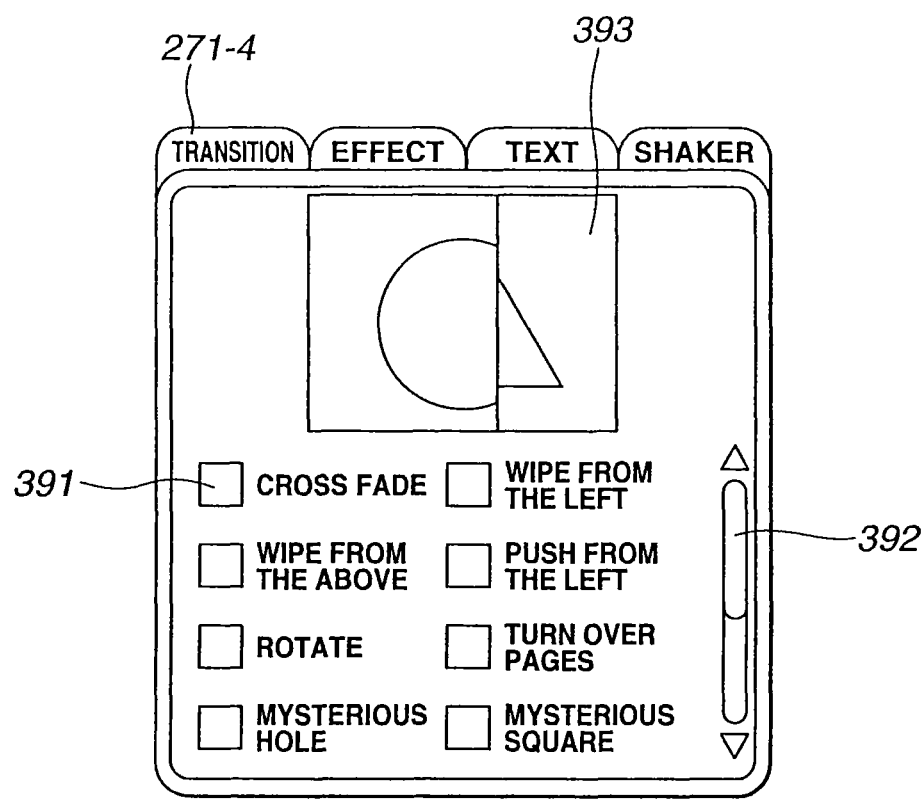
FIG. 25 is a diagram representing an image the personal computer may display.

FIG. 25 shows an image that is displayed in the playback screen 221 when the tag the tag 271-4 is selected. As shown in FIG. 25, a transition window is displayed. In the transition window, button icons 391 are displayed. The user can select one of these button icons 391. When one of the button icons 391 is selected, a graphic image that corresponds to the transition selected is displayed in the display section 393. A scroll bar 392 is displayed, too. The scroll bar 392 is used to scroll the list of button icons 391.

Figure 26:
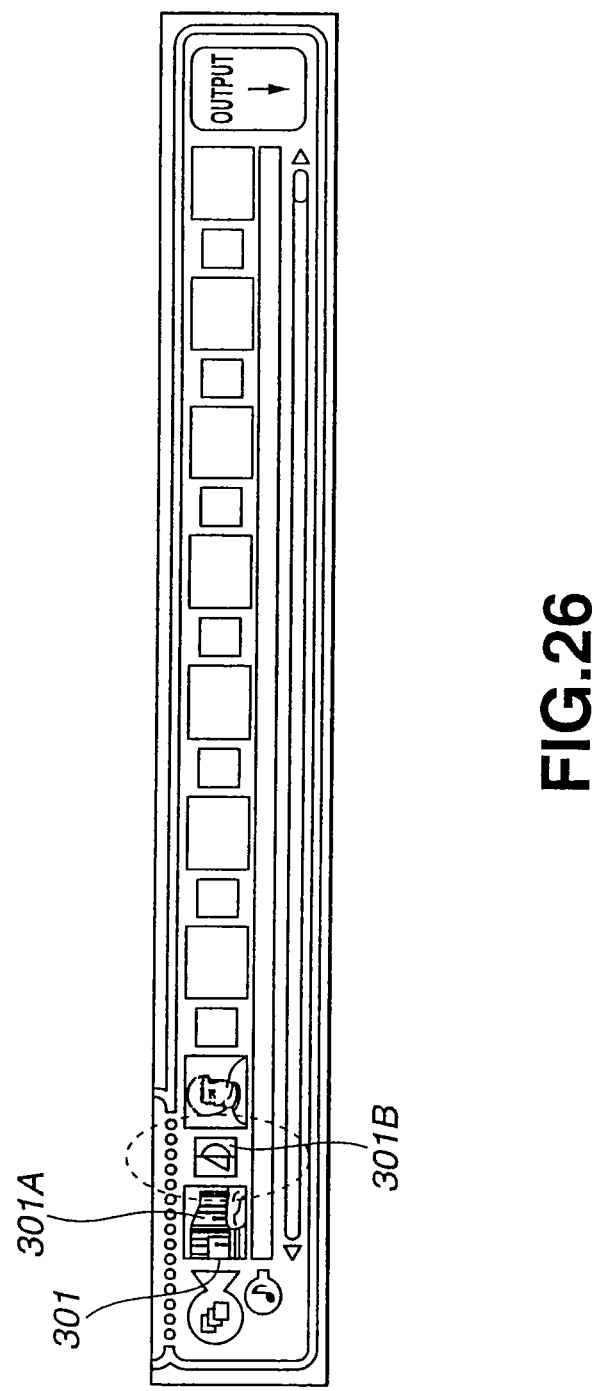
FIG. 26 is a diagram illustrating an image the personal computer may display.

The user selects one of the button icons 391 and drags and drops it at the transition-displaying section 301B of the image track 301 shown in FIG. 26. Thus, transition can be added to the image (i.e., original clip) displayed in the image-displaying section 301A that precedes the transition-displaying section 301B.

Figure 27:
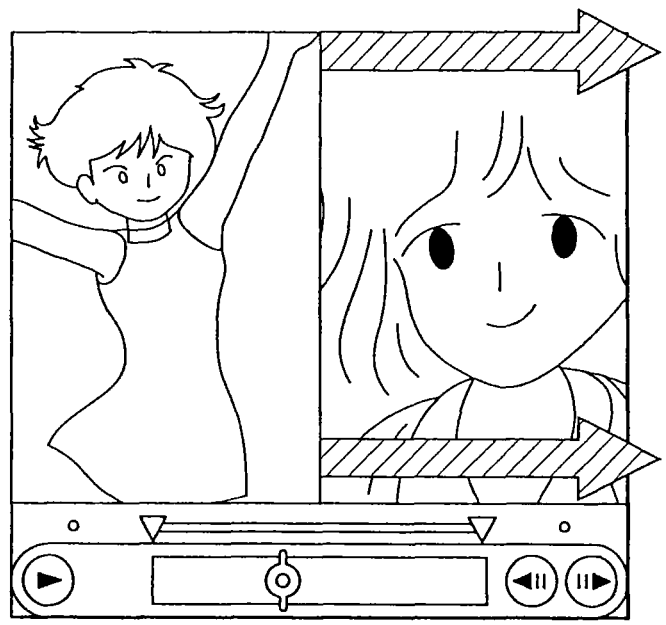
FIG. 27 is a diagram illustrating an image the personal computer may display.

If wipe transition is selected, the image shown in the left of the screen gradually moves to the left, overlapping the image displayed in the right of the screen as is illustrated in FIG. 27. Thus, a transition of an image is accomplished.

Figure 28:
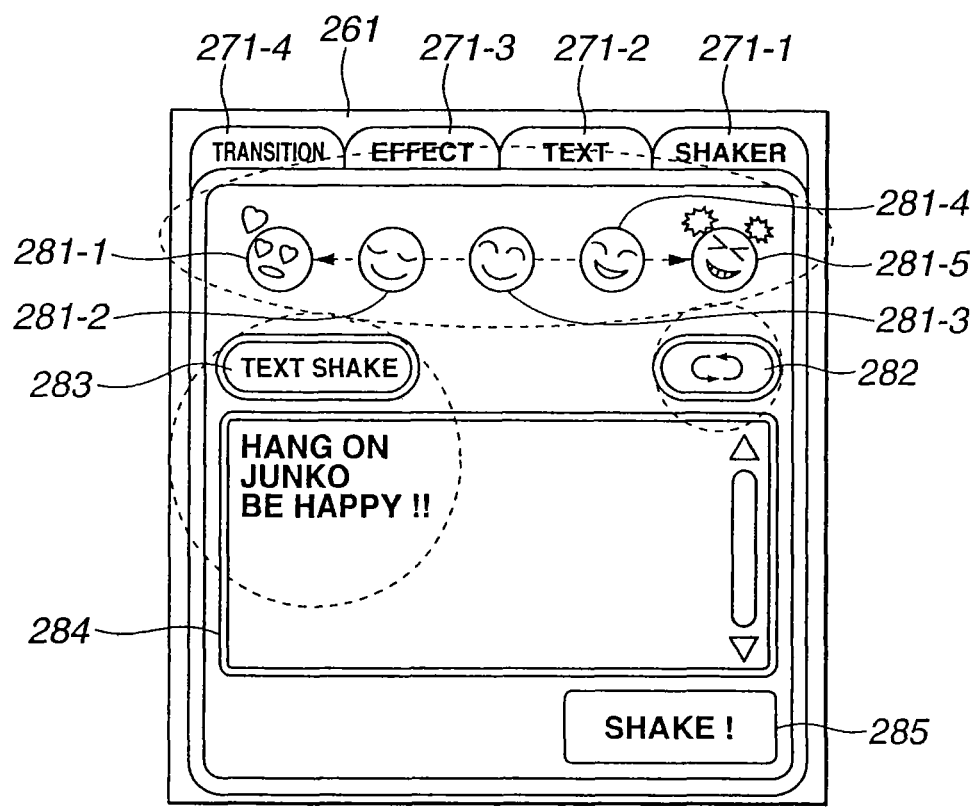
FIG. 28 is a diagram showing an image the personal computer may display.

If the tag 271-1 is selected, a shaker window is displayed to perform automatic edition, as is shown in the magnified view of FIG. 28. Selection buttons 281-1 to 281-5 are displayed in the shaker window. The selection buttons 281-1 to 281-5 are assigned to five prescribed scenarios (stories), respectively. Pieces of music are assigned to the scenarios, respectively. The music assigned to the leftmost selection button 281-1 has the slowest tempo. The music assigned to the rightmost selection button 281-5 has the fastest tempo. Pieces of music, which are of intermediate tempos, are assigned to the selection buttons 281-2 to 28-4 displayed between the button 281-1 and the button 281-5.

More specifically, ambient music is assigned to the selection button 281-1, piano music to the button 281-2, jazz to the button 281-3, hip-hop to the button 281-4, and techno-tone music to the button 281-5.

The scenario associated with the selection button 281-1 is composed of a relatively small number of scenes. By contrast, the scenario associated with the selection button 281-5 is composed of many scenes. The scenarios allocated to the selection buttons 281-1 to 281-5 have the same length. In the present embodiment, they have the length of 30 seconds.

A loop button 282 and a text shake button 283 are displayed. The user may click the loop button 282 to playback a 30-second, automatically edited scenario over and over again. The user may click the text shake button 283 to shake the text (characters). When the user clicks the text shake button 283, a window 284 is displayed. The user may then operate the keyboard (not shown) to input a text (a train of characters) in the window 284. The text thus input can be edited. In the instance shown in FIG. 28, three trains of characters, "HANG ON," "JUNKO," and "BE HAPPY!!" are input and displayed.

As shown in FIG. 28, a shake button 285 is displayed. The user may click the shake button 285 to start a shake process (i.e., automatic edition). The shake process will be described later in detail, with reference to the flowcharts of FIGS. 41 to 43.

The user may click the shake button 285, causing the moving-picture editing server 3 to perform the shake process. In this case, the personal computer 1 displays the screen image of FIG. 29, which indicates that the server 3 is carrying out the shake process. When the moving-picture editing server 3 finishes the shake process, the personal computer 1 displays the screen image of FIG. 30. This screen image informs the user that the server 3 has completed the shake process.

Figure 31:
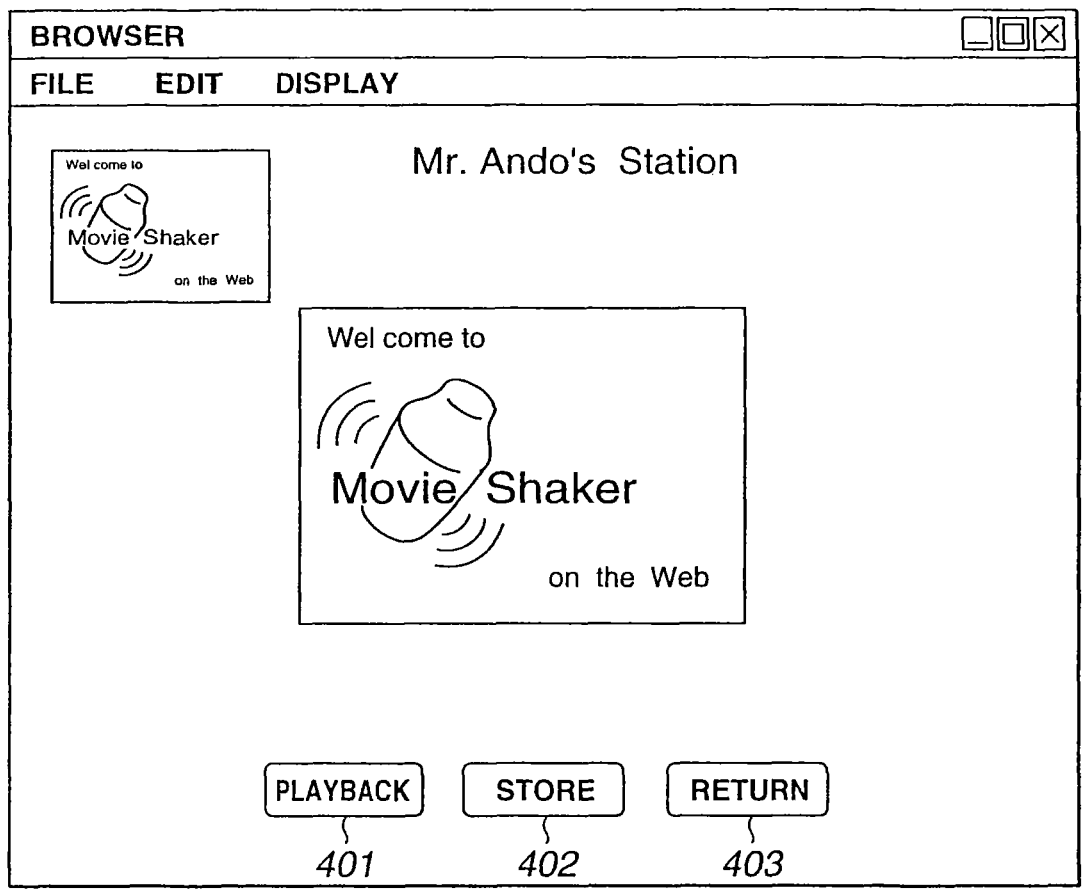
FIG. 31 is a diagram showing a screen image the personal computer 1 may display.

If the user operates the keyboard (not shown) while the computer 1 is displaying the screen image that informs him of the completion of the shake process, the personal computer 1 displays the screen image of FIG. 31. This screen image informs the user that the image subjected to the shake process can be played back or stored.

The screen image of FIG. 31 includes three buttons 401, 402 and 403. The user may click the button 401 to playback the image subjected to the shake process. He or she may click the button 402 to store the image into the user video-data management database 4. He or she may click the button 403 to switch the screen image to the edition screen of FIG. 14 so that the shake process may be performed again.

How the personal computer 1 and the moving-picture editing server 3 cooperate to edit images will be explained below.

Figure 32:
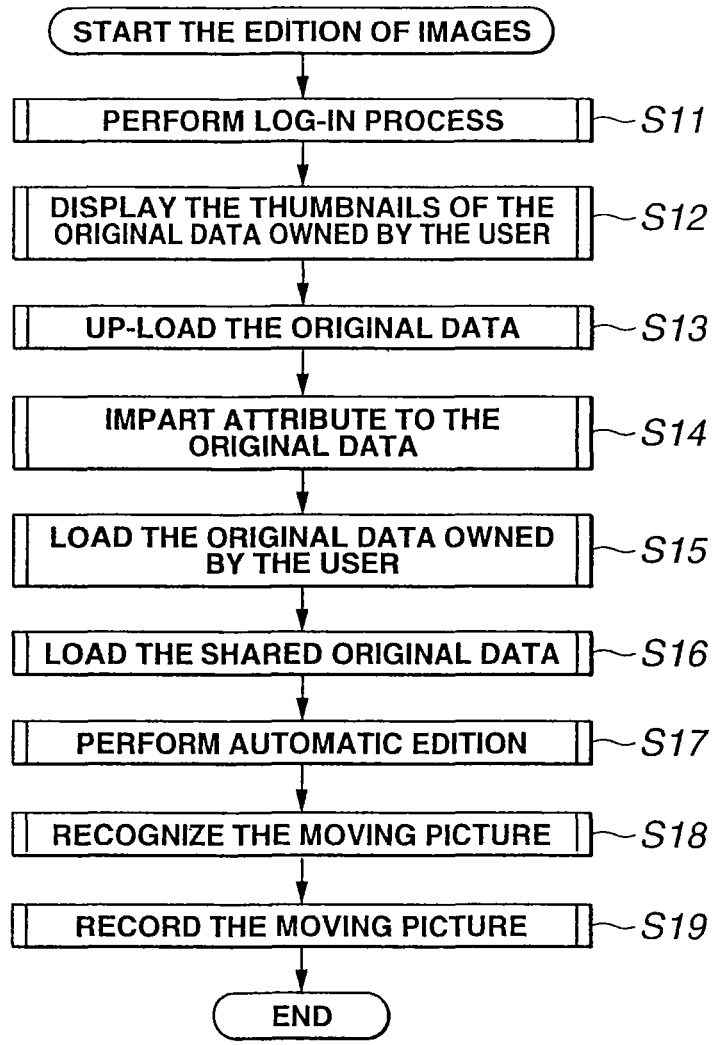
FIG. 32 is a flowchart explaining the process of editing an image.
Figure 33:
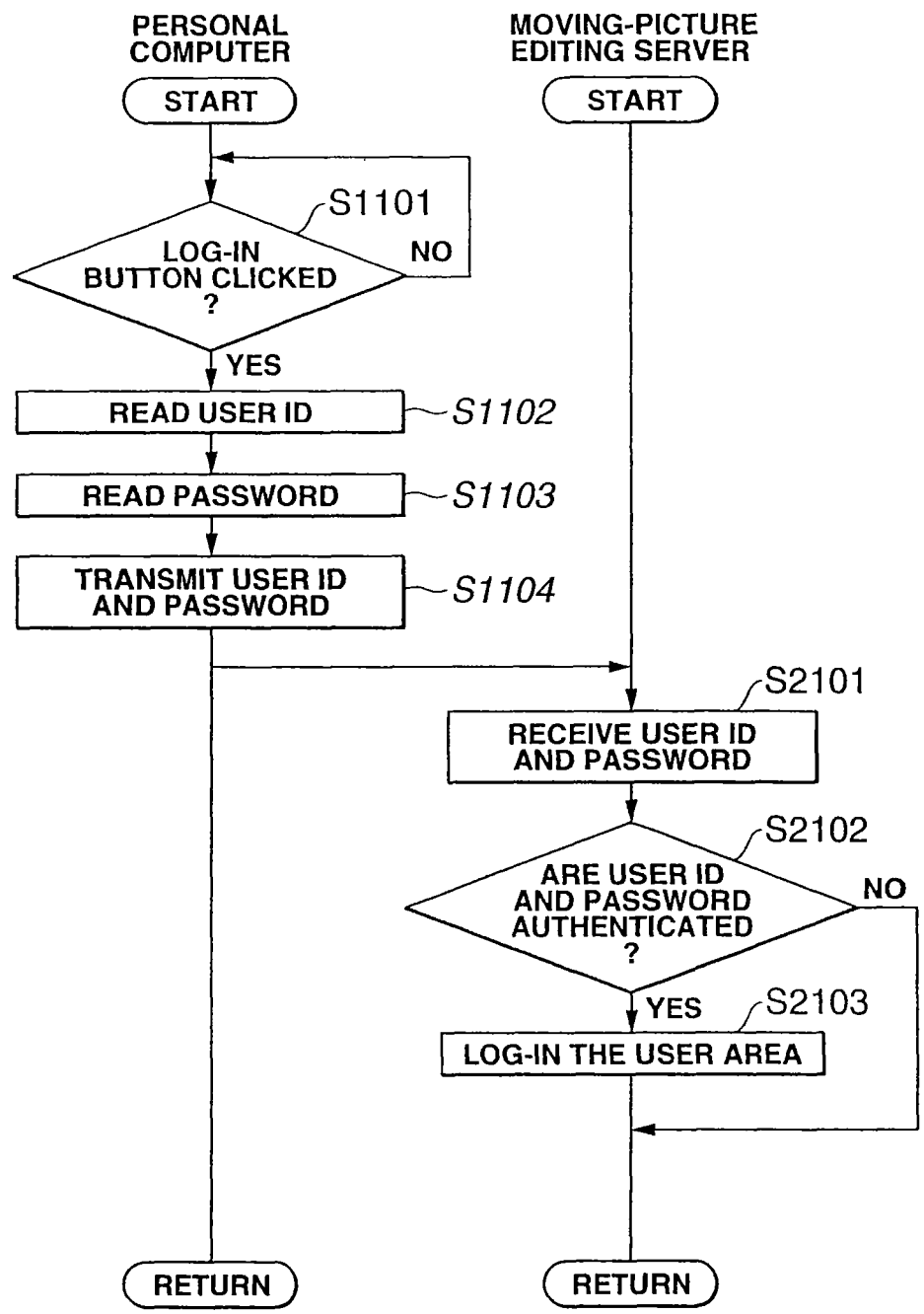
FIG. 33 is a flowchart explaining a log-in process.

FIG. 32 is a flowchart explaining how the computer 1 and the server 3 work to edit an image. In Step S11, the moving-picture editing server 3 performs a log-in process in accordance with the moving-picture editing program 12, on the basis of the user ID and password transmitted from the personal computer 1 via the Internet 2. If it is determined in Step S11 that neither the user ID nor the password is authenticated, Steps S12 et seq. will be skipped, and the operation is terminated.

If it is determined in Step S11 that the user ID and password transmitted from the personal computer 1 are authenticated, the operation advances to Step S12. In Step S12, the browser program 11 receives the thumbnails of the original data owned by the user from the moving-picture editing server 3. The browser program 11 displays the thumbnails.

In Step S13, when the button 112 is clicked, the browser program 11 in the personal computer 1 causes the moving-picture editing server 3 to up-load the original data.

In Step S14, when the button 113 is clicked, the browser program 11 in the personal computer 1 causes the moving-picture editing server 3 to impart attribute to the original data.

In Step S15, when the button 162 is clicked, the browser program 11 in the personal computer 1 causes the moving-picture editing server 3 to load the original data which is recorded in the user video-data management database 4 and which is owned by the user.

In Step S16, when the button 172 is clicked, the browser program 11 in the personal computer 1 causes the moving-picture editing server 3 to load the shared original data which is recorded in the user video-data management database 4.

In Step S17, when the button 285 is clicked, the browser program 11 in the personal computer 1 causes the moving-picture editing server 3 to perform automatic edition on the original data loaded in Step S15 or Step S16.

In Step S18, when the button 401 is clicked, the browser program 11 in the personal computer 1 causes the moving-picture editing server 3 to transmit the moving picture generated by the automatic edition carried out in Step S17, to the personal computer 1. The personal computer 1 displays the moving picture, which the user can confirms.

In Step S19, when the button 402 is clicked, the personal computer 1 causes the moving-picture editing server 3 to record the moving picture stored in the temporary edition space 6, into the user video-data management database 4. The edition of images thus ends.

The moving-picture editing server 3 can thus perform automatically edit the original data owned by the user of the personal computer 1 and the original data shared by the user and other users, in response to the demand made by the personal computer. The server 3 can therefore generate moving pictures into the user video-data management database 4, in association with the user IDs of the users.

The log-in process that is performed in Step S11 will be described in detail, with reference to the flowchart of FIG. 32. In Step S1101, the browser program 11 determines whether the button 103 (FIG. 6) has been clicked. If the button 103 is found not clicked, Step S1101 is repeated until the button 103 is clicked.

If the button 103 is found clicked, in Step S1101, the process proceeds to Step S1102. In Step S1102, the browser program 11 reads the user ID input in the field 101. Next, in Step S1103, the browser program 11 reads the password input in the field 102.

In Step S1104, the browser program 11 transmits the user ID and the password, which have been read in Steps S1102 and S1103, to the moving-picture editing server 3 through the Internet 2.

In Step S2101, the moving-picture editing program 12 receives the user ID and the password from the personal computer 1. In Step S2102, the program 12 determines from the user ID and the associated password, which are recorded in the user data management database 7, whether the user ID and the password, both received, are authenticated. If the user ID and the password are found to be authenticated, the process goes to Step S2103. In Step S2103, the user data management database 7 is logged in a user area (e.g., a predetermined folder) provided in the user video-data management database 4, on the basis of the directory data recorded in association with the user ID. The log-in process is thereby completed.

The user ID and the password, both received, may not be found to be authenticated in Step S2102. If so, Step S2103 is skipped and the moving-picture editing program 12 does not allow accesses to the user video-data management database 4. In this case, the process that will be explained below will not be carried out.

After the personal computer 1 has transmitted the user ID and the password, both authenticated, the moving-picture editing server 3 can access to the predetermined user area provided in the video-data management database 4. If the personal computer 1 has transmitted a user ID and a password, which are not authenticated, the moving-picture editing server 3 will not perform any further processes, prohibiting the personal computer 1 from accessing the user video-data management database 4.

Figure 34:
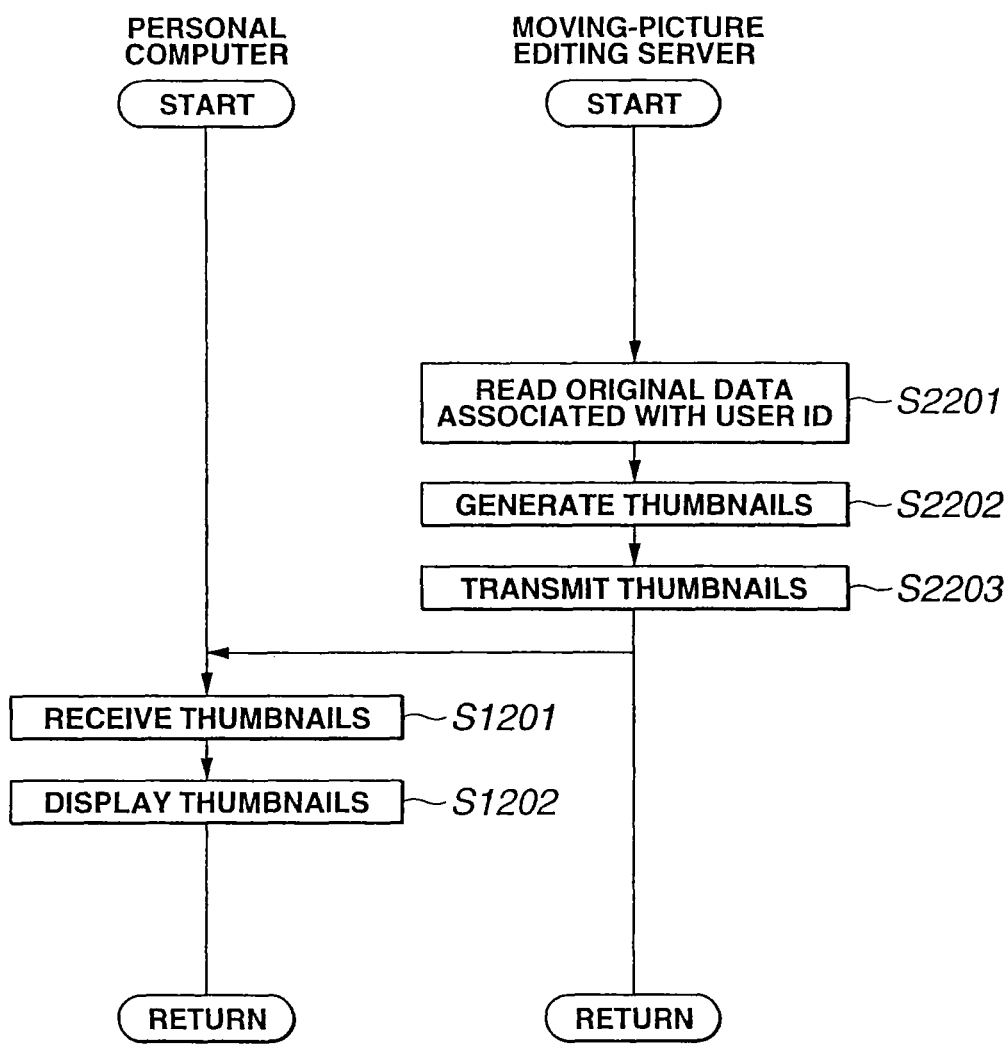
FIG. 34 is a flowchart explaining the process of displaying a thumbnail.

The process of displaying the thumbnails of the original data owned by the user, which is performed in Step S12 (FIG. 32), will be described in detail with reference to the flowchart of FIG. 34. In Step S2201, the moving-picture editing program 12 reads the file name associated with the user ID from the user area in which the user video-data management database 4 has been logged. The program 12 then reads the original data from the file that has the file.

In Step S2202, the program 12 generates thumbnails from the data stored in the file that has been read in Step S2201. In Step S2203, the moving-picture editing program 12 transmits the thumbnails generated in Step S2202 to the personal computer 1 through the Internet 2.

In Step S1201, the browser program 11 receives the thumbnails transmitted from the moving-picture editing server 3. In Step S1202, the browser program 11 displays the thumbnails received in Step S1201. The process of displaying the thumbnails is thereby completed.

Thus, the personal computer 1 can display the thumbnails of, for example, the moving picture data recorded in the user video-data management database 4.

Figure 35:
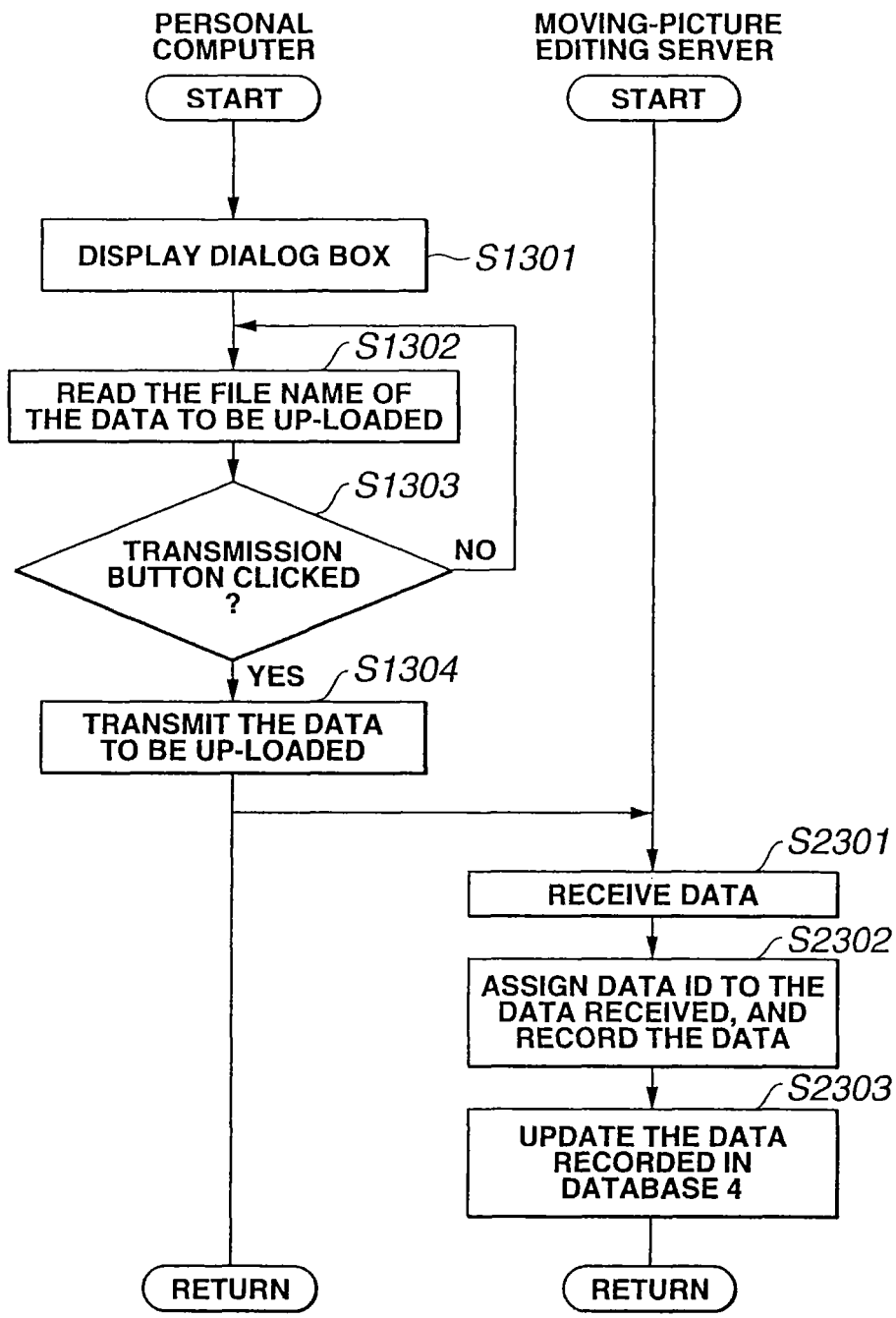
FIG. 35 is a flowchart explaining an up-load process.

Next, the process of up-loading the moving-picture data or the like, which is conducted in Step S13 (FIG. 32), will be described with reference to the flowchart of FIG. 35. In Step S1301, the browser program 11 displays the dialog box shown in FIG. 8. In Step S1302, the browser program 11 reads the name of the file which contains the moving-picture data and which is input in the field 131.

In Step S1303, the browser program 11 determines whether the button 132 has been clicked to instruct the transmission of the data. If the button 132 is found not clicked, the process returns to Step S1302 and the browser program 11 reads the name of the file again.

If the button 132 is found clicked, in Step S1303, the process proceeds to Step S1304. In Step S1304, the browser program 11 opens the file having the name read in Step S1302. The data contained in this file is transmitted to the moving-picture editing server 3 through the Internet 2.

In Step S2301, the moving-picture editing program 12 receives the data transmitted from the browser program 11. In Step S2302, the moving-picture editing program 12 assigns a data ID to the data received and records the data, as original data, in the user area allocated to the user of the browser program 11. (The user area is designated by the directory data recorded in the user data management database 7 and association with the user ID.)

In Step S2303, the moving-picture editing program 12 records the data ID and the attribute (FIG. 4) related to the data ID in the user video-data management database 4. The data recorded in the user video-data management database 4 is thereby updated. Here ends the process of up-loading the moving-picture data or the like.

Thus, the moving-picture editing server 3 can record the data received from the personal computer 1, such as the moving-picture data, in the user video-data management database 4. Further, the server 3 can record the data ID and the attribute (of the original data).

Figure 36:
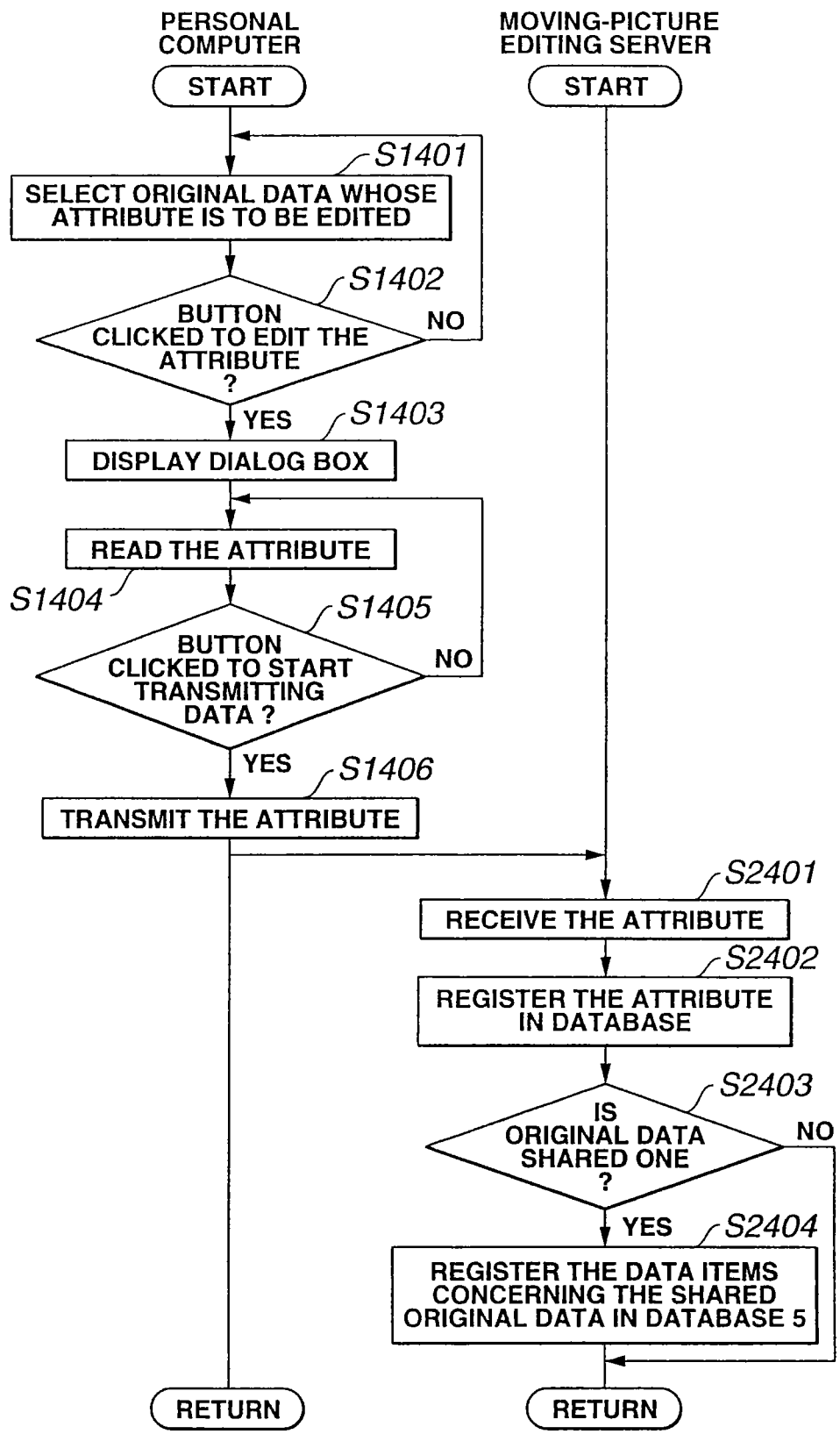
FIG. 36 is a flowchart explaining the process of setting attributes.

The process of imparting attribute to the original data, which is performed in Step 14 (FIG. 32), will be described in detail with reference to the flowchart of FIG. 36. In Step S1401, the browser program 11 selects one of the thumbnail-displaying fields 121-1 to 121-9 (FIG. 7). The original data the attribute of which is to be edited is thereby selected.

In Step S1402, the browser program 11 determines whether the button 113 has been clicked to edit the attribute of the original data. If the button 113 is found not clicked, the process returns to Step S1401. In Step S1401, the browser program 11 tries to select the original data again.

If the button 113 is found clicked, in Step S1402, the process advances to Step S1403. In Step S1403, the browser program 11 displays the dialog box shown in FIG. 9. In Step S1404, the browser program 11 reads the attribute of the original data, which is set in the field 141, 142 or 143.

In Step S1405, the browser program 11 determines whether the button 148 has been clicked to start the transmission of the attribute. If the button 148 is found not clicked, the process returns to Step S1404. In Step S1404, the browser program 11 reads the attribute of the original data again.

If the button 148 is found clicked, in Step S1405, the process proceeds to Step S1406. In Step S1406, the browser program 11 transmits the attribute of the original data, which has been read in Step S1404, to the moving-picture editing server 3 via the Internet 2, along with the data ID. The data ID is transmitted, too, together with the attribute.

In Step S2401, the moving-picture editing program 12 causes the moving-picture editing server 3 to receives the data ID and the attribute of the original data, both transmitted from the personal computer 1. In Step S2402, the moving-picture editing program 12 registers the attribute of the original data that is associated with the data ID, in the user video-data management database 4.

In Step S2403, the program 12 determines, from the attribute of the original data, whether the original data having the attribute transmitted is shared data or not. If the attribute indicates that the original data is a shared one, the process proceeds to Step S2404. In Step S2404, the data ID, user ID and charge flag, all pertaining to the original data, are registered in the shared video-data management database 5. Here ends the process of imparting attribute to the original data. The original data, which is shared data as so described by the attribute thus registered, can be read to the personal computer 1 of the other user and can be used therein.

If the original data having the attribute transmitted is found not a shared one, in Step S2403, Step S2404 is skipped. This is because the data ID, user ID and charge flag, all pertaining to the original data, need not be registered in the shared video-data management database 5. In this case, too, the process of imparting attribute to the original data is terminated.

As described above, the moving-picture editing server 3 can register the attribute of the original data transmitted from the personal computer 1 in the user video-data management database 4. Also can it register the data ID, user ID and charge flag, all concerning the original data, in the shared video-data management database 5.

Figure 37:
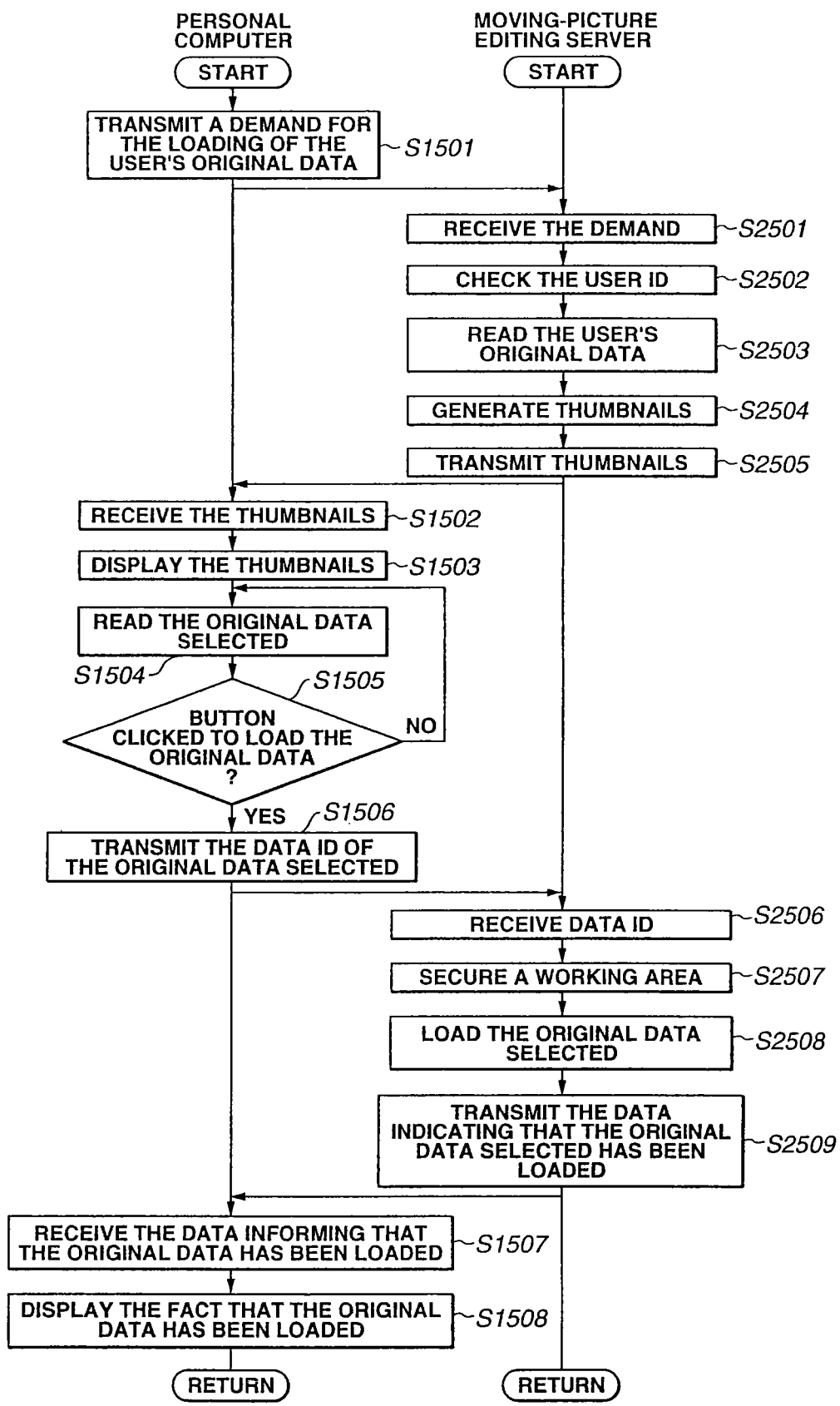
FIG. 37 is a flowchart explaining the process of loading the original data the user possesses.

The process of loading the original data owned by the user, which is carried out in Step S15 (FIG. 32), will be explained with reference to the flowchart of FIG. 37. In Step S1501, the browser program 11 transmits the user ID and a demand to the moving-picture editing server 3 through the Internet 2, thus demanding that the server 3 should load the original data.

In Step S2501, the moving-picture editing program 12 causes the server 3 to receive the demand transmitted from the personal computer 1. In Step S2502, the program 12 determines whether the user ID received is recorded in the user data management database 7. If the user ID is not registered in the database 7, the moving-picture editing server 3 terminates the process. In this case, no further steps of the process will be carried out.

If the user ID is registered in the user data management database 7, the process goes to Step S2503. In Step S2503, the moving-picture editing program 12 reads the directory data associated with the user ID, from the user data management database 7. Based on the directory data thus read, the original data owned by the user is read from the user video-data management database 4, along with the data ID.

In Step S2504, the moving-picture editing program 12 generates thumbnails from the original data read from the database 7 in Step S2503.

In Step S2505, the moving-picture editing program 12 transmits the thumbnails generated in association with the data ID, to the personal computer 1 through the Internet 2.

In Step S1502, the browser program 11 makes the personal computer 1 receives the data ID and thumbnails transmitted from the server 3. In Step S1503, the thumbnails are displayed in the screen image shown in FIG. 11.

In Step S1504, the browser program 11 reads the original data associated with one of the thumbnails displayed in the thumbnail-displaying fields 161-1 to 161-9, which the user has selected. In Step S1505, the browser program 11 determines whether the button 162 has been clicked to load the original data into a working area provided in the temporary edition space 6. If the button 162 is found not clicked, the process returns to Step S1504. In Step S1504, the original data selected is read again.

If the button 162 is found clicked, in Step S1505, the process goes to Step S1506. In Step S1506, the browser program 11 transmits the data ID of the original data selected, to the moving-picture editing server 3 via the Internet 2.

In Step S2506, the server 3 receives the data ID transmitted from the personal computer 1. In Step S2507, the moving-picture editing program 12 secures a working area in the temporary edition space 6. The working area secured in Step S2507 is a memory space large enough to store the original data and edit the same.

In Step S2508, the original data owned by the user and identified by the data ID received is loaded (read) from the user video-data management database 4 into the working area provided in the temporary edition space 6.

In Step S2509, the moving-picture editing program 12 transmits the data indicating that the original data owned by the user and thus selected has been loaded is transmitted, to the personal computer 1 through the Internet 2.

Figure 12:
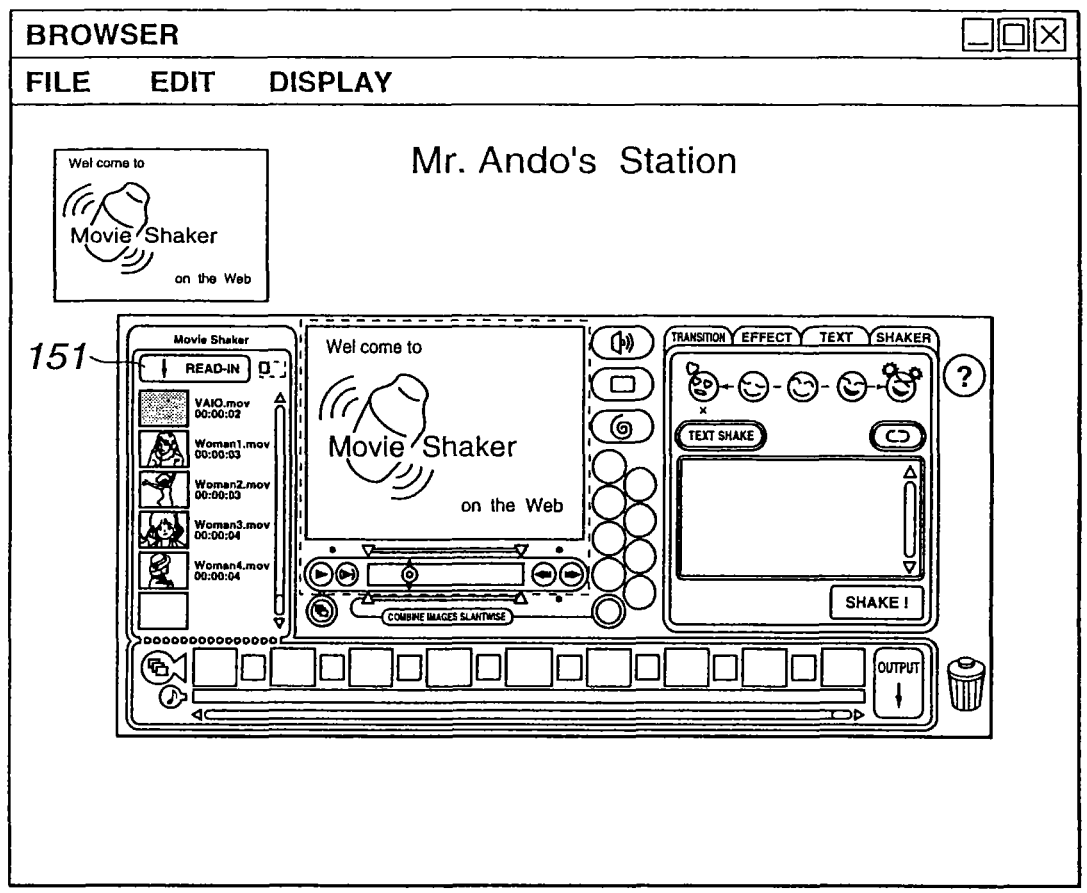
FIG. 12 is a diagram illustrating a screen image the personal computer may display.

In Step S1507, the browser program 11 receives the data indicating that the user's original data selected has been loaded. In Step S1508, the personal computer 1 displays the screen image of FIG. 12, which informs that the original data selected has been loaded. Here ends the process of loading the original data owned by the user.

Thus, the moving-picture editing server 3 loads the original data the user of the personal computer 1 has selected, into working area provided in the temporary edition space 6. When the data selected is loaded into the working area provided in the temporary edition space 6, the browser program 11 displays the fact that the original data has been thus loaded.

Figure 38:
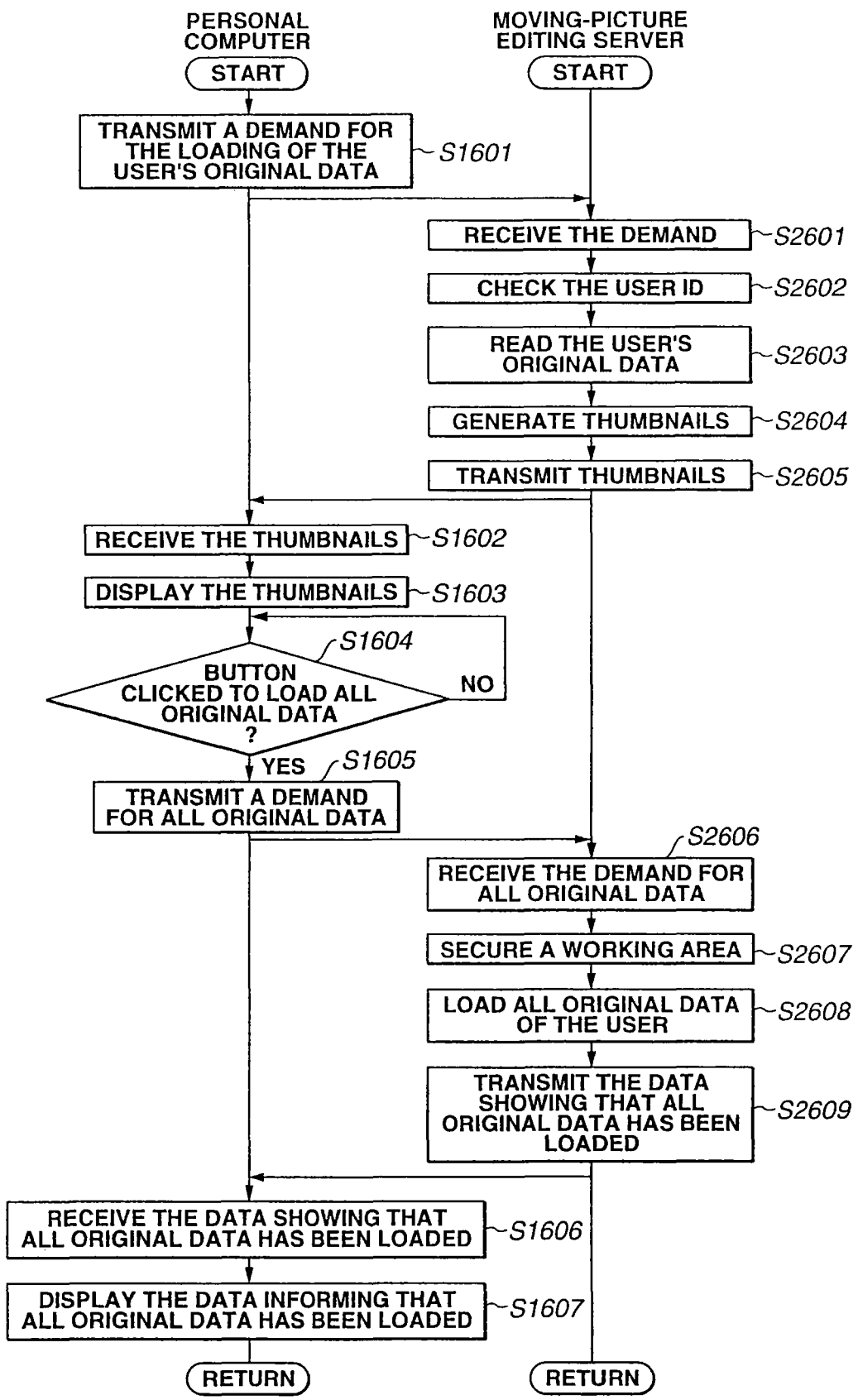
FIG. 38 is flowchart explaining another process of loading the original data the user possesses.

The process of loading all original data of the user, which is performed in Step S15, will be described in detail with reference to the flowchart of FIG. 38. Steps S1601 to S1603 of this process are similar to Steps S1501 to S1503 of the process shown in FIG. 37, and will not be explained.

In Step S1604, it is determine whether the button 163 has been clicked to load all original data the user owns. If the button 163 is found not clicked, the process returns to Step S1604, which is repeated.

If the button 163 is found clicked, in Step S1604, the process proceeds to Step S1605. In Step S1605, the browser program 11 transmits all original data to the moving-picture editing server 3 via the Internet 2.

In Step S2606, the moving-picture editing program 12 receives the demand for all original data, which has been transmitted from the personal computer 1. In Step S2607, the moving-picture editing program 12 secures a working area in the temporary edition space 6. In Step S2608, the moving-picture editing program 12 reads all original data owned by the user, from the user video-data management database 4. The data thus read is loaded into the working area provided in the temporary edition space 6.

In Step S2609, the moving-picture editing program 12 transmits the data showing that the all original data of the user has been loaded, to the personal computer through the Internet 2.

In Step S1606, the browser program 11 makes the computer 1 receives the data showing that the all original data of the user has been loaded. In Step S1607, the program 11 displays the screen image of FIG. 12, informing the user that his or her original data has been loaded in its entirety. Here ends the process of loading all original data of the user.

Thus, the moving-picture editing server 3 loads all original data of the user into the working area provided in the temporary edition space 6, in response to the demand made by the personal computer 1. When all original data is loaded into the working area of the space 6, the personal computer 1 displays this fact.

Figure 39:
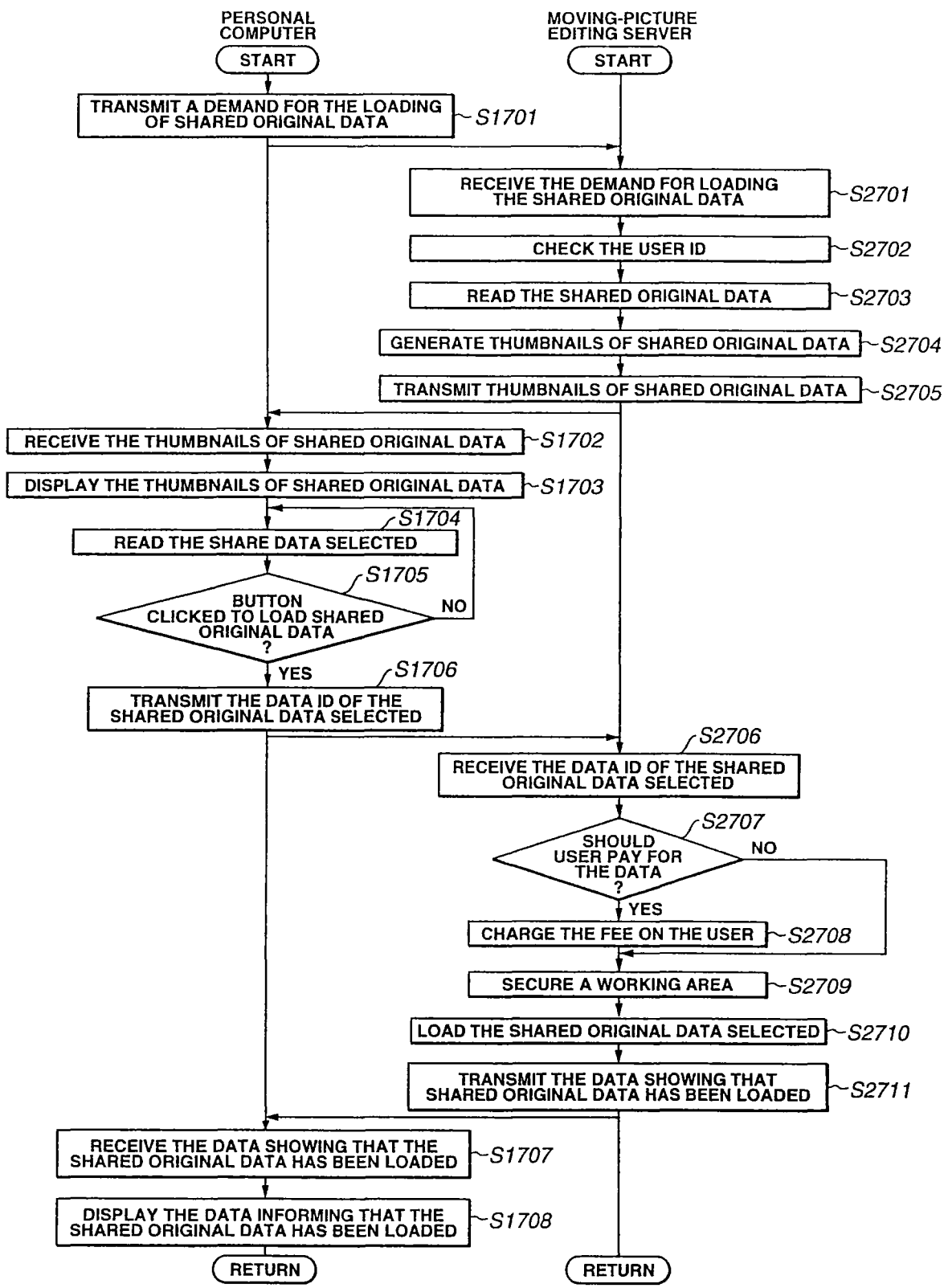
FIG. 39 is a flowchart explaining the process of loading the original data that users can share.

The process of loading the shared data, which is effected in Step S16 (FIG. 32), will be explained in detail with reference to the flowchart of FIG. 39. In Step S1701, the browser program 11 transmits the user ID and a demand for the shared data to the moving-picture editing server 3 through the Internet 2.

In Step S2701, the moving-picture editing program 12 receives the user ID and the demand for the shared data, both transmitted from the computer 1 via the Internet 2. In Step S2702, the moving-picture editing program 12 checks the user ID, determining whether the user ID is recorded in the original data read from the database 7. If the user ID is found not recorded in the database 7, the moving-picture editing program 12 terminates the process. That is, no further steps of the process will be carried out.

If the user ID is found recorded in the database 7, in Step S2702, the process proceeds to Step S2703. In Step S2703, the moving-picture editing program 12 read the data ID of the shared data from the shared video-data management database 5. The original data identified by the data ID thus read is read from the user video-data management database 4. Namely, in the process of reading the shared original data, the moving-picture editing program 12 serves to read the original data identified by the data from the user area which is provided in the database 4 and which is assigned to another user.

In Step S2704, the moving-picture editing program 12 generates the thumbnails are generated in association with the original data read in Step S2703.

In Step S2705, the moving-picture editing program 12 transmits the thumbnails generated in association with the data ID, to the personal computer 1 via the Internet 2.

In Step S1702, the browser program 11 receives the data ID and thumbnails of the shared original data, which have been transmitted from the moving-picture editing server 3. In Step S1703, the browser program 11 makes the computer 1 display the thumbnails of the shared original data, as is illustrated in FIG. 13.

In Step S1704, the user selects one of the thumbnails displayed in the thumbnail-displaying fields 171-1 to 171-9, and the original data associated with the thumbnail the user has selected is read. In Step S1705, the browser program 11 determines whether the button 172 has been clicked to load the original data, thus read, into the working area provided in the temporary edition space 6. If the button 172 is found not clicked, the process returns to Step S1704, which is repeated.

If the button 172 is found clicked, in Step S1705, the process proceeds to Step S1706. In Step S1706, the browser program 11 transmits the data ID of the original data selected, to the moving-picture editing server 3 through the Internet 2.

In Step S2706, the moving-picture editing program 12 receives the data ID transmitted from the personal computer 1. In Step S2707, the moving-picture editing program 12 reads the charge flag corresponding to the data ID, from the shared video-data management database 5. The program 12 determines whether the user should pay for the data to be loaded. If it is determined that the user should pay, the process goes to Step S2708. In Step S2708, the fee associated with the data ID is read from the user video-data management database 4. The service charge recorded in the user data management database 7 is updated, charging the fee on the user.

If it is determined that the user need not pay, in Step S2707, Step S2708 is skipped, and the process goes to Step S2709.

In Step S2709, the moving-picture editing program 12 secures a working area in the temporary edition space 6. In Step S2710, the moving-picture editing program 12 reads the shared original data from the user video-data management database 4. The data thus read is loaded into the working area provided in the temporary edition space 6.

In Step S2711, the moving-picture editing program 12 transmits the data showing that the shared original data has been loaded, to the personal computer 1 through the Internet 2.

In Step S1707, the browser program 11 makes the computer 1 receive the data showing that the shared original data has been loaded. In Step S1708, the browser program 11 displays the data, informing the user that the shared original data has been loaded. Here ends the process of loading the shared data.

Thus, the moving-picture editing server 3 loads the shared original data the user of the computer 1 has selected, into the working area that is provided in the temporary edition space 6. If the user should pay for the shared data, the server 3 operates to charge the fee on the user. When the shared original data selected is loaded into the working area of the temporary edition space 6, the personal computer 1 displays the data showing that the data has been so loaded.

Figure 40:
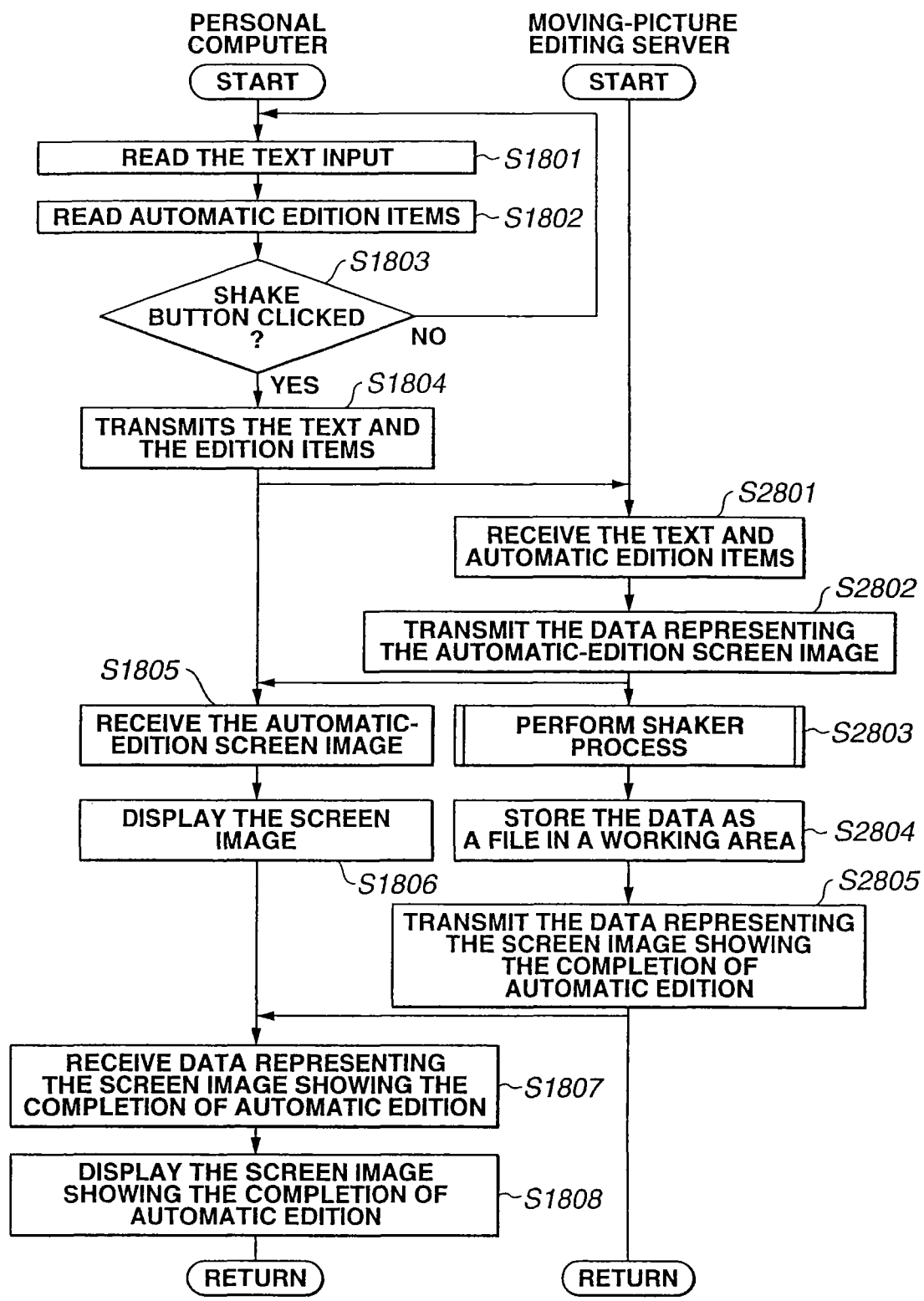
FIG. 40 is a flowchart explaining the process of automatically editing data.

The process of automatically editing the original data, which is carried out in Step S17 (FIG. 32), will be described in detail with reference to the flowchart of FIG. 40. In Step S1801, the browser program 11 reads the text input in the window 284. In Step S1802, the browser program 11 reads the data showing the automatic edition items. The automatic edition items include the selection of any one of the selection buttons 281-1 to 281-5, the loop button 282 and the selection of the text shake button 283.

In Step S1803, the browser program 11 determines whether the shake button 285 has been clicked. If the shake button 285 is found not clicked, the process returns to Step S1801. In Step S1801, the text is read again and the automatic edition items are read again.

If the shake button 285 is found clicked, in Step S1803, the process advances to Step S1804. In Step S1804, the browser program 11 transmits the text read in Step S1801 and the automatic edition items read in Step S1802, to the moving-picture editing server 3 through the Internet 2.

In Step S2801, the moving-picture editing program 12 causes the server 3 to receive the text and automatic edition items transmitted from the personal computer 1. In Step S2802, the moving-picture editing program 12 transmits the data representing an automatic-edition screen image, to the personal computer 1 via the Internet 2.

Figure 29:
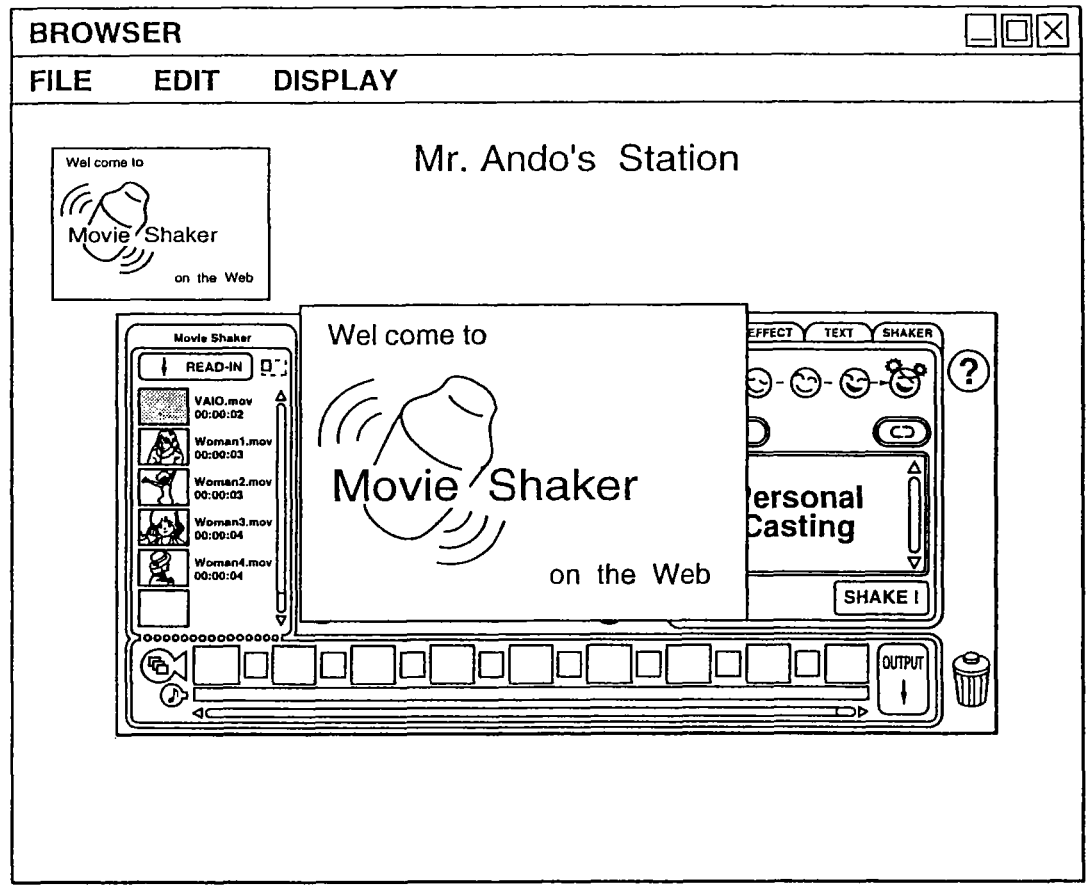
FIG. 29 is a diagram depicting an image the personal computer may display.

In Step S1805, the browser program 11 receives the data representing the automatic-edition screen image, which has been transmitted from the moving-picture editing server 3. In Step S1806, the browser program 11 makes the computer 1 display such an automatic-edition screen image as is illustrated in FIG. 29.

In Step S2803, the moving-picture editing program 12 is executed to perform a shaker process. The shaker process will be explained later in detail, with reference to the flowchart of FIGS. 41 to 43.

In Step S2804, moving-picture editing program 12 stores the moving-picture data generated in the shaker process, as a file, into one of the working areas provided in the temporary edition space 6. In Step S2805, the moving-picture editing program 12 transmits the data showing that the automatic edition has been completed, to the personal computer 1 via the Internet 2.

Figure 30:
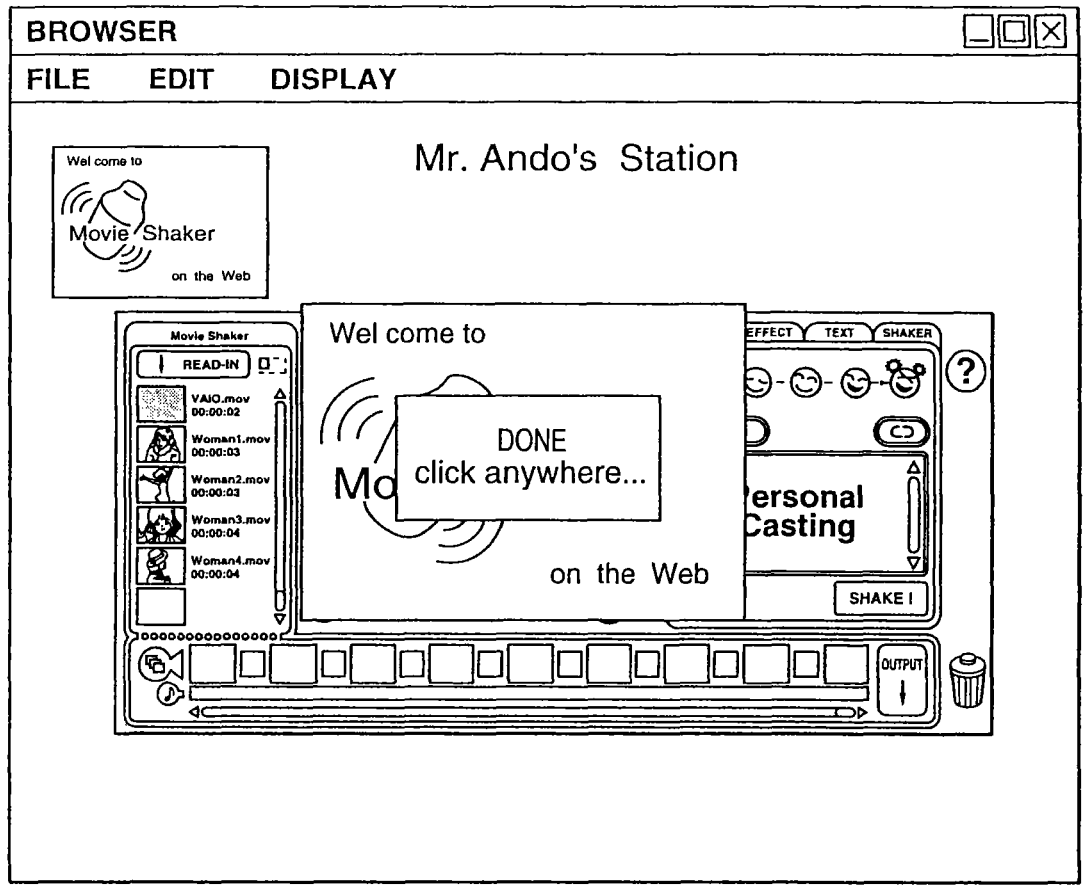
FIG. 30 is a diagram illustrating a screen image the personal computer may display.

In Step S1805, the browser program 11 displays the data showing the completion of automatic edition, which has been transmitted from the moving-picture editing server 3. In Step S1806, the browser program 11 makes the computer 1 display such a screen image as shown in FIG. 30, which informs of the completion of automatic edition.

Thus, the personal computer 1 can cause the moving-picture editing server 3 to edit the original data.

Figure 41:
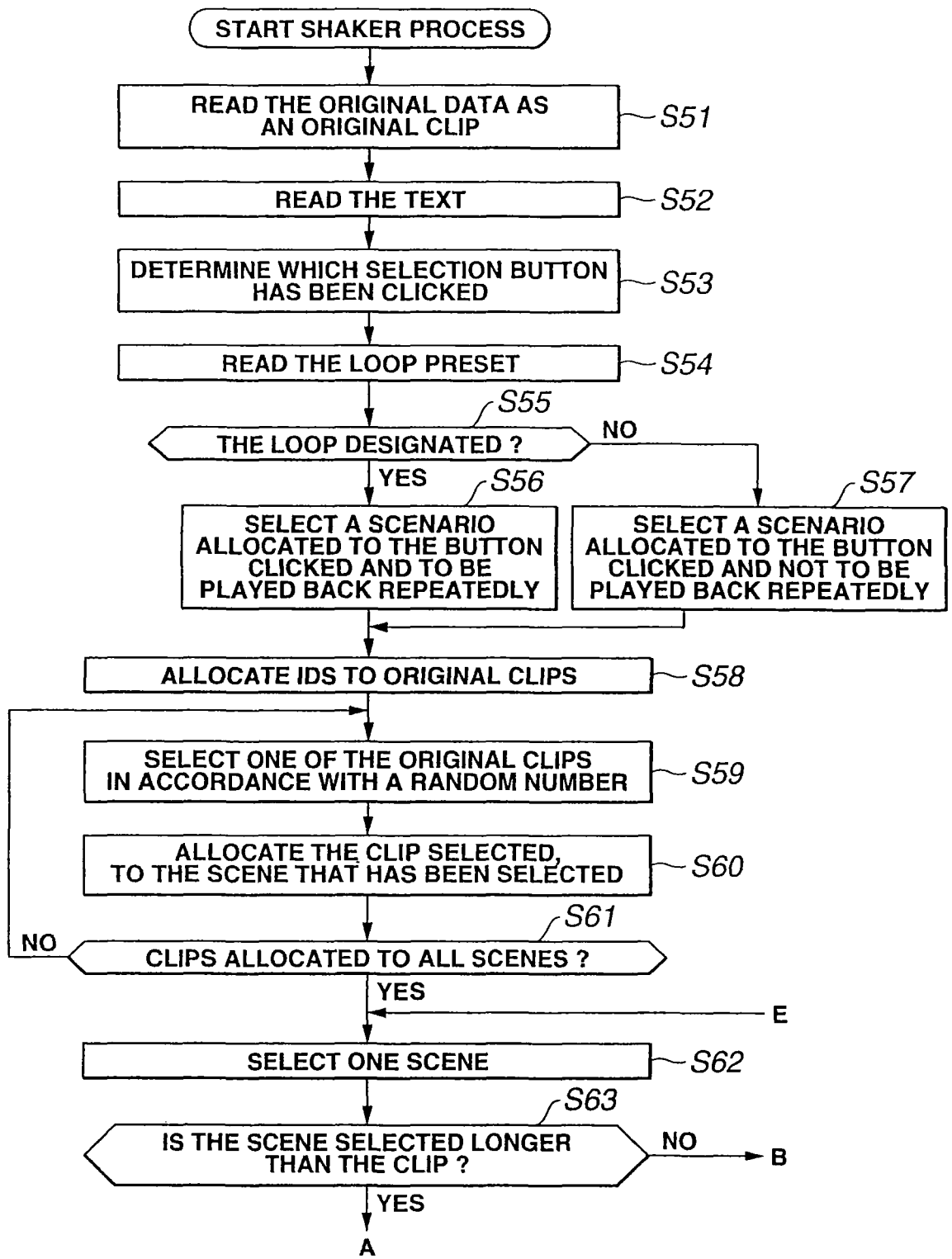
FIGS. 41 to 43 are a flowchart explaining the shaker process.
Figure 42:
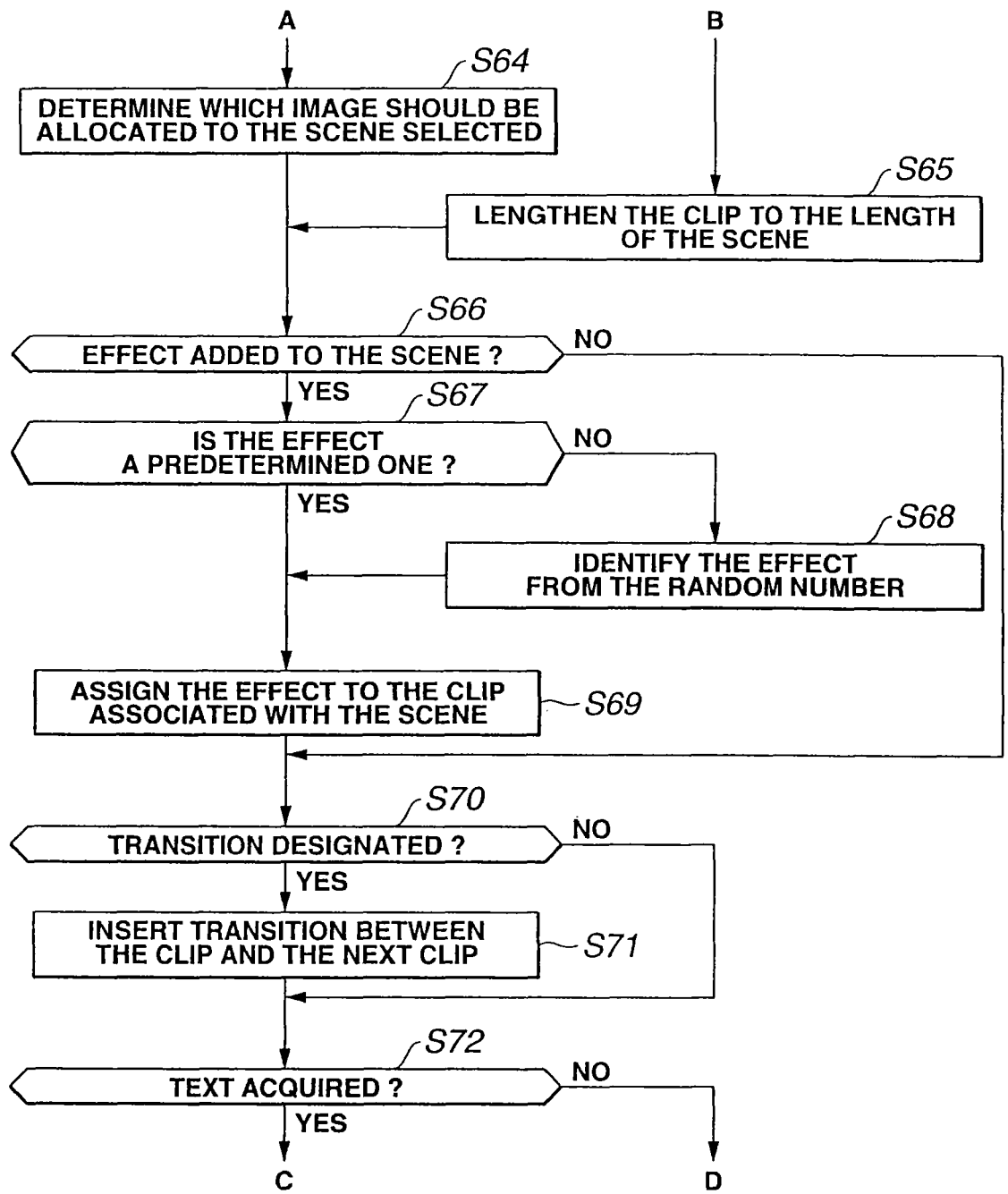
Figure 43:
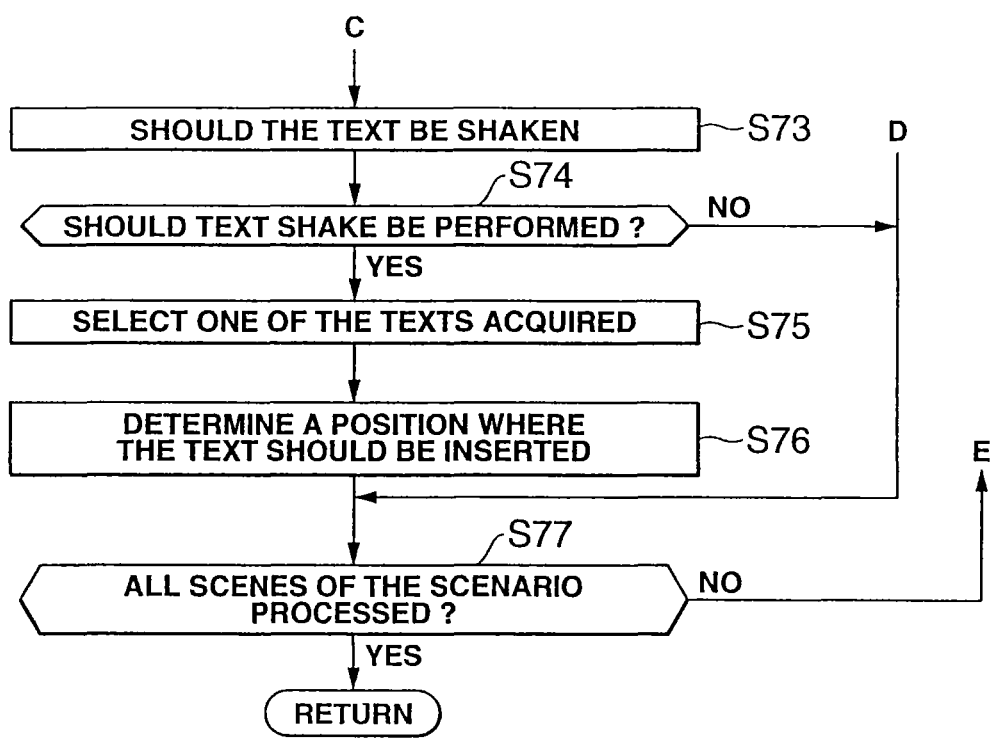

The shaker process (i.e., automatic edition), which is performed in Step S2803, will be described in detail with reference to the flowchart of FIGS. 41 to 43. The steps that will be described below are carried out in accordance with the moving-picture editing program 12, unless otherwise explained. At first, in Step S51, the original data loaded into a working area of the temporary edition space 6 is read as an original clip. That is, as indicated above, the moving-picture editing program 12 has loaded the original data and the like (i.e., original clip) designated by the user into the working area of the space 6 from the user video-data management database 4.

The original data read at this time is not limited to the data recorded in the user video-data management database 4. Rather, the original data may be the data read into the web server (not shown). It may be the data the disc that drive 42 has read from the magnetic disc 61, optical disc 62 or magneto-optical disc 63. Further, it may be the data read from semiconductor memory 64.

The shaker process goes to Step S52, in which the text to be shaken, if already received, is read. More specifically, the user clicks the tag 271-1, causing the personal computer 1 to display the shaker window (FIG. 28). To initiate the text shaking, the user clicks the text shake button 283, whereby the window 284 is displayed as is illustrated in FIG. 28. The user then operates the keyboard or the like to input the text to be subjected to the shaker process. The personal computer 1 reads the text and displays the same in the window 284.

The text input has been received by the moving-picture editing server 3 in Step S2801 (FIG. 20) before the shake process.

The user clicks one of the five selection buttons 281-1 to 281-5. These buttons 281-1 to 281-5 have been assigned to prescribed scenarios, respectively. (The scenarios are recorded in the moving-picture editing server 3.) Therefore, the scenario to which the button 281 clicked is assigned is selected. The data corresponding to the selection button 281 clicked is received in Step S2801 in accordance with the moving-picture editing program 12.

In Step S53, the moving-picture editing program 12 determines which one of the selection buttons 281-1 to 281-5 has been clicked.

Figure 44A:
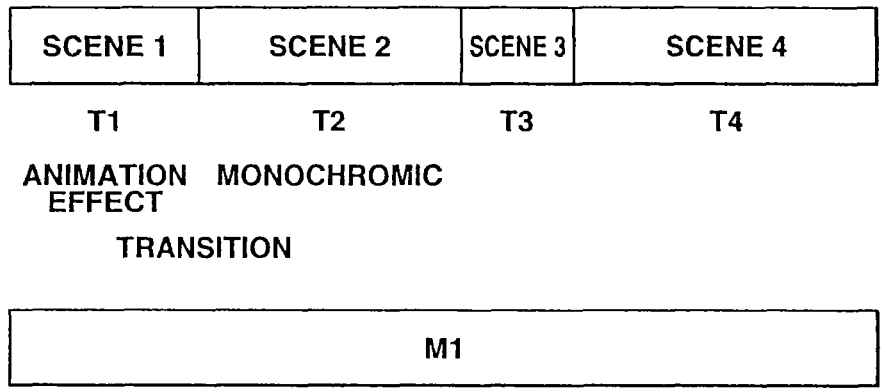
FIGS. 44A and 44B are diagrams representing a scenario.

The scenario shown in FIG. 44A is allocated to the selection button 281-1. This scenario consists of four scenes 1 to 4. The scenes 1 to 4 have lengths T1 to T4, respectively. Animation effect is added to the scene 1, while monochromic color adjustment has been applied to the scene 2. Transition is inserted between the scene 1 and the scene 2. Further, music M1 accompanies this scenario.

The moving-picture editing program 12 selects four of the original clips on the screen image displayed in the original tray 201, as will be described later in detail. The four original clips thus selected are assigned to the scenes 1 to 4, respectively. That is, the scenario is automatically edited in accordance with the moving-picture editing program 12.

Figure 44B:
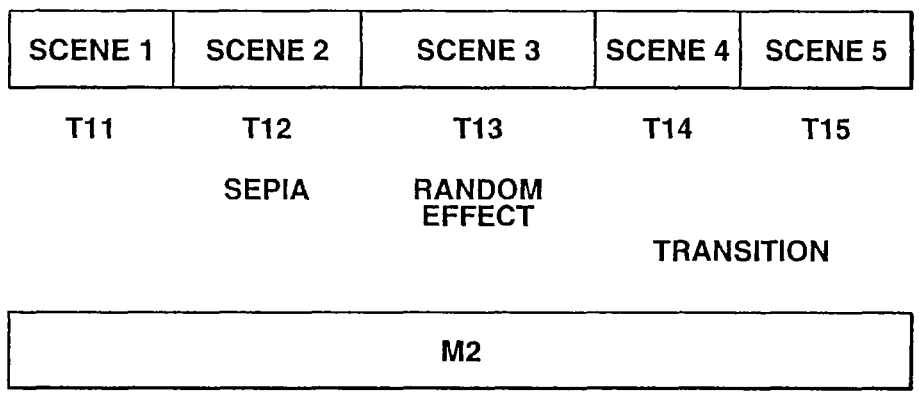

FIG. 44B illustrates the scenario corresponding to the selection button 281-2. This scenario is composed of five scenes 1 to 5, which have lengths T11 to T15, respectively. Color sepia is applied to the scene 2. Random effect is added to scene 3. Transition is inserted between the scene 4 and the scene 5. Music M2 accompanies this scenario.

Three other scenarios (not shown) are allocated to the remaining selection buttons 281-3 to 281-5, respectively.

Before the shake process, the moving-picture editing server 3 receives in Step S2801 (FIG. 20) the data showing which one of the selection buttons 281-1 to 281-5 has been clicked.

In Step S54, the loop preset is read in accordance with moving-picture editing program 12. That is, the user clicks the loop button 282 to playback the scenario that has been edited. The data associated with the loop button 282 has been received in Step S2801 (FIG. 20) in accordance with the moving-picture editing program 12. Then, in Step S54, the moving-picture editing program 12 stores the data associated with the loop button 282.

Figure 45A:
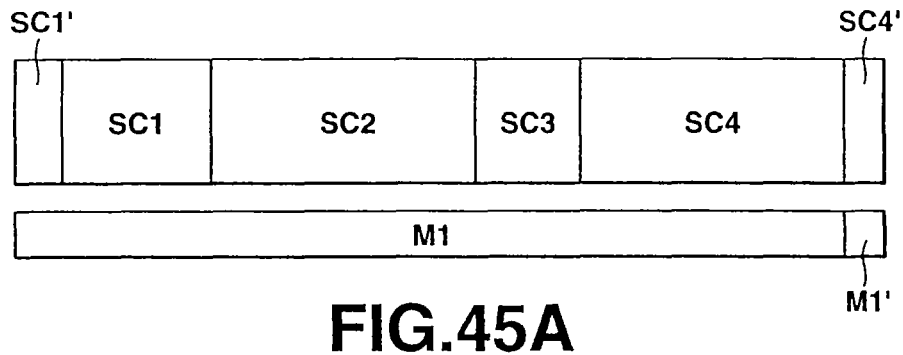
FIGS. 45A to 45D are diagrams for explaining a scene.

The scenario allocated to the selection button 281-1, for example, has is configured as is illustrated in FIG. 44A. More precisely, the scene is configured as shown in FIG. 45A if the loop button 282 is not selected (to play back the scene repeatedly). As FIG. 45A shows, a fade-in part SC1' is provided at the beginning of the first scene 1 (SC1) and a fade-out part SC4' is provided at the end of the last scene 4 (SC4). Further, a no-sound part M1' is added to the end of the music M1.

Figure 45B:
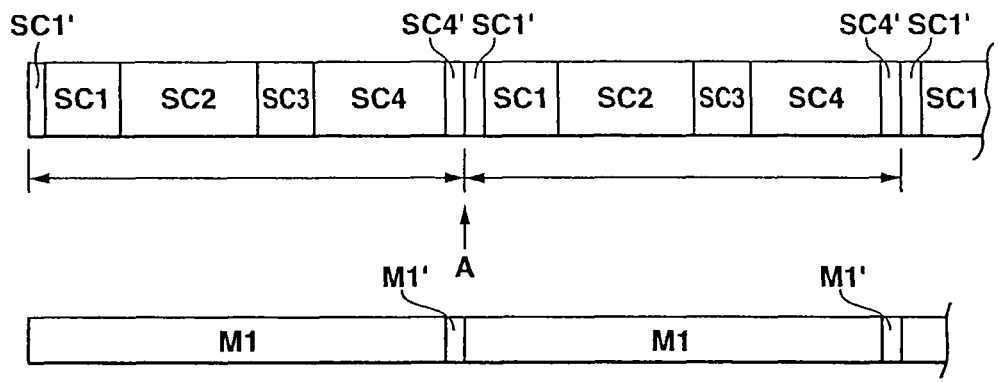

The data edited in accordance with the scenario configured as is shown in FIG. 45A will be played back repeatedly, as is illustrated in FIG. 45B. To be more specific, the playback starts at the fade-in part SC1' and the data is completely played back for the first time at the fade-out part SC4'. The data is then played back for the second time, beginning at the fade-in part SC1' and ending at the fade-out part SC4'. Thus, the scene 1, scene 2, scene 3 and scene 4 are sequentially played back again, and the fade-out part SC4' is finally played back. The music M1 is repeatedly played back, too. Its no-sound part M1' is played back at the junction A between the first playback of the scenario and the second playback thereof. Therefore, the audience can easily recognize the scenario has been played back when no sound is generated at the junction A.

Figure 45C:
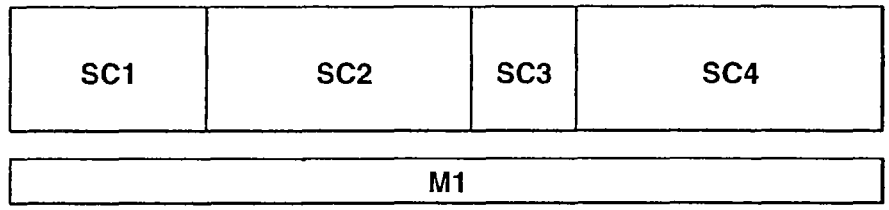

The loop button 282 may be clicked after the selection button 281-1 is clicked. In this case, the scenario shown in FIG. 45C is selected.

This scenario consists of four scenes 1 to 4. When the scene 1 is played back again after the scene 4, the transition from the scene 4 to the scene 1, i.e., the second playback of the scenario, is not recognized at all. The transition from scene 4 to scene 1 is perceived as nothing more than a transition of scenes, such as the transition from scene 1 to scene 2, the transition from scene 2 to scene 3, the transition scene 3 to scene 4. The audience regard the transition from scene 4 to scene 1 as nothing more than a change of scenes.

Similarly, the audience do not feel that a scene ends even if the music M1 is played back again immediately after the first playback of all music M1.

Figure 45D:
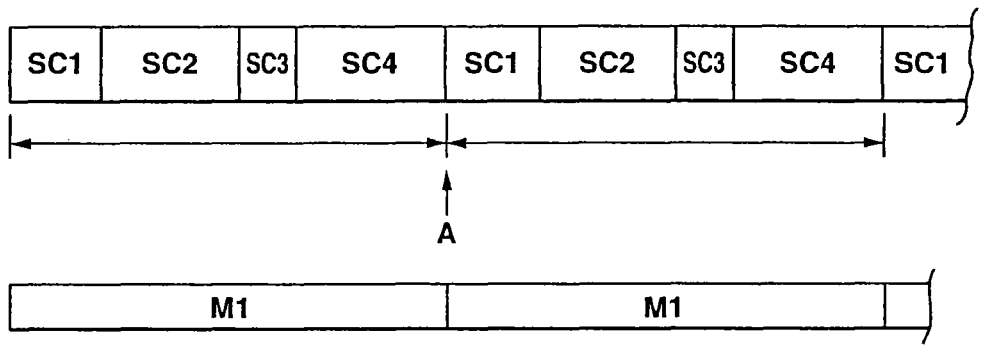

Thus, even if the scenes 1 to 4 are played back again after the first playback of these scenes as is illustrated in FIG. 45D, the audience can hardly recognize the first playback ends at the junction A and then the second playback starts.

Thus, the scenario allocated to any one of the selection buttons 281-1 top 281-5 may be repeatedly played back or not repeatedly played back. The scenario is not repeatedly played back if the user do not click the loop button 282. The scenario is repeatedly played back if the user clicks the loop button 282.

In Step S55, the moving-picture editing program 12 determines whether the loop has been designated, or whether the loop button 282 has been clicked. If the loop is found designated already, the process proceeds to Step S56. In Step S56, the moving-picture editing program 12 selects the scenario which is allocated to one of the selection buttons 281-1 to 281-5, which has been clicked and which should be played back repeatedly. If the loop is found not designated, in Step S55, the process proceeds to Step S57. In Step S57, the moving-picture editing program 12 selects the scenario which is allocated to one of the selection buttons 281-1 to 281-5, which has been clicked and which should not be played back repeatedly.

The process goes from Step S56 or S57 to Step S58. In Step S58, the moving-picture editing program 12 allocates IDs (identification numbers) to the original clips read in Step S51. In Step S59, the moving-picture editing program 12 selects one of the original clips in accordance with a random number. In other words, the program 12 selects an ID from among many allocated to the original clips in Step S58, thereby choosing one original clip.

In Step S60, the moving-picture editing program 12 allocates the original clip selected in Step S59, to one of the scenes composing the scenario that has been selected in Step S59. (This scene is the first scene, in this case).

Then, in Step S61, it is determined whether the original clips have been allocated to all scenes. If the clips have not been so allocated, the process returns to Step S59. Steps S59 and S60 are performed again. The prescribed original clips are thereby allocated to the scene 1, scene 2, scene 3 and scene 4, all shown in FIG. 44A.

If the clips are found allocated, in Step S61, the process proceeds to Step S62. In Step S62 the moving-picture editing program 12 selects one scene. Assume that the first scene is selected. In Step S63, moving-picture editing program 12 determines whether the scene selected in Step S62 is shorter than the original clip. If the scene is shorter than the original clip, the process advances to Step S64. In Step S64, the moving-picture editing program 12 identify that part of the original clip, which should be allocated to the scene, from the random number. The original clip may be five seconds long and the scene may be one second long. If so, the program 12 generates a random number, determining which image that last one second should be allocated to that scene.

In Step S63 the scene may be found not shorter than the original clip. In this case, the process goes to Step S65. In Step 65, the moving-picture editing program 12 lengthens the original clip to the length of the scene. More precisely, the program 12 lengthens the original clip five times if the clip is one second long, while the scene is five seconds long. (Namely, the clip is played back at a speed five times as slow.) Slow-motion playback is thereby achieved, rendering the original clip as long as the scene.

From Step S64 or the Step S65 the process proceeds to Step S66. In Step S66, the moving-picture editing program 12 determines whether an effect is added to the scene of the scenario. If an effect is added to the scene, as the animation effect added to the scene 1 shown in FIG. 44A, the process proceeds to Step S67. In Step S67, the moving-picture editing program 12 determines whether the effect is a predetermined one or not. A predetermined effect may be assigned to the scene, as the animation effect to the scene 1 shown in FIG. 44A. Alternatively, no predetermined effect may be assigned to the scene, as a random effect to the scene 3 depicted in FIG. 44B. The random effect, if added to any scene, means that some effect should be added to the scene, but which effect should be applied thereto has yet to be determined. If this is the case, process proceeds to Step S68. Hence, a random number is generated to designate one of, for example, various 24 effects that have been prepared.

In Step S67 the effect may be found already determined. In Step S68 one effect may be designated. In either case, the process proceeds to Step S69. In Step S69, the moving-picture editing program 12 assigns the effect determined or designated, to the original clip associated with the scene selected.

In Step S66 no effect may be found added to the scene of the scenario. If this is the case, Steps S67 to S69 are unnecessary and are not carried out.

Next, in Step S70, the moving-picture editing program 12 determines whether a transition has been designated or not. In the case where a transition has been designated, the process goes to Step S71. In Step S71, the moving-picture editing program 12 inserts a transition between the original clip and the next original clip. Wipe effect is thereby applied, and the image of the scene is switched to the next scene, in a specific way as is illustrated in FIG. 27.

If no transition is found not designated, in Step S70, Step S71 is unnecessary and will be skipped.

In Step S72, the moving-picture editing program 12 determines whether a text has been acquired. As pointed out above, the text to be shaken is read in Step S52. If so, the process advances to Step S73, in which the program 12 determines, at random, whether the text should be shaken in the scene to be processed. Then, in Step S74, the program 12 determines whether the text should be shaken. If it is determined that the text should be shaken, the process advances to Step S75. In Step S75, one of the texts acquired is selected at random. For example, one of the three texts shown in FIG. 28, which have been read, is selected as one that corresponds to the scene.

Next, in Step S76, the moving-picture editing program 12 determines the position at which the text should be inserted. The position is selected from five candidates, which are the center, upper-right, upper-left, lower-left and lower-right parts of the screen.

If it is determined in Step S74 that the text need not be shaken, Step S75 and Step S76 are skipped. If it is determined in Step S72 that no text has been acquired, Steps S73 to S76 are skipped.

The process proceeds to Step S77, in which it is determined whether all scenes have been processed. If all scenes have not been processed, the process returns to Step S62, the above-mentioned sequence of steps is performed on the next scene.

If it is determined in Step S77 that all scenes have been processed, the shaker process is terminated.

Figure 46:
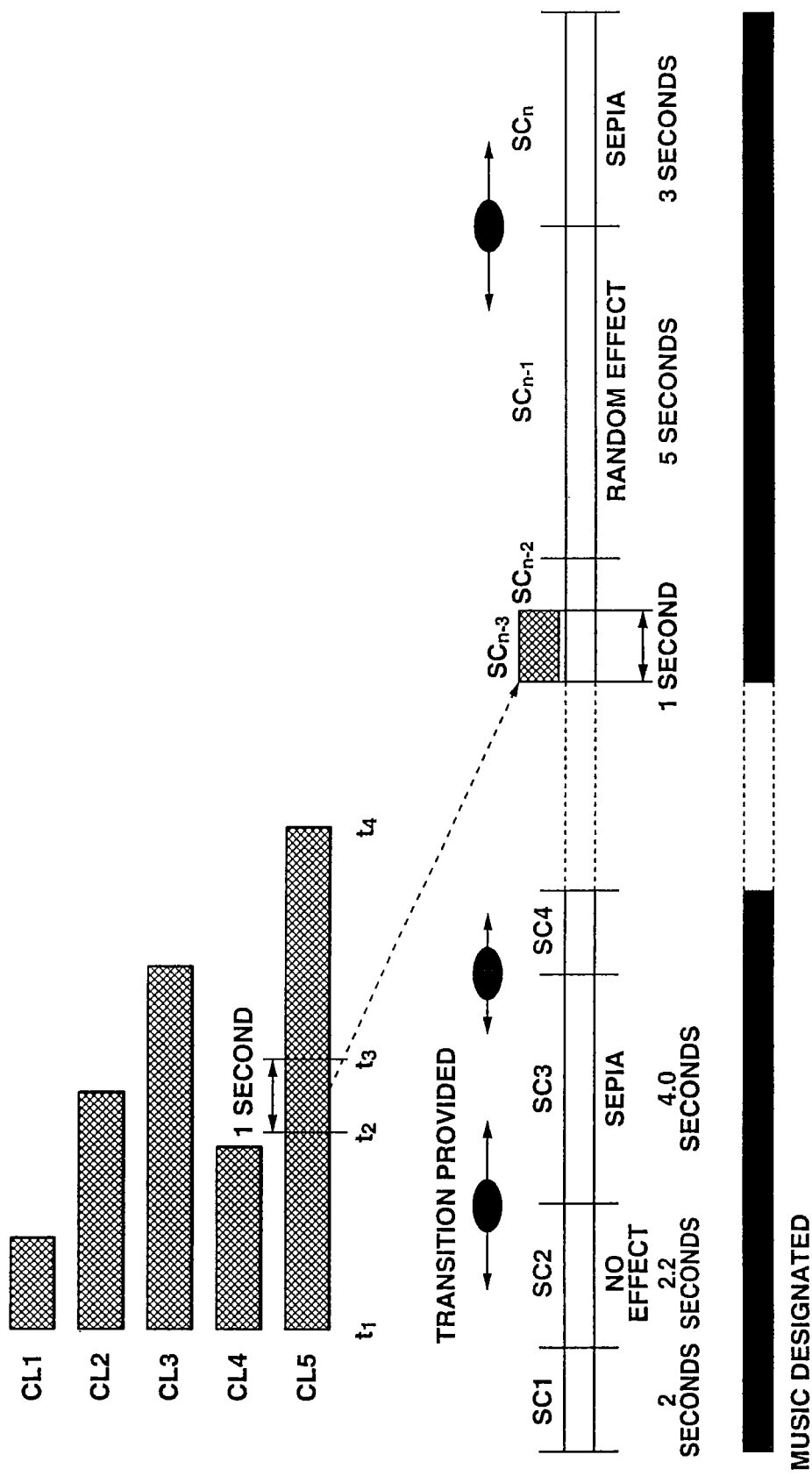
FIG. 46 is a schematic representation of the shaker process.

FIG. 46 is a graphic representation of the shaker process. As FIG. 46 shows, original clips CL1 to CL5 are designated as original clips. The user has clicked one of the selection buttons 281, thus selecting one scenario. This scenario consists of n scenes SC1 to SCn. Of the scenes, the scene SC3 has been subjected to color adjustment, wherein sepia is chosen. A random effect is applied to the scene SCn−1. Color adjustment has been effected on the scene SCn, thereby selecting sepia. A transition is inserted between the scene SC2 and the scene SC3. A transition is inserted between the scene SC3 and the scene SC4. Further, a transition is inserted between the scene SCn−1 and the scene SCn. The scene SC1 is two second long, and the scene SC2 is 2.2 seconds long, the scene SC3 is 4.0 seconds long. The scene SCn−3 is one second long, the scene SCn−1 is five seconds long, and the scene SCn is three seconds long. Music is predetermined for these scenes. The color adjustment, the insertion of transitions, the lengths of scenes, and the music for the scenes are prescribed in the moving-picture editing program 12.

The moving-picture editing program 12 selects, at random, one of the five original clips CL1 to CL5, and allocates the original clip to one of the scenes SC1 to SCn. Assume the program 12 allocates the original clip CL5 to the scene SCn−3. Then, the scene SCn−3 is one second long, while the original clip CL5 is one second or more longer. In this case, the one-second part of the original clip CL5 lasting from time t1 to time t4, which extends from time t2 to time t3, is allocated to the scene SCn−3.

Thus, the user can obtain image data edited in a prescribed manner can be automatically generated, merely by clicking the original clip that corresponds to the image data. Since the original clips are allocated to scenes at random, different results of edition will be obtained even if the user clicks the same original clip.

Figure 47:
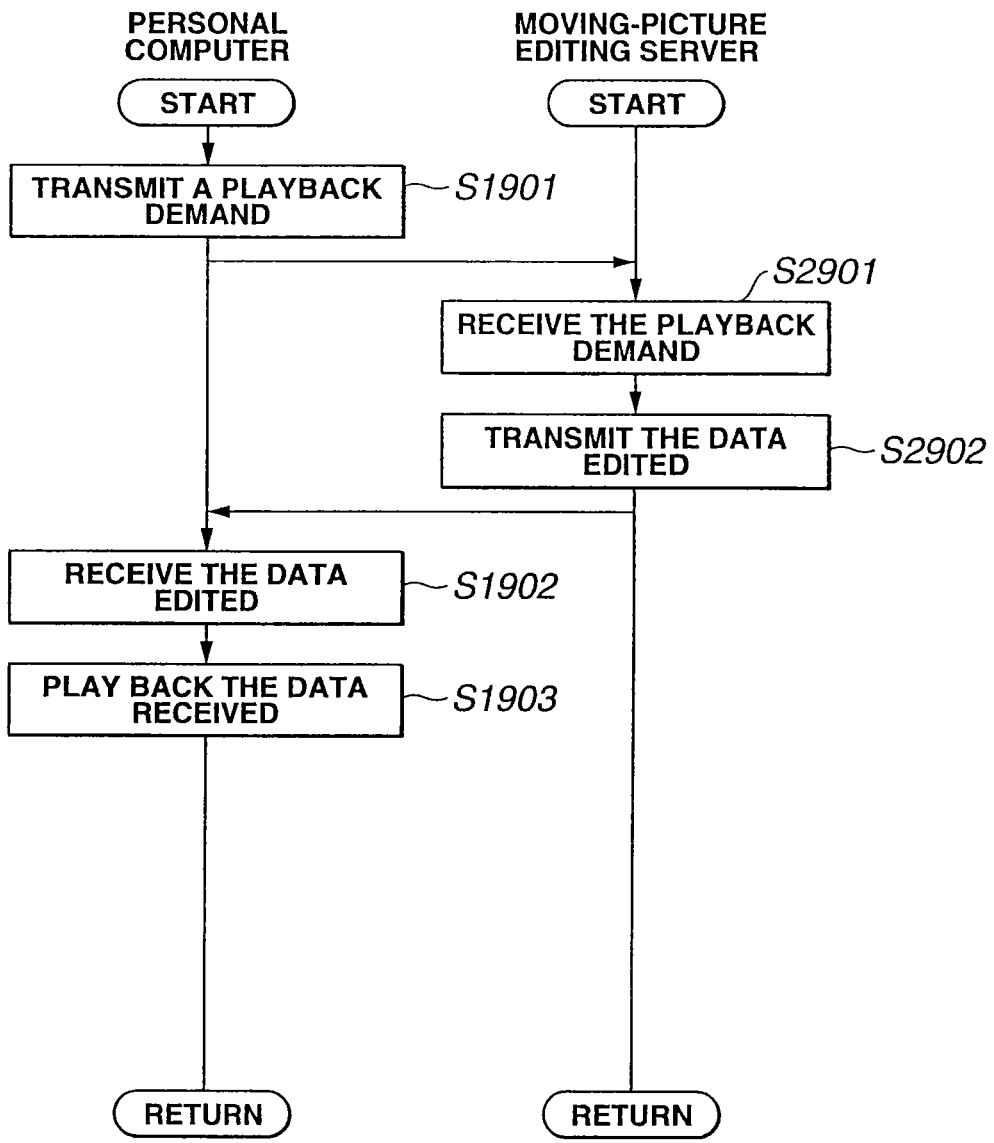
FIG. 47 is a flowchart explaining the process of confirming an moving picture.

The process of enabling the user to confirm the moving picture generated by means of automatic edition, which is performed in Step S18 (FIG. 32), will be described with reference to the flowchart of FIG. 47. In Step S1901, the browser program 11 transmits a playback demand for the moving-picture data generated by the automatic edition, to the moving-picture editing server 3 through the Internet 2.

In Step S2901, the moving-picture editing program 12 is executed to receive the playback demand for the moving-picture data, which the personal computer 1 has transmitted. In Step S2902, the program 12 reads the moving-picture data from the file recorded in the working area provided in the temporary edition space 6. The moving-picture data, thus read, is transmitted to the personal computer 1 via the Internet 2.

In Step S1902, the browser program 11 makes the computer 1 receive the moving-picture data transmitted from the moving-picture editing server 3. In Step S1903, the browser program 11 plays back the moving-picture data and terminate the process.

The browser program 11 thus plays back and displays the moving picture generated by the automatic edition. The user of the personal computer 1 therefore confirms the moving picture and can decide whether to save the moving picture.

Figure 48:
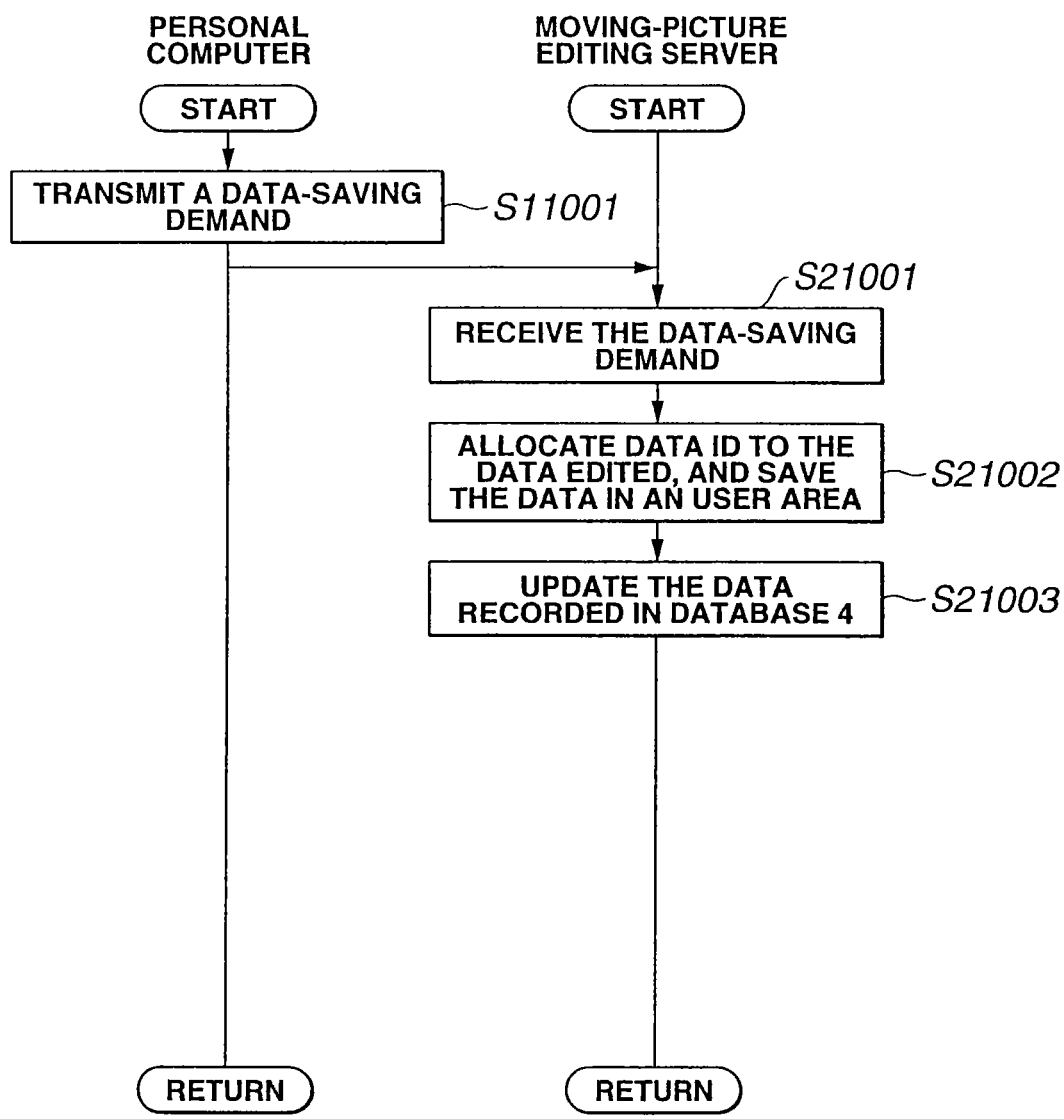
FIG. 48 is a flowchart explaining the process of saving moving picture data.

The process of recording the moving picture generated by the automatic edition, which is performed in Step S19 (FIG. 32), will be explained with reference to the flowchart of FIG. 48. In Step S11001, the browser program 11 transmits a data-saving demand for saving the moving-picture data generated by the automatic edition, to the moving-picture editing server 3 through the Internet 2.

In Step S21001, the moving-picture editing program 12 receives the data-saving demand transmitted from the personal computer 1. In Step S21002, the program 12 generates a data ID and allocates the same to the data stored in the file recorded in the working area of the temporary edition space 6. In Step S21003, the moving-picture editing program 12 records the data ID and the data that corresponds to the data ID into the user video-data management database 4, as is illustrated in FIG. 4. The program 12 updates the data recorded in the user video-data management database 4.

The browser program 11 can thus record the moving-picture data in the user video-data management database 4 after the data has been automatically edited.

As indicated above, moving-picture editing server 3 can record the moving-picture data, the still-picture data or the sound data transmitted from the personal computer 1 via the Internet 2, as original data, into the user video-data management database 4. Additionally, the moving-picture editing server 3 can automatically generate a moving picture from the original data owned by the user and recorded in the user video-data management database 4, in response to a demand transmitted from the personal computer 1.

Moreover, the moving-picture editing server 3 can automatically generate a moving picture from the original data shared by the users and recorded in the user video-data management database 4, in response to a demand transmitted from the personal computer 1.

The user of the personal computer 1 can impart an attribute to the moving-picture data automatically generated and recorded in the database 4, so that this moving-picture data may be used by the other users.

The above-mentioned sequence of steps can be performed by software, as well as by hardware. To perform the sequence by using software, the programs composing the software, which are provided in a program-storing medium, are installed into a computer that is incorporated in a dedicated hardware system or into a general-purpose computer that can perform various functions.

The program-storing medium storing the programs to be installed into a computer and executed thereby may be a package medium such as a magnetic disc 61 (including a floppy disc), an optical disc 62 (including a CD-ROM (Compact Disc-Read Only Memory) and a DVD (Digital Versatile Disc)) or a magneto-optical disc 63 (including an MD (Mini-Disc)). Alternatively, the program-storing medium may be a ROM 32 or an HDD 41, in which the programs are stored either temporarily or permanently. The programs are written into the program-storing medium, if necessary, through the communication section 43 that is a router or a modem, by using a cabled or radio communication medium such as the local area network, the Internet 2 or the digital satellite broadcasting system.

In the present invention, the steps described in any program stored in the program-storing medium may be performed not only sequentially in the order they are described, but also in parallel or independently.

In the present invention, the word "system" used herein means an apparatus composed of a plurality of devices.

INDUSTRIAL APPLICABILITY

In the present invention, a scenario consisting of a plurality of scenes, each lasting for a given time, is acquired in response to a demand made by a data-processing apparatus. A given number of image data items that will be used in the scenario are acquired, too, in response to a demand made by the data-processing apparatus. Prescribed ones of the image data items acquired are selected and allocated to the scenes of the scenario acquired. The image data items selected are corrected in accordance with the prescribed image data items that have been allocated to the scenes of the scenario the scenes of the scenario. This enables the user of the apparatus to edit images easily and quickly.

The invention claimed is:

1. An information processing device, comprising:
circuitry configured to provide information to a user, the information defining a graphical user interface for creating a new video by combining multiple video clips, wherein
the graphical user interface comprises a first area to display a plurality of images, each image representing a corresponding video clip;
the graphical user interface comprises a second area to display a video being played back; and
the graphical user interface comprises a third area to display a single video track that includes at least two video clips in an order of playback, and the single video track is used to create the new video from the at least two video clips,
wherein the circuitry is further configured to:
provide the information defining the graphical user interface, which provides for automatically trimming of a video clip of the at least two video clips by designating a start position and an end position only by positioning a start graphical pointer at the start position and positioning an end graphical pointer at the end position, and
select one text display effect item from a plurality of text display effect items, wherein the selected text display effect item is added to one of the multiple video clips when a drag-and-drop operation is performed.

2. The information processing device of claim 1, wherein the circuitry is configured to provide the information defining the graphical user interface, in which each of the at least two video clips is represented by a picture that has a fixed size within the single video track regardless of a playback time.

3. The information processing device of claim 1, wherein the circuitry is configured to provide the information defining the graphical user interface, in which the single video track further includes a transition between the at least two video clips.

4. The information processing device of claim 3, wherein the circuitry is further configured to select the transition from a plurality of transitions, the plurality of transitions including a wipe transition.

5. The information processing device of claim 3, wherein the circuitry is further configured to select the transition from a plurality of transitions, wherein the selected transition is added to the single video track when a drag-and-drop operation to the single video track is performed.

6. The information processing device of claim 1, wherein the circuitry is further configured to provide the information defining the graphical user interface, which displays, in the first area, a title and a playback time for each of the plurality of images.

7. The information processing device of claim 1, wherein the circuitry is further configured to select one image from the plurality of images displayed in the first area, wherein the video track corresponding to the selected image is added to the single video track when a drag-and-drop operation to the single video track is performed.

8. The information processing device of claim 7, wherein the circuitry is further configured to move the selected one image from one position to another position of the single video track when a drag-and-drop operation is performed.

9. The information processing device of claim 1, wherein the circuitry is further configured to provide the information defining the graphical user interface in which the first area of the graphical user interface further displays at least one music item separately from the images corresponding to the video clips and the third area further displays an audio track along with the single video track; and the circuitry is further configured to select one music item from the at least one music item, wherein the selected music item is added to the audio track when a drag-and-drop operation to the audio track is performed.

10. An information processing method, comprising:
providing information to a user, the information defining a graphical user interface for creating a new video by combining multiple video clips, wherein
the graphical user interface comprises a first area to display a plurality of images, each image representing a corresponding video clip;
the graphical user interface comprises a second area to display a video being played back;
the graphical user interface comprises a third area to display a single video track that includes at least two video clips in an order of playback, and the video track is used to create the new video from the at least two video clips,
wherein the providing step comprises
providing the information defining the graphical user interface, which provides for automatically trimming of a video clip of the at least two video clips by designating a start position or and an end position only by positioning a start graphical pointer at the start position and positioning an end graphical pointer at the end position; and
selecting one text display effect item from a plurality of text display effect items, wherein the selected text display effect item is added to one of the multiple video clips when a drag-and-drop operation is performed.

11. The information processing method of claim 10, wherein each of the at least two video clips is represented by a picture that has a fixed size within the single video track regardless of a playback time.

12. The information processing method of claim 10, wherein the single video track further includes a transition between the at least two video clips.

13. The information processing method of claim 12, further comprising selecting the transition from a plurality of transitions, the plurality of transitions including a wipe transition.

14. The information processing method of claim 12, further comprising selecting the transition from a plurality of transitions, wherein the selected transition is added to the single video track when a drag-and-drop operation to the single video track is performed.

15. The information processing method of claim 10, wherein the providing step comprises providing the information defining the graphical user interface, which displays, in the first area, a title and a playback time for each of the plurality of images.

16. The information processing method of claim 10, further comprising selecting one image from the plurality of image displayed in the first area, wherein the video track corresponding to the selected image is added to the single video track when a drag-and-drop operation to the single video track is performed.

17. The information processing method of claim 16, further comprising moving the selected one image from one position to another position of the single video track when a drag-and-drop operation is performed.

18. The information processing method of claim 10, wherein
the providing step comprises providing the information defining the graphical user interface, in which the first area of the graphical user interface further displays at least one music item separately from the images corresponding to the video clips and the third area further displays an audio track along with the single video track; and
the method further comprises selecting one music item from the at least one music item, wherein the selected music item is added to the audio track when a drag-and-drop operation to the audio track is performed.

19. A non-transitory computer-readable medium storing program instructions that, when executed by a computer processor, cause the computer processor to perform a method, comprising:
providing information to a user, the information defining a graphical user interface for creating a new video by combining multiple video clips, wherein
the graphical user interface comprises a first area to display a plurality of images, each image representing a corresponding video clip;
the graphical user interface comprises a second area to display a video being played back; and
the graphical user interface comprises a third area to display a single video track that includes at least two video clips in an order of playback, and the video track is used to create the new video from the at least two video clips,
wherein the providing step comprises
providing the information defining the graphical user interface, which provides for automatically trimming of a video clip of the at least two video clips by designating a start position and an end position only by positioning a start graphical pointer at the start position and positioning an end graphical pointer at the end position; and
selecting one text display effect item from a plurality of text display effect items, wherein the selected text display effect item is added to one of the multiple video clips when a drag-and-drop operation is performed.

20. The computer-readable medium of claim 19, wherein each of the at least two video clips is represented by a picture that has a fixed size within the single video track regardless of a playback time.

21. The computer-readable medium of claim 19, wherein the single video track further includes a transition between the at least two video clips.

22. The computer-readable medium of claim 21, further comprising selecting the transition from a plurality of transitions, the plurality of transitions including a wipe transition.

23. The computer-readable medium of claim 21, further comprising selecting the transition from a plurality of transitions, wherein the selected transition is added to the single video track when a drag-and-drop operation to the single video track is performed.

24. The computer-readable medium of claim 19, wherein the providing step comprises providing the information defining the graphical user interface, which displays, in the first area, a title and a playback time for each of the plurality of images.

25. The computer-readable medium of claim 19, further comprising selecting one image from the plurality of image displayed in the first area, wherein the video track corresponding to the selected image is added to the single video track when a drag-and-drop operation to the single video track is performed.

26. The computer-readable medium of claim 25, further comprising moving the selected one image from one position to another position of the single video track when a drag-and-drop operation is performed.

27. The computer-readable medium of claim 19, wherein
the providing step comprises providing the information defining the graphical user interface, in which the first area of the graphical user interface further displays at least one music item separately from the images corresponding to the video clips and the third area further displays an audio track along with the single video track; and
the method further comprises selecting one music item from the at least one music item, wherein the selected music item is added to the audio track when a drag-and-drop operation to the audio track is performed.

28. An information processing device, comprising:
circuitry configured to receive information from a server, the information defining a graphical user interface for creating a new video by combining multiple video clip, wherein
the graphical user interface comprises a first area displaying a plurality of images, each image representing a corresponding video clip;
the graphical user interface comprises a second area for displaying a video being played back; and
the graphical user interface comprises a third area displaying a single video track that includes at least two video clips in an order of playback, and the single video track is used to create the new video from the at least two video clips,
wherein the circuitry is further configured to receive the information defining the graphical user interface, which provides for automatically trimming of a video clip of the at least two video clips by designating a start position and an end position only by positioning a start graphical pointer at the start position and positioning an end graphical pointer at the end position, and select one text display effect item from a plurality of text display effect items, wherein the selected text display effect item is added to one of the multiple video clips when a drag-and-drop operation is performed.

29. The information processing device of claim 28, wherein the circuitry is configured to receive the information defining the graphical user interface, in which each of the at least two video clips has a fixed size within the single video track regardless of a playback time.

30. The information processing device of claim 28, wherein the circuitry is configured to receive the information defining the graphical user interface, in which the single video track further includes a transition between the at least two video clips.

31. The information processing device of claim 30, wherein the circuitry is further configured to select the transition from a plurality of transitions, the plurality of transitions including a wipe transition.

32. The information processing device of claim 30, wherein the circuitry is further configured to select the transition from a plurality of transitions, wherein the selected transition is added to the single video track when a drag-and-drop operation to the single video track is performed.

33. The information processing device of claim 28, wherein the circuitry is further configured to receive the information defining the graphical user interface, which displays, in the first area, a title and a playback time for each of the plurality of image.

34. The information processing device of claim 28, wherein the circuitry is further configured to select one image from the plurality of images displayed in the first area, wherein the video track corresponding to the selected image is added to the single video track when a drag-and-drop operation to the single video track is performed.

35. The information processing device of claim 34, wherein the circuitry is further configured to move the selected one image from one position to another position of the single video track when a drag-and-drop operation is performed.

36. The information processing device of claim 28, wherein the circuitry is further configured to receive the information defining the graphical user interface in which the first area of the graphical user interface further displays at least one music item separately from the images corresponding to the video clips and the third area further displays an audio track along with the single video track; and
the circuitry is further configured to select one music item from the at least one music item, wherein the selected music item is added to the audio track when a drag-and-drop operation to the audio track is performed.

37. An information processing method, comprising:
receiving information to a user device, the information defining a graphical user interface for creating a new video by combining multiple video clips, wherein
the graphical user interface comprises a first area displaying a plurality of images, each image representing a corresponding video clip,
the graphical user interface comprises a second area for displaying a video being played back,
the graphical user interface comprises a third area displaying a single video track that includes at least two video clips in an order of playback, and the single video track is used to create the new video from the at least two video clips,
the receiving step comprises receiving the information defining the graphical user interface, which provides for automatically trimming of a video clip of the at least two video clips by designating a start position and an end position only by positioning a start graphical pointer at the start position and positioning an end graphical pointer at the end position; and
selecting one text display effect item from a plurality of text display effect items, wherein the selected text display effect item is added to one of the multiple video clips when a drag-and-drop operation is performed.

38. The information processing method of claim 37, wherein each of the at least two video clips has a fixed size within the single video track regardless of a playback time.

39. The information processing method of claim 37, wherein the single video track further includes a transition between the at least two video clips.

40. The information processing method of claim 39, further comprising selecting the transition from a plurality of transitions, the plurality of transitions including a wipe transition.

41. The information processing method of claim 39, further comprising selecting the transition from a plurality of transitions, wherein the selected transition is added to the single video track when a drag-and-drop operation to the single video track is performed.

42. The information processing method of claim 37, wherein the receiving step comprises receiving the information defining the graphical user interface, which displays, in the first area, a title and a playback time for each of the plurality of images.

43. The information processing method of claim 37, further comprising selecting one image from the plurality of images displayed in the first area, wherein the video track corresponding to the selected image is added to the single video track when a drag-and-drop operation to the single video track is performed.

44. The information processing method of claim 43, further comprising moving the selected one image from one position to another position of the single video track when a drag-and-drop operation is performed.

45. The information processing method of claim 37, wherein
the receiving step comprises receiving the information defining the graphical user interface, in which the first area of the graphical user interface further displays at least one music item separately from the images corresponding to the video clips and the third area further displays an audio track along with the single video track; and
the method further comprises selecting one music item from the at least one music item, wherein the selected music item is added to the audio track when a drag-and-drop operation to the audio track is performed.

46. A non-transitory computer-readable medium storing program instructions that, when executed by a computer processor, cause the computer processor to perform a method, comprising:
receiving information to a user device, the information defining a graphical user interface for creating a new video by combining multiple video clips, wherein
the graphical user interface comprises a first area displaying a plurality of images, each image representing a corresponding video clip,
the graphical user interface comprises a second area for displaying a video being played back,
the graphical user interface comprises a third area displaying a single video track that includes at least two video clips in an order of playback, and the single video track is used to create the new video from the at least two video clips,
the receiving step comprises receiving the information defining the graphical user interface, which provides for automatically trimming of a video clip of the at least two video clips by designating a start position and an end position only by positioning a start graphical pointer at the start position and positioning an end graphical pointer at the end position, and
selecting one text display effect item from a plurality of text display effect items, wherein the selected text display effect item is added to one of the multiple video clips when a drag-and-drop operation is performed.

47. The computer-readable medium of claim 46, wherein each of the at least two video clips has a fixed size within the single video track regardless of a playback time.

48. The computer-readable medium of claim 46, wherein the single video track further includes a transition between the at least two video clips.

49. The computer-readable medium of claim 48, further comprising selecting the transition from a plurality of transitions, the plurality of transitions including a wipe transition.

50. The computer-readable medium of claim 48, further comprising selecting the transition from a plurality of transitions, wherein the selected transition is added to the single video track when a drag-and-drop operation to the single video track is performed.

51. The computer-readable medium of claim 46, wherein the receiving step comprises receiving the information defining the graphical user interface, which displays, in the first area, a title and a playback time for each of the plurality of images.

52. The computer-readable medium of claim 46, further comprising selecting one image from the plurality of images displayed in the first area, wherein the video track corresponding to the selected image is added to the single video track when a drag-and-drop operation to the single video track is performed.

53. The computer-readable medium of claim 52, further comprising moving the selected one image from one position to another position of the single video track when a drag-and-drop operation is performed.

54. The computer-readable medium of claim 46, wherein
the receiving step comprises receiving the information defining the graphical user interface, in which the first area of the graphical user interface further displays at least one music item separately from the images corresponding to the video clips and the third area further displays an audio track along with the single video track; and
the method further comprises selecting one music item from the at least one of music item, wherein the selected music item is added to the audio track when a drag-and-drop operation to the audio track is performed.

* * * * *